United States Patent [19]

Mueller et al.

[11] 4,213,189
[45] Jul. 15, 1980

[54] REACTIVE COMPUTER SYSTEM ADAPTIVE TO A PLURALITY OF PROGRAM INPUTS

[75] Inventors: David J. Mueller, Elk Grove Village; Daniel G. Prysby, Chicago; John V. Moravec, Berwyn, all of Ill.; George A. Watson, Tustin, Calif.

[73] Assignee: Admiral Corporation, Schaumburg, Ill.

[21] Appl. No.: 806,304

[22] Filed: Jun. 13, 1977

[51] Int. Cl.² .......................... G06F 3/00; G06K 15/20
[52] U.S. Cl. ..................................... 364/100; 340/703; 340/709; 340/725; 340/741; 340/748; 340/798; 340/799; 273/85 G; 273/DIG. 28
[58] Field of Search ... 364/200 MS File, 900 MS File, 364/521, 200, 900; 358/81, 82, 903; 340/324 AD, 745, 725, 701, 703, 731, 756, 799; 273/DIG. 28

[56] References Cited

U.S. PATENT DOCUMENTS

| | | | |
|---|---|---|---|
| 3,944,999 | 3/1976 | Moore | 340/324 AD |
| 3,973,244 | 8/1976 | Lovercheck et al. | 364/200 |
| 3,995,312 | 11/1976 | Hubbard, Jr. et al. | 358/81 |
| 3,996,584 | 12/1976 | Plager | 340/324 AD |
| 4,026,555 | 5/1977 | Kirschner et al. | 358/903 |
| 4,070,710 | 1/1978 | Sukonick et al. | 364/900 |
| 4,139,838 | 2/1979 | Inose et al. | 364/900 X |
| 4,142,180 | 2/1979 | Burson | 273/DIG. 28 X |
| 4,155,095 | 5/1979 | Kirschner | 273/DIG. 28 X |

Primary Examiner—Raulfe B. Zache
Attorney, Agent, or Firm—R. Lewis Gable; Albert G. Marriott

[57] ABSTRACT

There is disclosed a computer system including a storage means such as a random access memory (RAM) for receiving data to be displayed upon a display means, e.g. a color cathode ray tube, a microprocessor for control of the computer system operations, and viewer input devices such as a control stick or keyboard, whereby the viewer may respond selectively to the data displayed upon the display means. A limited capacity storage unit, illustratively in the form of a tape cassette, stores data in the form of a program for permitting the viewer to store useful material in the form of a repository, such as a Christmas list; the program to be displayed by the display means can assume any of a limitless number of programs and may be adapted to an exceptionally wide range of uses for the home, office or school. The computer system permits the viewer to respond as through the input devices, to the material being displayed, whereby subsequent material may be effected. To effect a variety of operations, the computer system includes a record/read device for receiving the storage unit, whereby the stored data thereon may be read out and stored in the RAM for subsequent use by the computer system. In this regard, graphic material to be displayed upon the display means is stored in select locations in the RAM to be selectively read out, dependent upon the image to be displayed. Further, there is included a second storage means in the form of a read-only memory (ROM) for storing utility sub-routines, whereby various operations of the computer system may be controlled.

53 Claims, 55 Drawing Figures

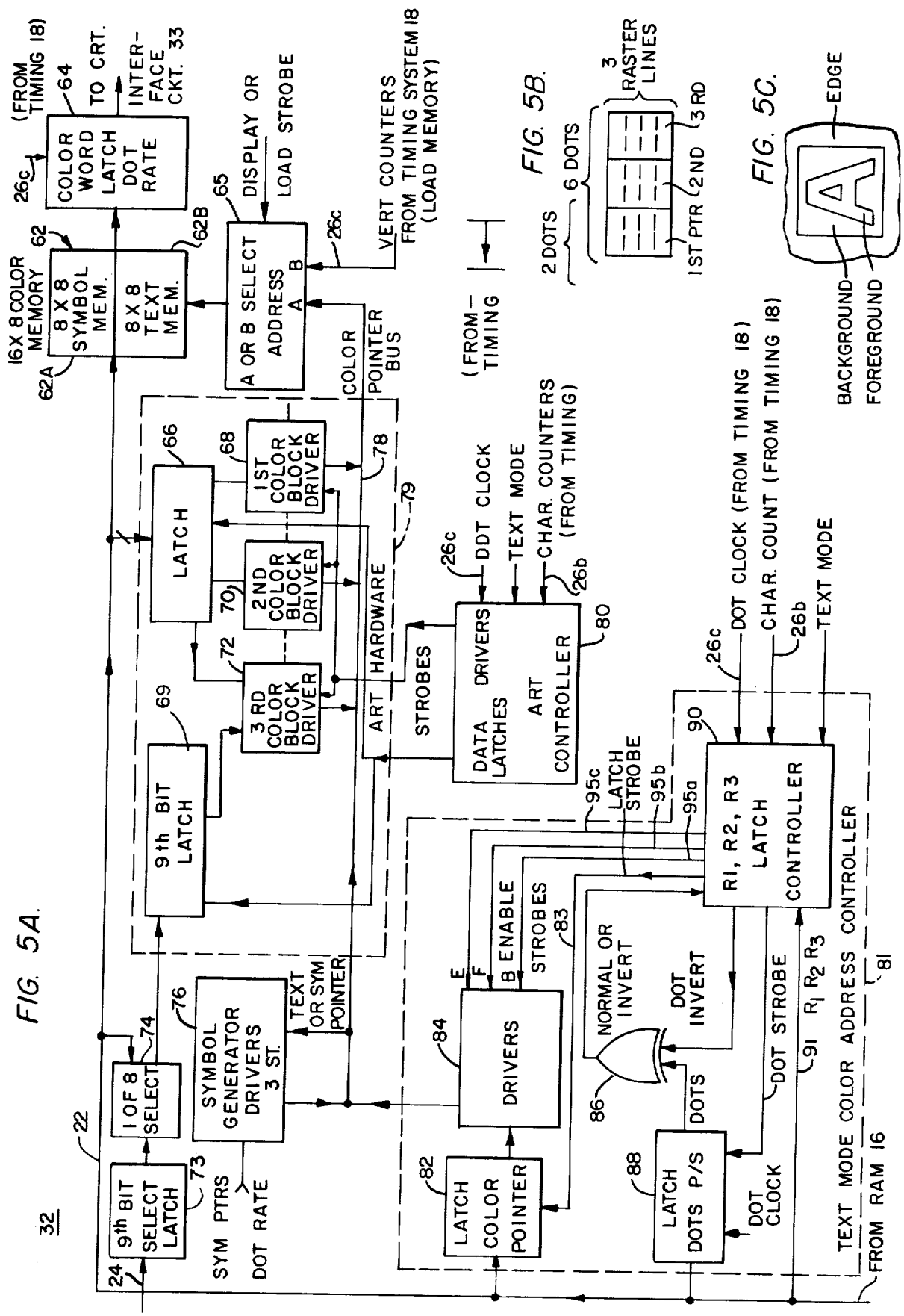

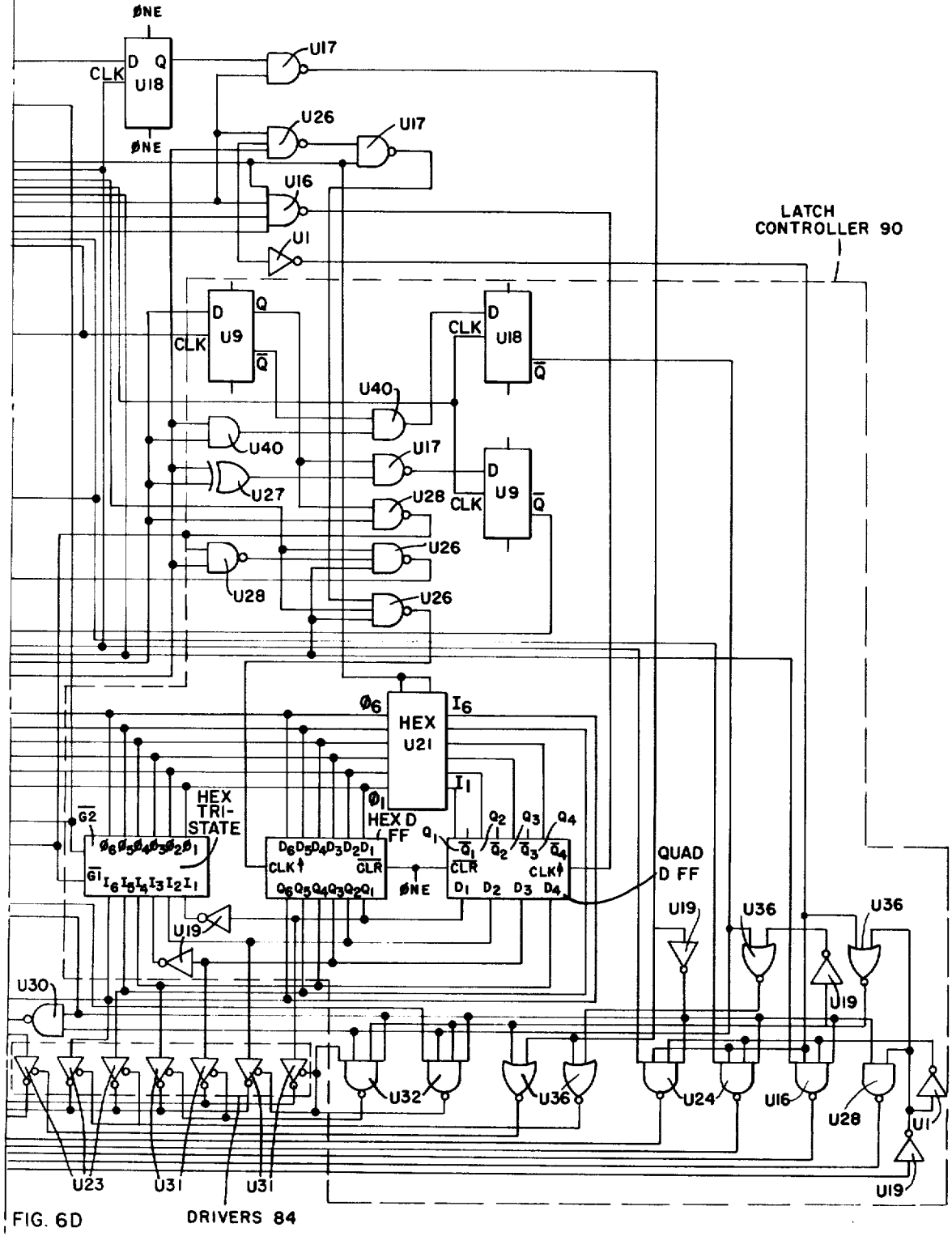

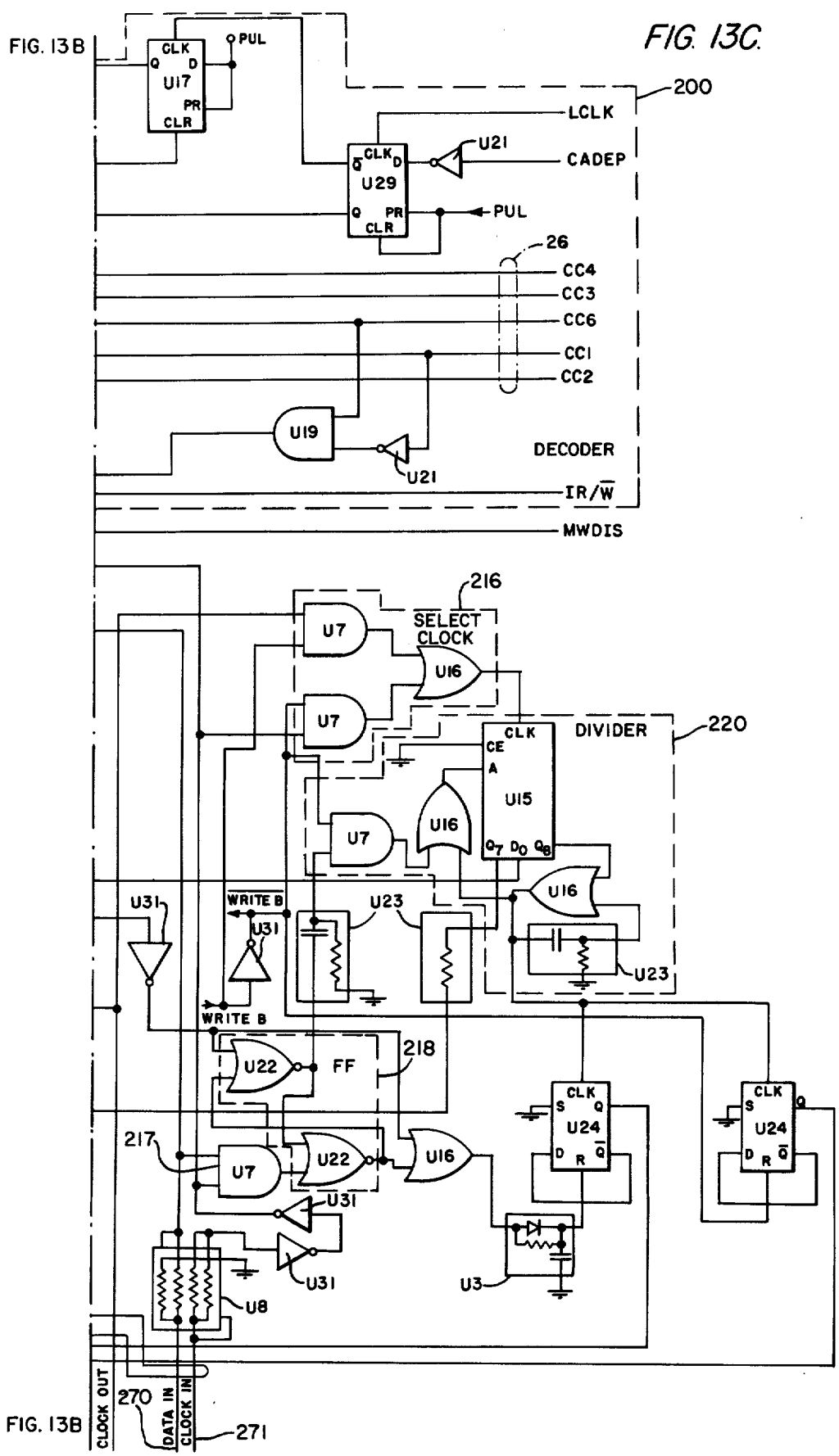

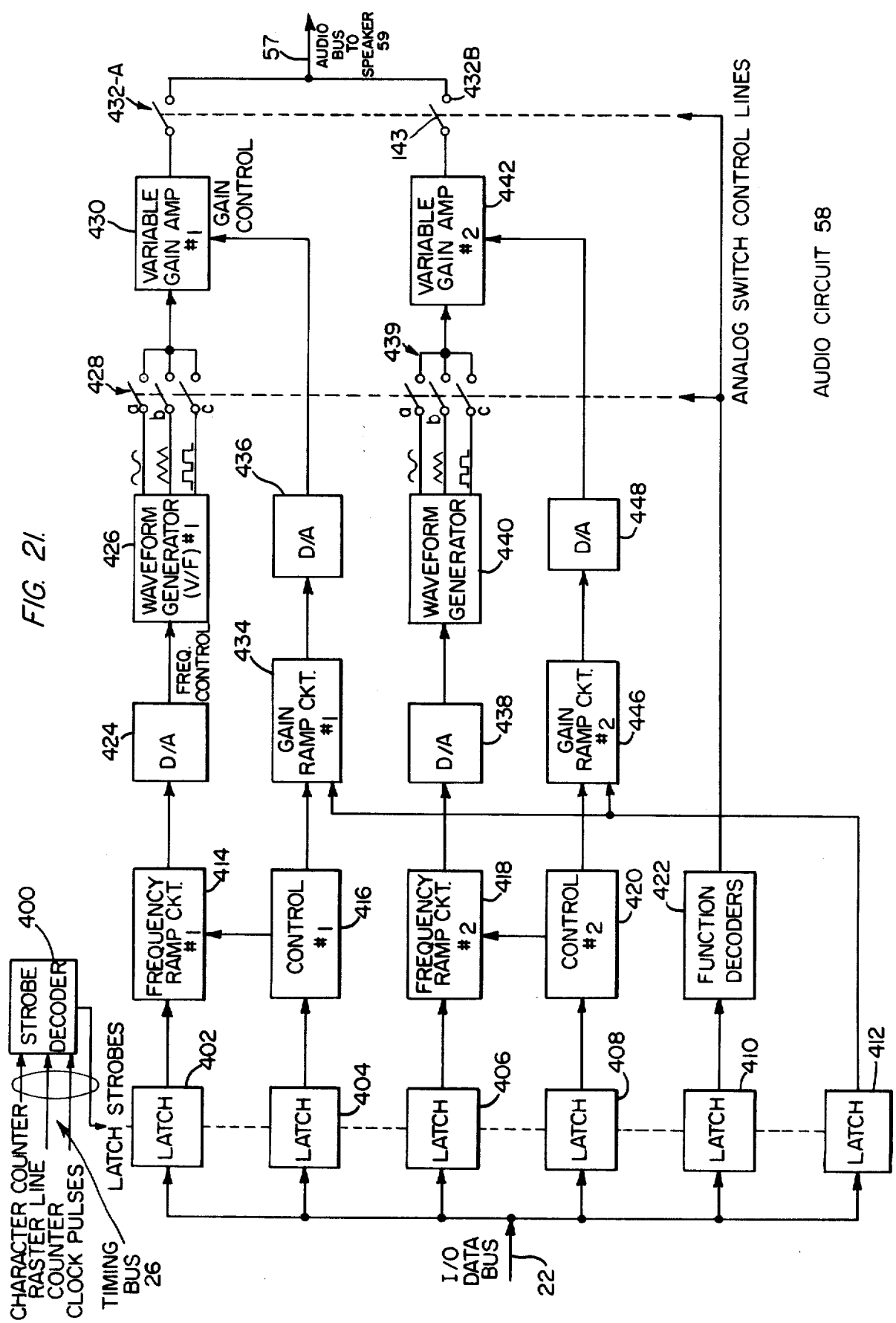

REACTIVE COMPUTER SYSTEM ADAPTIVE TO A PLURALITY OF PROGRAM INPUTS

BACKGROUND OF THE INVENTION

1. Field of the Invention

This invention relates to computer systems and in particular to such systems capable of displaying images, as upon a cathode ray tube, in accordance with any of a variety of programs as stored upon a low-cost, limited capacity storage unit such as a tape cassette, and capable of viewer interaction to control the selection of the displayed image as well as to store data upon the storage unit.

2. State of the Prior Art

There is presently known in the art the adaptation of a television receiver to play a number of games, e.g. a paddle-type game where one or more players operates control sticks to cause the image of a ball to move repeatedly from side to side as the players manipulate the displayed paddle to intercept the ball and to return it to the opposing player. Typically, these systems are implemented in hardware game circuitry including, for example, a power supply and an oscillator producing a master timing signal for the TV display system. A horizontal sync circuit provides a clock frequency into clock submultiples, which are variously combined to generate reset, blanking and sync signals. A vertical sync circuit provides a horizontal reset into vertical submultiples for combination into vertical reset, blanking and sync signals. The two sync signals usually are combined into a composite sync signal that synchronizes the data display of the receiver's cathode ray tube (CRT) with the game circuitry. A stationary image is displayed upon the CRT that makes up the background as generated by a playfield display section. The remaining images are generated by an object display circuit and moved around at various speeds by horizontal deflection and motion circuits, which are coupled to the aforementioned sync circuits. A score occurs when a ball is not returned and an appropriate signal is generated and applied to a storage circuit which counts each such unreturned ball and controls a display circuit to present the correct scores upon the CRT. Typically, there also is included a game length circuit in the form of a timer or a score counting circuit that has a time limit or the number of points scored, to disable the game circuitry. Further, a sound circuit is provided including an appropriate amplifier and speaker, whereby appropriate game-like sounds, e.g. the ping and pong of a ping-pong ball striking a paddle, are provided upon the occurrence of a ball hitting the displayed paddle and also to indicate the scoring of a point.

A variety of such games has been implemented by integrated circuits and are adapted to display, as upon a television CRT, games such as tennis, hockey featuring a goalie and a forward for each side, squash, practice one-man squash, and a variety of rifle-shooting games. As development of such games has proceeded, the control circuitry has become increasingly sophisticated, whereby the difficulty of the games may be varied. For example, the size of the bat or racket, as well as the ball speed, may be changed. Further, the angles of return from the paddle or racket may be changed to increase the difficulty of the game. In addition, ball service may be automatic or manually-controlled, whereby the players can control how the on-screen generated ball is put into play after each point is scored. In a rifle-shooting game, a manual control in the game circuitry initiates the movement of a target upon the CRT screen, and a rifle in the form of a light source is aimed at the target. When the rifle's trigger is pulled, a shot counter in incremented. If the rifle is on-target, the rifle light source as focused upon a photocell indicates a hit and the output from the photocell is applied to a hit counter which is incremented, and thereafter a hit noise is generated and the target is blanked for the duration of the hit signal. After fifteen shots, the score appears on the screen to indicate the total shots and the number of hits.

In more recent developments, such games have been adapted for display upon color CRT's, and have included large-scale integrated circuits that first process the color or chroma information to be applied in a format similar to that of a broadcasted color TV signal. Basically, the color signals are treated as two vectors defined by the blue (B-Y luminance) and red (R-Y luminance) as provided by an integrated circuit chip that includes a series of field-effect transistor switches and a resistor matrix. The integrated circuit chip also includes logic that is programmed to produce appropriate colors in any portion of a line then being scanned. By controlling the switching matrix, two separate voltages are produced, corresponding to the B-Y and R-Y vectors that are programmed to produce a desired color signal. The two vectors are applied to a chroma modulator having a stable color transmission frequency provided by a 3.58 MHz crystal oscillator; in this manner, the color signal is phase-modulated and transmitted to the color CRT receiver.

It is contemplated that most of the above-described games are implemented by "hard-wired circuitry", taking the form of large-scale integrated circuits. The level of their sophistication is relatively low and permits only a limited amount of adaptability as determined by the configuration of the game's control circuitry. In this regard, it is contemplated that presently-available microprocessors could well be adapted to such game systems whereby a variety of more sophisticated games could be played with circuitry implemented by a microprocessor. At present, there is available such a game including a microprocessor, a static memory interface, a read-only memory (ROM) and a random-access memory (RAM) including a light-emitting diode display whereby a game of chess may be displayed. In addition, such a game may be readily adapted to show the board and chess pieces upon a conventional CRT display. By the use of the increased sophisication provided by the microprocessor, each player in the game is able to control the move of each piece by pressing control keys specifying and entering the "from" and the "to" squares in terms of ranks and files, giving the coordinates of each square. The counter move is determined by the microprocessor and is initiated by the player pressing the designated key, thus instructing the processor to analyze the move and to respond thereto. Significantly, the degree of complexity in responding to the player's move may be changed to a variety of levels. The higher the level, the more time the processor requires to respond.

In addition, a microprocessor has been adapted to be used in a "gunfight" game wherein two figures are displayed on the CRT screen and the players try to shoot each other by viewer input to maneuver the displayed image on the screen and pressing trigger controls. In such a game, the microprocessor is adapted for use with a CRT, by storing image data indicative of the gunfighter as well as background images, in a relatively large random-access memory and reading out the image data, while conventional horizontal deflection circuits generate the raster of the CRT. In an illustrative format, the pattern on the screen is composed of 224 horizontal lines, each being 256 dots long, whereby the RAM holds 224 X 256 bits of information, which are sequentially read out during the scanning process. Further, it is contemplated that the game that the program plays may be changed by storing game information upon a storage means in the form of a cartridge or tape cassette, thus providing flexibility with respect to a fixed game as implemented by hard-wire LSI circuits.

The above-described system, whether implemented by conventional circuitry, LSI circuits or microprocessors, have been limited to a great extent to playing games, even though at increasing levels of sophistication. It is contemplated by this invention to provide a computer system illustratively implemented by a microprocessor, that is capable of many different functions, only one of which relates to playing a game, involving images to be displayed upon a cathode ray tube. In this regard, there are many applications besides the playing of games, where such systems would have application, such as a "home computer", capable of performing many functions within the home. For example, a computer could be used to store information such as Christmas lists or telephone numbers. A further contemplated application of such a system would be as an educational device that could be used in schools or in the home to teach children or adults. In addition, such a system could be used in business, for recordkeeping or for teaching purposes. The applications for such systems are limitless and the introduction of flexibility into the previously game-oriented systems would permit the basic components of these systems to be used in a great number of different applications.

SUMMARY OF THE INVENTION

It is therefore an object of this invention to provide a computer system capable of being adapted by the input of program data from a limited storage unit, such as a cartridge or cassette, to a great number of different applications.

It is a further object of this invention to provide data by viewer input, whereby the program material displayed by the system's display means is changed.

It is a further object of this invention to provide a computer system, wherein there is included viewer input means whereby the viewer's response may be written onto the limited storage unit, e.g. a tape cassette, which stores the program data including control and image data.

In accordance with these and other objects, there is provided a computer system including a control means, illustratively in the form of a microprocessor, a color display means in the form of a color CRT, means for receiving a limited storage unit such as a tape cassette, means for reading and writing data from and to the storage unit, and viewer input means in the form of a control stick and/or keyboard whereby the viewer may readily respond to the images displayed upon the display means, making entries to the system through the viewer input means, whereby the images displayed are controlled thereby in accordance with a program of data stored upon the limited storage unit and/or for writing data via the input means upon the storage unit.

More specifically, the computing system further includes a memory in the form of a random-access memory (RAM), whereby control data, and image and audio data may be read out from the limited storage unit to be stored therein, for use in forming a variety of images to be displayed by the CRT, under the control of the control data program as stored upon the limited storage unit. In this regard, it is contemplated that the images are displayed in color and that various portions of the image may be variously colored as determined by the program data as stored upon the limited storage unit.

Color or chroma data is supplied from the limited storage unit in terms of control data to the RAM, whereby the color of various portions of the displayed image may be changed periodically in accordance with the control program data as derived from the limited storage unit. A set or plurality of selected colors from a larger number thereof of which the system is capable of reproducing, is transferred from the storage unit to the RAM and then is transferred from the RAM to be stored in a suitable color memory in the color processing circuit whereby the image then being displayed may be selected from that set of colors. If it is desired to display a different image with different colors, a new set of colors may be loaded into RAM 16 to be transferred from there to the color memory and new image data may also be loaded into the RAM 16, all under the control of the program control data.

Further, the image formed is formed in a first or text mode of operation, of a plurality of "characters" that are assembled in accordance with the control data. In this fashion, the limited storage unit can provide the basic data in the form of a set or library of characters to the RAM, which are selectively read out and applied through a color processing circuit to the color CRT whereby a variety of color images may be displayed from a limited amount of data. In particular, indirect addresses are provided from a timing system and applied to a first portion of the RAM. During display, the indirect addresses are read out and applied to a timing circuit, whereby data indicative of the vertical line position of the CRT are applied thereto, to provide new addresses, which are used to read out from a second portion of the RAM a series of characters in terms of dot patterns, to control the display of images upon the color CRT. Thus, a limited number of characters may be assembled to form a variety of images.

In a second or paint mode of operation, the timing system provides first and second direct addresses to the RAM, whereby image data including color pointers identifying the color to be painted upon the display screen of the color CRT, is determined. In an illustrative embodiment of this invention, the second address is formed by shifting within the timing system the binary data of the first address to form the second address and applying same to the RAM to read out additional image data to be combined with the first readout of data from the RAM, to obtain a complete set of color pointers or addresses to read out the selected color from a color memory.

In a further aspect of this invention, the viewer may write in data to the computing system to be appropriately interpreted by the control data and to be stored in the RAM, then to be transferred from the RAM via the read and write means to the limited storage unit. In this way, a library of information, such as a Christmas address list or personal business records, may be stored upon the storage unit to be used at a subsequent time. As a further modification of this aspect, the input device may form a keyboard having an overlay especially coordinated with the program data derived from the selected limited storage unit, e.g. the interpretation of the input from the keyboard is dependent upon the particular program data.

In a further aspect of this invention, a set of software programs is stored into a ROM associated with the microprocessor whereby various operations of the computing system are controlled thereby. For example, a program is developed for unloading the program data from the limited storage unit into the RAM and for initiating the execution of the program data. In this regard, it is contemplated that control data in the nature of utility subroutines, e.g. tape loading and searching, audio synthesis, keyboard scanning and computation by the computing system, also may be stored in the ROM, to be selectively read out therefrom; thereafter, these stored subroutines are used in accordance with the control data of that particular program. In this fashion, the control data stored upon the limited storage medium may be minimized, in that a set of the control data common to a number of programs is stored in the ROM.

BRIEF DESCRIPTION OF THE DRAWINGS

These and other objects and advantages of the present invention will become more apparent by referring to the following detailed description and accompanying drawings, in which:

FIG. 5A, and FIGS. 6A, B, C, D and E and FIGS. 7A and 7B, respectively show the color processor of FIG. 1 in the form of a functional block diagram, and a schematic of the detailed circuit elements thereof, whereas FIGS. 5B and 5C show, respectively, the configuration of a character, and the display of information upon a CRT.

FIGS. 21 and 22A and B, 23, 24, 25 and 26 are schematic drawings of the audio circuit of FIG. 1, in the form of a functional block diagram, and of detailed schematic drawings, respectively;

DETAILED DESCRIPTION OF THE PREFERRED EMBODIMENT

Figure 1:
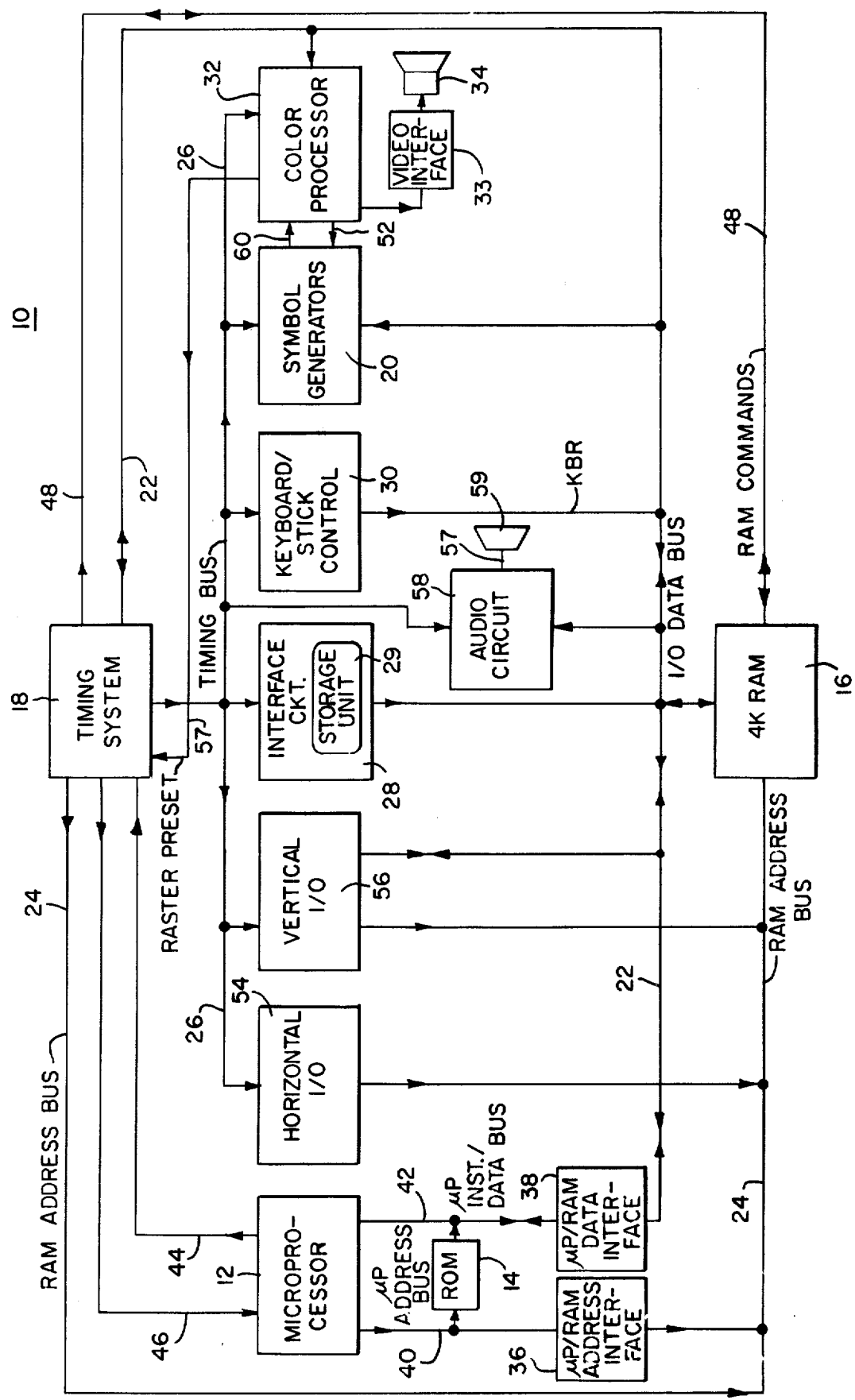
FIG. 1 is an overall schematic diagram in block form of the computer system of this invention.

In the following, the computer system 10 will first be described in a general fashion as to its components and operation, with respect to FIG. 1. Thereafter, an illustrative number of applications for this computing system 10 will be provided in terms of the games, educational programs and personal programs that may be adapted for this system. Thereafter, each of the components or component systems making up the computing system 10 will be first described in terms of a functional block diagram, which will be related to a detailed circuit diagram thereof. As shown in FIG. 1, the computer system 10 includes a microprocessor ($\mu$P) 12 and an associated ROM 14, wherein a variety of programs may be stored to assist in the control of the data to be displayed. Illustratively, the ROM 14 may receive programs related to the loading of data (program "LOAD"), the energization of the system 10 (program "POWER ON"), the formation of images (program "ARTWORK") and routines for performing various computing functions (program "ARITHMETIC").

General Description of the Components of the Computing System 10

With regard to the drawings and in particular to FIG. 1, there is shown the computer system in accordance with the teachings of this invention, capable of receiving data from a limited storage unit 29, illustratively taking the form of a tape cassette that is coupled to an interface circuit 28 (see FIGS. 12 and 13 for details thereof) for reading and writing data to and from the storage unit 29; further, the interface circuit directs data to and from the computer system 10 and in particular to a memory 16 in the form of a random-access memory (RAM). As will be explained in detail later, the data stored upon the limited storage unit 29 defines the type of program to be processed by the computer system 10 and may illustratively comprise any of a large variety of programs including games, educational presentations including viewer feedback, storage of information such as Christmas address lists or telephone numbers, etc. More specifically, the data stored upon the storage unit 29 controls in part the operation of the system 10 and further includes data as to the composition and color of images to be displayed by the system's display means in the form of a color CRT 34. Further, the data as stored by the unit 29 includes data for controlling at least parts of the control processes or steps carried out by the computer system 10.

Figure 4:
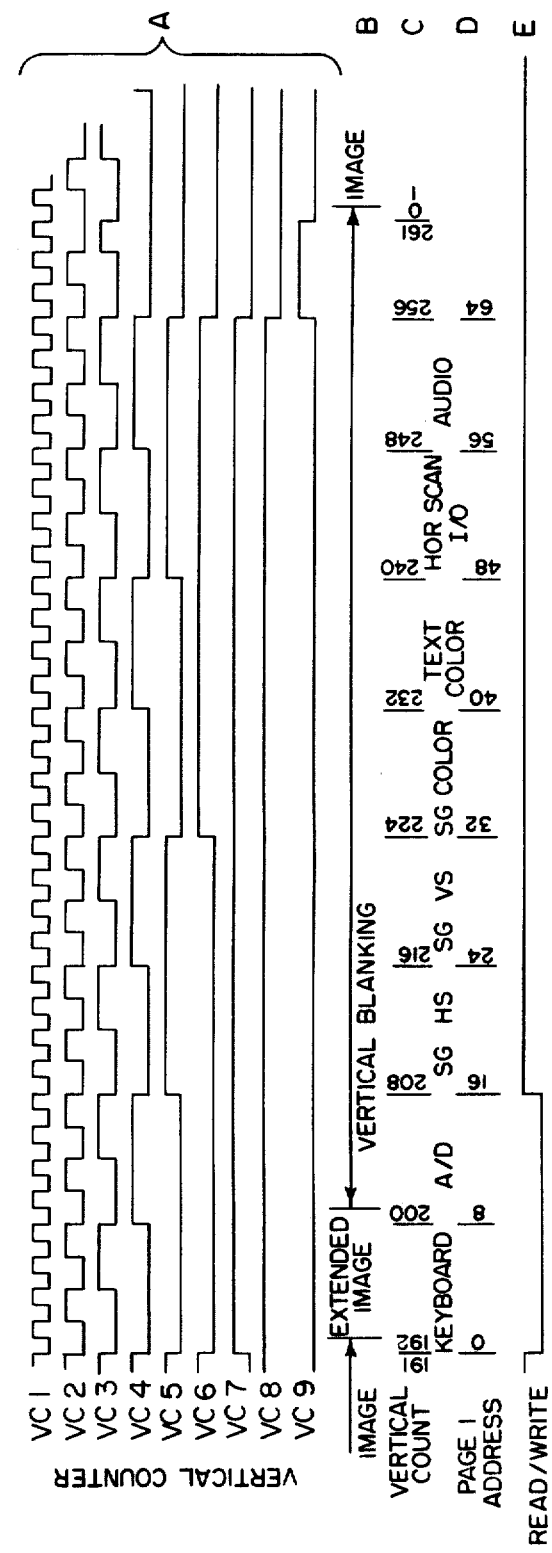
FIGS. 3A-3J and 4A-4E variously show the timing signals as developed by a timing system as shown in FIG. 1, for timing the transfer of various data within the system of FIG. 1.
Figure 3:
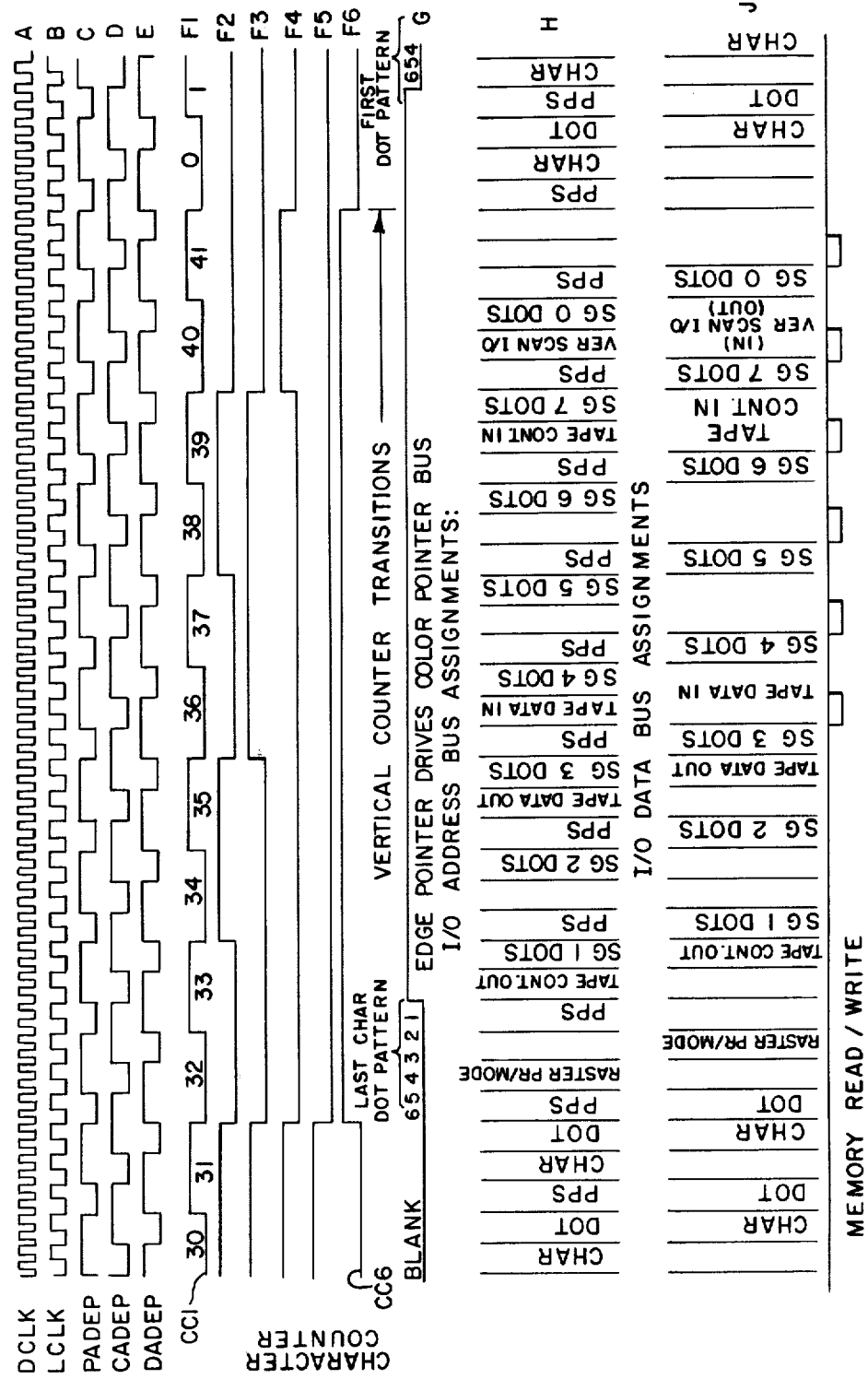

The control and in particular the timing of the computer system 10 is determined by the timing system 18, which generally controls the transfer of information between various of the components of the computer system 10 as shown in FIG. 1, and in particular provides addresses via a multi-port RAM address bus 24 to the RAM 16, whereby selected portions of the RAM 16 are addressed, to read out data therefrom or to store data therein from a bi-directional input/output (I/O) data bus 22 that interconnects the operating components of the computer system 10. As will become clear from further explanation, the computer system 10 is a multiplexed system wherein the transfer of data and the subsequent control operations are effected in a timed sequence, with each such data transfer or control step occurring in a sequenced time slot. In particular, the timing system 18 controls the multiplex timing in accordance with the display of images upon the CRT 34 at a horizontal rate set at 15,720 horizontal lines per second, and a vertical rate of 60 Hz. In particular, the transfer of data, as seen in FIGS. 3 and 4, between the various components of the computer system 10 occurs in the vertical and horizontal blanking periods imposed upon the CRT 34.

Further, the timing system 18 controls the transfer of data indicative of the image from the RAM 16 to a color processor 32, whereby a series of dots is displayed, with corresponding color or chroma information, upon the CRT 34 to provide a color image thereon. As seen in FIG. 1, timing information in the form of clock trains indicative of the horizontal lines, and vertical dots and characters as displayed upon the CRT 34, are applied via a timing bus 26 to the components of the computer system 10, to energize tristate drivers associated with each of the components, whereby data upon the I/O data bus 22 commonly connected to these components, is selectively applied to one of the components of the computer system 10, at its multiplexed, timed slot.

As shown in FIG. 1, the color processor 32 receives image data in a dot-by-dot fashion, as read out from selected portions of the RAM 16 to be sequentially displayed as the cathode ray beam is scanned in a vertical and horizontal raster pattern by the CRT 34. Further, as will be explained in detail later, the color processor 32 stores a plurality of color or chroma data signals, from which the various portions of the displayed image may be variously colored. Thus, at the time of display, a selected color is imposed by the color processor system 32 onto a particular dot as it is then being displayed. Further, the set of colors as stored within a color memory of the color processor 32 may be selectively changed from time to time so that the next, subsequently displayed image may be formed of a different set of colors. In this regard, the color data is first programmed and stored in the storage unit 29, and is subsequently read out therefrom and stored in the RAM 16 so that the color of the images displayed by the CRT 34 may be changed subsequently and a new set of colors selected from a relatively large library of possible colors. In particular, the color processor 32 includes a color memory (to be described) capable of storing a finite number of colors, e.g. eight, from which the colors for a given frame or colored image may be chosen. However, the system is capable of reproducing a larger library of colors, for example sixty-four colors, and the programmer selects eight of the possible sixty-four colors to color the various areas of a particular image or frame of video information, by programming the storage unit to color the frame with the eight designated colors. In this regard, it is understood that the programmer may select further sets of colors from which subsequent frames or images of video information may be colored.

Special characters or symbols are applied selectively to and displayed by the CRT 34 in connection with games or various other presentations that may be displayed upon the system 10. In particular, in a war-type game, an image of a tank could be programmed into one of a plurality of the symbol generators 20 so that upon command, that image could be read out and applied via the color processor 32 to be displayed by the CRT 34. Further, a cursor symbol in the form of an arrow could be stored in another section of the symbol generators 20 and read out at appropriate times. Viewer input or reaction to the data displayed upon the CRT 34 is transmitted into the system 10 via the keyboard and/or stick control 30. Illustratively, two or more control or joysticks are provided with the computer system 10 and are capable of viewer manipulation. In addition, a keyboard in the form of a matrix of conductors which may be selectively depressed is provided, over which an overlay designating various functions in terms of control of the system or of data input, may be disposed over the matrix of conductors. It will be apparent that the overlay is dependent upon the program derived from the storage unit 29 and that various control functions as well as data input may be effected by the same keyboard, dependent upon the response made thereto by the control data as dnetered into the RAM 16 from the storage unit 29.

Further, an audio circuit 58 is provided, whereby various audio signals, including voice and special effects, may be applied to a speaker 59 in coordination with the image displayed by the CRT 34. For example, in the presentation of an educational program, there typically would be a series of images displayed upon the CRT 34 presenting educational material in conjunction with a voice track explaining same. In other instances, especially where a game is involved, special effects in conjunction with the game are made; for example, if a war game were programmed by the storage unit 29, special effect generators within the audio circuits 58 are programmed to generate corresponding sounds, e.g. the sound of exploding munitions.

The computer system 10 is under the control of a control processing unit in the form of the microprocessor 12, as manufactured by the assignee of this invention under its designation PPS-8 and further described in its publication entitled, "Microcomputers", Document No. 19480N40, March 1975, to receive instructions from its associated memory in the form of the read-only memory (ROM) 14 or the RAM 16, to perform various logical and mathematical operations and to act as a central control unit for the entire system 10. As shown in FIG. 1, the microprocessor 12 is connected via a microprocessor address bus 40 and a microprocessor instruction/data bus 42 to the ROM 14, which is a 2048×8 bit dynamic ROM having a capability of storing 16,000 bits. In an illustrative embodiment of this invention, the ROM 14 may be that ROM as manufactured by the assignee of this invention under their designation A52XX. Further, the RAM 16 may in one preferred embodiment of this invention take the form of a RAM as manufactured by Texas Instruments Corporation under their designation TMS-4050, or that RAM as manufactured by the assignee of this invention and described in a publication entitled, "4096×1 Bit Dynamic Random-Access Memory". The microprocessor 12 performs mathematical and logical operations on eight bits of data in its accumulator, sending out control signals via the RAM 16 to the color processor 32 and also to the audio circuit 58. In addition, the microprocessor 12 scans or activates the keyboard and/or control stick 30 to interpret viewer input and based upon its control operation, sends appropriate signals in eight-bit bytes to the RAM 16 via the address interface 36 and the data interface 38. It is contemplated that in alternative embodiments of this invention, the microprocessor 12 could communicate directly with the components of this system without being transferred via the RAM 16.

As will become clear from the discussion below, the timing circuit 18 generates vertical and horizontal count signals indicative of the position along the horizontal line being scanned upon the CRT 34, as well as the vertical position of the CRT scan, and uses such counts as addresses to access various portions of the RAM 16. In particular, the horizontal count signals are applied via the timing bus 26 from the timing system 18 to a horizontal input/output circuit 54 which acts as an interface between the timing circuit 18 and the RAM 16 to address data to be applied vai the memory data bus 22 to the cassette interface circuit 28, the symbol generator 20 and the color processor 32, typically during the horizontal retrace period. In somewhat similar fashion, the vertical count signals are provided by the timing circuit 18 via the vertical input/output circuit 56 via the RAM address bus 24 to the RAM 16, whereby the address of 20 data within the RAM 16 corresponding to data to be transferred to the keyboard and/or control stick, the symbol generators 20 and the color processor 32 is effected, typically during the vertical retrace period. Further, as seen in FIG. 1, a raster preset signal identifying the number of raster lines M (as will be explained), as developed by the color processor 32, is applied via the bus 57 to the timing system 18.

General Description of the Operation of the Computing System 10

The computing system 10 as generally illustrated in FIG. 1 displays, as a part of its operations, an image upon the CRT 34 by scanning the CRT in a rather conventional horizontal and vertical fashion. The timing system 18 provides timing signals along the timing bus 26 to the components of the system 10 in a locked fashion, whereby each component is enabled to transmit data via the input/output data bus 22 at a selected interval or time slot within a recurring time framework synchronized to the raster scanning of the color CRT 34. Generally, image data signals in the form of data are read out from the RAM 16 and transferred to the color processor system 32 during those time portions of the horizontal scan of the CRT 34. During the horizontal and vertical retrace intervals, data is transferred between the RAM 16 and the various other components of the system 10. It is understood that during the entire time period of operation, time slots in the locked system are provided for transmitting signals from the microprocessor 12 via the RAM 16 to the various components of the system 10 under its control.

Figure 2:
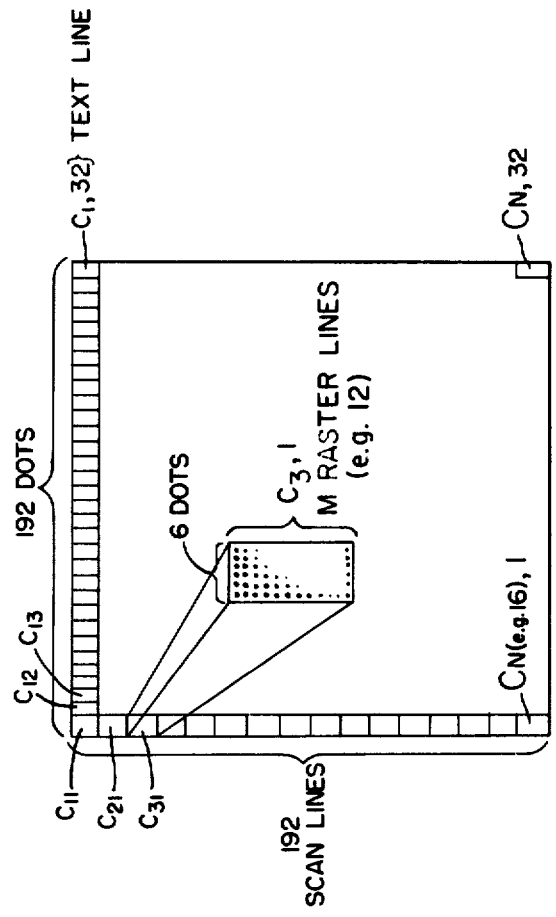
FIG. 2 is an illustration of the makeup of a displayed image as composed by the computer system of FIG. 1.

An understanding of the locked timing operation will become more evident in view of a description of the manner in which images are formed upon the display screen of the CRT 34, with respect to FIG. 2. As will become clear from a further description, the color processor 32 may be operated in a first or text mode, or in a second or paint mode. In the text mode, images are displayed upon the display screen of the CRT 34 in terms of a plurality of characters, marked as shown in FIG. 2 by the letter "C", an entire image of characters being formed by N text lines of characters, each row of characters having 32 characters therein. In an illustrative embodiment, N may equal 16. As seen in FIG. 2, each character is composed of an array or matrix of dots, six dots wide by M raster lines high. It is understood that the number of raster lines M within a given character C, and thus the number of text lines N within a given image, may be varied dependent upon the data to be displayed. For example, if the amount of data and thus the detail of the image is to be increased, the number of raster lines M per character C is decreased, thus increasing the number of text lines N, with the number of horizontal lines being kept a constant, e.g. about 192 scan lines. As will be explained generally with respect to FIG. 1, a given program, as is stored upon the cassette storage unit 29, contains a plurality or library of characters or symbols C, from which a plurality of images may be formed. In the process of displaying a given image, the characters are selected from the library and are arranged in rows and columns as shown in FIG. 2 to form the desired image. Generally, this selecting process is performed by using a set of indirect addresses that are read from the RAM 16 and applied via the I/O data bus 22 to the color processor 32, whereat data as to the vertical position of the then current position of the electron beam scan of the CRT, is added to the indirect address. The indirect address identifies a particular character of the library of characters from which the image is to be displayed and when modified with data according to the vertical position, is reapplied via the timing system 18 and the RAM address bus 24 to the RAM 16 to read out a pattern of dot signals to be stored in the color processor 32. The pattern of data signals according to the selected characters is applied to the CRT 34, whereby as its beam is scanned across its face, it is modulated to produce a corresponding series of dots of the image in consecutive order across a horizontal line of the CRT scan. As shown in FIG. 2, each character "C" and as illustrated, character C31 indicating the first character in the third row, includes, as does each character, a pattern of dots formed of M raster lines, for example 12, each line having six dots. With such a format, the entire image is formed of N times M lines, for example 192, each line having 192 dots therein. In particular, by scanning the first line of the image as shown in FIG. 2, the first six dots are determined by character C11, the next six dots of the first line are determined by the dots of character C12, and so forth, the last six dots being determined by the characters C1, 32. In this fashion, the 192 X (M X N) dots are determined in accordance with the selected pattern of characters C. In an illustrated embodiment of this invention, the CRT 34 is scanned at a rate of 15,720 lines/second, with a vertical rate of 60 Hz, with a dot size of approximately 252 nanoseconds.

In the second or paint mode of operation, the image is made up of square arrays, as shown in FIG. 5B, each array comprised of three squares. Each square is comprised illustratively of a dot matrix, illustratively two dots wide and three raster lines high. In this mode of operation, the timing system 18 provides direct addresses to the RAM 16 during first and second look-ups to provide data in the form of three color pointers, one for each of the three squares or dot patterns of the square array as seen in FIG. 5B. Each color pointer identifies the color for which its square is to be colored and in effect provides an address within the color memory of the color processor 32 from which that color may be addressed and read out, to be applied to the color CRT 34.

The operation of the computing system 10 as shown in FIG. 1 will become clearer as an explanation of the timing signal diagrams of FIGS. 3 and 4 is given. The timing system 18 includes a master clock for providing a master clock signal as shown in FIG. 3A, at a rate of 3.96144 MHz, from which the various other timing signals of the system 10 are developed, as will be explained in greater detail with respect to FIGS. 27A and 27B. From the master signal, horizontal and vertical control signals are developed by the timing system 18 and are applied via the color processor 32 to control the scan of the CRT 34. Within the timing system 18, there is a character counter synced with the master clock for providing six clock signals, as seen in FIG. 3F, which are used to variously address the RAM 16, as will be explained, and also to time the various operations of the system 10. The train of pulses of FIG. 3F1 defines the time slots for the display of a series of characters as illustrated in FIG. 2. As seen in FIG. 3F, there are 32 characters, beginning with character 1 and proceeding through character 32. In FIG. 3G, there is indicated a first dot pattern of six dots (corresponding to the first character), whereas at time slot 32, the last dot pattern or character is indicated. As FIG. 3F illustrates, there are ten additional time slots, i.e. 32 to 41, provided during the horizontal retrace period, as indicated by the blank signal going high, as illustrated in FIG. 3G. During the horizontal blanking period, the timed lock system provides for the transfer of data between selected components of the system 10. Since, as shown in FIG. 1, the components are tied to a common I/O data bus 22, the components must be selectively connected thereto in a timed, locked manner.

Reference is made to FIG. 3H, where the time slots for data transfer are specifically shown. In particular, the designation "CHAR" that occurs during the horizontal scan of the CRT 34, indicates that the RAM 16 is being addressed via the RAM address bus 24 to read out data corresponding to one of the characters C, whereby that data is transferred via the I/O data bus 22 to the color processor 32. Subsequently, a second look-up of the RAM 16 occurs, whereby the indirect address first provided during the CHAR period, is processed by the color processor 32, to be applied via the timing bus 26, the timing system 18 and the RAM address bus 24 to address a second portion of the RAM 16 to read out a pattern of dots, during the "DOT" time period. As shown in FIG. 3H, between successive sets of "CHAR" or first look-up, the "DOT" or second look-up, a time slot PPS is provided, during which address signals from the microprocessor 12 are transmitted to ROM 14 and RAM 16 to address data therein.

During the horizontal retrace period when no images are being displayed upon the CRT 34, the dot patterns of special characters as may be desired to be displayed upon the CRT 34, are transferred from the symbol generator 20 via the data bus 52 to the color processor 32, wherein they are stored for use at selected points in the scan of the CRT 34, whereby various special images may be displayed. For example, in the display of a war game, it may be desired to provide an image of a tank. In another instance, it may be desired to provide a cursor or arrow symbol in the display. As illustrated in FIG. 3H, there are eight different time slots, beginning with SG0 DOTS through SG7 DOTS, during which up to eight sets of dot patterns corresponding to eight different special characters may be transferred to the color processor 32. Further, at regular periodic intervals during the horizontal trace, time slots PPS are provided for transferring of control signals from the microprocessor 12 via the RAM 16 to various of the components of the system 10. Further, time slots "tape data in" and "tape data out" are provided for transferring data as read from the tape storage unit 29 to be stored in the RAM 16, and for writing tape via the cassette interface circuit 28 onto the tape storage unit 29, respectively. Thus, the viewer can respond selectively to the image displayed by the CRT 34, to write desired data via the keyboard 30 onto the tape storage unit 29. Further, there is provided a VER SCAN I/O slot, during which data as input by the viewer is transferred via the stick control 30 into the RAM 16. After the horizontal blanking period, the first look-ups occur during the CHAR and DOT time slots to display the first six dots of the first character of the next line.

Thus, the time slots as shown in FIG. 3H define the periods in which the corresponding components of the system 10 are addressed via timing bus 26 to permit the transfer of data via bus 22. As will be explained in detail later, each of the components of the system 10 includes a tri-state driver and decoder unit, whereby during its specified clock time slot, its tri-state driver is enabled, whereby the particular component is connected to the I/O data bus 22 to permit the transfer of data. For example, during the tape-data-in period, the tri-state driver associated with the cassette interface circuit 28 is enabled, thereby to actively connect the circuit 28 with the data bus 22.

A selected tri-state driver is energized in accordance with an address as applied via the timing bus 26 to each of the components. In particular, the timing system 18 includes a character counter providing a series of six trains of pulses via the timing bus 26 to decoders of each of the system's components. The decoders are, in effect, counters whose logic has been set to provide an enabling signal at its specified time slot, to enable its associated tri-state drivers. Thus, it can be seen that the trains of pulses as shown in FIG. 3F are applied via the bus 26 to each of the components to selectively enable the decoder of a selected component to enable its tri-state driver during one of the time slots, as shown in FIG. 3H. Though similar, the actual transfer of data is shown in FIG. 3J, whereby after a component's tri-state driver is enabled, the data is transferred via the data bus 22. As a comparison of FIGS. 3J and 3H reveals, the timing or address signals first are applied and in the subsequent time slot, the transfer of data occurs.

The timing system 18 also includes a vertical counter for providing, as shown in FIG. 4A, nine trains of pulses VC1 to VC9, which are applied via the timing bus 26 as address or timing signals to various of the components of the system 10, to enable that component's tri-state driver to connect it to the I/O data bus 22. As shown in FIG. 2 and FIG. 4C, after the 192-to-(M X N) scans of the CRT, the image ceases to be displayed, and after a period of approximately ten vertical counts, a vertical blanking signal is applied to the CRT 34, as indicated in FIG. 4B. From the 192-count to the 0-count, as seen in FIG. 4C, data is transferred selectively between the components of the system 10. As seen in FIGS. 4C and 4D, between the 192nd and 200th count of the vertical counter of the timing system 18, data is transferred from the keyboard 30 and to the RAM 16; during the period from count 200 to count 208, data is transferred from the analog-to-digital converters associated with the stick control 30 and written into the RAM 16. During the next three periods, 208 to 216, 216 to 224 and 224 to 232, horizontal, vertical and color data corresponding to the special symbols to be generated by the symbol generator 20, are transferred from the RAM 16 to buffers or memories within the symbol generator 20 and the color processor 32. In the next timing period between vertical counts 232 and 240, signals indicative of the colors assigned to the characters C as shown in FIG. 2, are transferred to a memory within the color processor 32 and form a palette of colors from which the characters C may be selectively colored, depending upon the image to be displayed. In the period between counts 240 and 248, interface control data is transferred between the interface device and the RAM 16. In the next period bewteen counts 248 and 256, audio data is transferred between the RAM 16 and the audio circuit 58, whereby an appropriate audio message may be reproduced by the speaker 59. In FIG. 4D, there is indicated the various addresses within the RAM 16 from which data is read or written selectively, as indicated by the read/write signal as shown in FIG. 4E.

In a sequence of operation of the system as shown in FIG. 1, a cassette-type storage unit 29 is inserted within a suitable drive mechanism and the data thereon are controllably read out by the interface circuit 28. Initially, the microprocessor 12 executes a POWER ON program, as stored within the ROM 14, whereby the system 10 is energized and thereafter executes a LOAD program whereby data of a particular program stored upon the storage unit 29 are loaded into selected portions of the RAM 16. This program data as derived from the unit 29 indicates images to be displayed upon the CRT 34 in terms of the configuration and color of the characters "C" making up an image, the audio message corresponding to the displayed image, PPS language programs and control signals for calling on selected programs as stored within the ROM 14. If the particular program involves calculations and arithmetic programs to perform the calculations may be brought out of the ROM 14 to be available to provide a series of calculations, typically in response to various entries made via the keyboard 30. The exceptionally wide range of uses of the computing system 10 will become apparent in the following description of various samples of the programs that may be recorded upon a tape cassette 29.

The content of the programs is virtually unlimited and has application in the home, business and in schools. For example, a tape storage unit or cassette 29 may be programmed with an educational program where the user, for example a child, gets a brief audio-visual lesson to teach the recognition of the letter "B" and its sound in various words. Audio via the speaker 59 demonstrates how to pronounce the "B" sound, and then instructs the viewer to use the control stick 30 whereby a cursor or pointer symbol as generated by one of the symbol generators 20 is displayed via the color processor 32 upon the CRT 34. With the control stick 30, the child selects a series of color pictures, those objects with the "B" sound. Upon receipt of the child's response via the keyboard 30, a voice is programmed to congratulate him and applause is heard in the background, while the "B" character takes a bow. The voice as programmed and reproduced via the speaker 59 tells the viewer to move to the next sequence of the interactive learning exercises. Further, audio-visual instruction can range in sophistication from such a simple application to complex adult education, e.g. bridge bidding. Logical predetermined responses can be assessed from the tape cassette 29 after each instruction by the microprocessor 12 or series instructions by the user, either to one novel situation after another, or to various, predetermined alternate responses.

Though the computing system 10 obviously has a wide range of complex programmed functions, the system 10 can be utilized to interact with the viewer in playing games. In one program termed "PAINTBOX", a paintbox of colors is displayed upon the CRT 34, whereby the viewer, via the keyboard 30, may select one or more of the displayed colors and draw pictures on the video screen with the selected colors. The pictures can be stored for later reference upon the tape storage unit 29, or the pictures can be erased at the push of one of the buttons of the keyboard 30. Prerecorded background music of synthetic sound to accompany or respond to motions of the electronic "brush" also is available. In such an application, the keyboard 30 is adapted by placing a thin, transparent overlay over the keyboard 30 to identify its various switch points in accordance with the paintbox tape presentation. A series of buttons as indicated by the overlay, designates the color of the line to be drawn. Another button is programmed to move the line up or down upon the screen of the CRT 34, while a third button moves the line down or reverses its direction. Color mixing is done by visual reference to the displayed "paint buckets", disposed typically at the bottom of the CRT screen. The buckets or squares relate to specific keys or points on the overlay for the keyboard 30, which are activated by depressing whereby electronically mixing and blending the various shades of the colors is performed in accordance with the viewer's command. Still another button as identified by the overlay is provided whereby the color of the entire picture may be changed. Such a system illustrates the ease in which a set of colors may be loaded into the RAM 16 and subsequently into a color memory of the color processor 32; the stored set of colors may be changed readily by depressing the keyboard. As indicated above, a particular picture as "painted" may be transferred via the RAM 16 and the cassette interface circuit 28 onto the tape storage unit 29.

In another application, a tape cassette 29 may be programmed to play a version of "Concentration", wherein the object for the viewer is to visualize a random pattern of colored squares displayed upon the CRT 34, and to recall the pattern seconds later after the pattern has been removed. In one embodiment, 96 brightly-colored flags are arranged in rows across the screen of the CRT 34, some of which match and some of which do not. When the game begins, two players, each operating with his own control stick 30, are given a discrete time period, e.g. 10 seconds, to spot and memorize the positions of as many of the matches of the colored flags as they can. Thereafter, the screen of the CRT 34 goes blank, except for several rows of sillouettes. Thereafter, first one player and then the other moves a cursor or special symbol as derived from the symbol generator 20 via his control stick 30. Once a player identifies a potential match, he presses a button upon the keyboard 30. If the player identifies correctly such a match, he is given an opportunity to identify another match. If unable, the other player is given an opportunity to identify matches, with each player obtaining a score indicative of the number of matches obtained and the scores of each player are displayed upon the CRT 34.

It is apparent that the computing system 10 can be readily adapted to play such commonly-known games as tennis, paddleball or hockey, as well as to be adapted to play more complex games, including contract bridge or chess. For example, a tape storage unit 29 may be programmed to simulate the descent of an imaginary spacecraft under the control of the viewer as he manipulates a control stick 30. In the course of the game, the viewer must keep the spacecraft on-course as it descends to the surface of the moon, while maintaining the correct rate of descent, the weight and quantity of fuel on board, and the directional thrust of four imaginary (but functional) retrorockets. The computing system is programmed to solve many problems involving the physics and mathematics of such a descent. For example, when the emission starts, the imaginary vehicle is at a predetermined altitude and the system begins to calculate the vehicle's rate of descent, based on its weight, ever-diminishing fuel supply, rocket thrust and lunar gravity. The responses by the viewer/pilot are transformed into a series of complex equations for changing the previously-stored values, whereby a series of readouts corresponding to these parameters is displayed upon the CRT 34. The viewer/pilot starts his landing by depressing a key on the keyboard 30 and guides the imaginary landing vehicle by one of the control sticks 30 to keep a movable spot of light within a cross-hair in the center of the screen of the CRT 34. Straying off-course, for example, results in wasted fuel, delayed landing time, and either an ultimate crash (because the craft ran out of fuel) or an actual "abort" of the mission. The imaginary retrorockets are fired by pressing a further button on the keyboard 30. In the course of the game, even if the ship is kept on-course, there is the risk of descending so rapidly that the vehicle is damaged on impact, which also would be indicated upon the screen of the CRT 34. The various equations for determining the motion and descent of the vehicle are programmed upon the tape storage unit 29, along with control data to execute the arithmetic program whereby the required calculations in response to the viewer/pilot input through the keyboard and stick control 30 are implemented. In this regard, the computing system 10 is able to carry out these calculations with extreme accuracy, even to fourteen decimal places, and also to provide audio responses and warning sounds during the course of the game.

Further, a tape cassette may be programmed to perform library functions to maintain and update inventories, records or financial transactions, personal history files, mailing lists and merchandise catalogues, for example. Typically in such a library-type program, the tape storage unit 29 instructs an appropriate readout of data from the cassette via the cassette interface circuit 28, and RAM 16, to be displayed upon the screen of the CRT 34. The user views the format displayed upon the CRT 34 and operates the keyboard 30 to enter the data or information he wants to store, at a point indicated by a square of light which he moves from left to right upon the CRT 34. As indicated above, an overlay may be disposed over the keyboard 30 whereby a variety of symbols, including numbers, letters, graphic symbols, formulae notation may be entered. In a storage retrieval mode, the computing system of FIG. 1 instructs a readout from the tape storage unit 29 of a large block of data, e.g. as many as 300 pages or 9,600 typewritten lines, can be stored into the RAM 16 for each tape storage unit 29 that would be utilized. Typically, there would be 32 lines/page of stored information and when the list exceeds a page, the display upon the screen of the CRT 34 would begin to "scroll", the topmost lines disappearing off the top of the screen of the CRT 34. For recalling and updating the stored data, the viewer can set up tables of contents and address a selected line of the stored program by moving the cursor under the control of the stick 30 and depressing a special button. To erase and edit words or entire lines, a backspace key of the keyboard 30 is depressed and the new information is typed in. For coding into any of four individual colors, the cursor symbol, as generated by one of the symbol generators 20, is moved by the viewer with his control stick 30 to the desired line and another key is depressed. It is apparent that thousands of items may be listed and the resultant tape storage unit 29 upon which they are stored may be readily transported to distant locations.

In a further application, a tape storage unit 29 may be programmed in a prompt-and-calculate mode to present a diet plan to the viewer. A first image or page of the programmed unit 29 appears upon the CRT 34, having blank portions in the display for receiving vital statistics such as height, weight, circumference of wrist, age and level of activity. The viewer fills in the blanks with the appropriate numbers via the keyboard 30, at which time the next image appears. The second image displays, based upon the previous inputs, the amount of daily caloric intake he should require to maintain his current body weight, and the user then enters his desired or "ideal" weight and selects a diet program from a number of indicated alternative exercises and daily caloric reductions. Upon viewer command, the computing system then calculates the total amount of time required with the selected caloric reduction and exercise. If the viewer is not satisfied, i.e. it is taking too long to achieve the desired weight reduction, the viewer may go back and erase and re-enter new figures into the program. After the second image or page has been completed, a third page is presented with a color-coded graph showing how much the viewer can expect to lose by the specified time, as well as what his weight will be at any given week during the required period. In such a program, the basic equation or algorithm for computing the length of time required to reduce a given weight dependent upon the input of the viewer, is entered into the system 10 via the interface circuit 28 from the tape storage unit 29. The various mathematical calculations to perform the operations indicated by the equation draw upon the arithmethic subroutines stored in the ROM 14.

In the following, a more detailed description will be given of the components of the computing system shown in FIG. 10.

COLOR PROCESSOR 32

The color processor 32 as shown generally in FIG. 1 has an input from the timing system 18 via the timing bus 26 and is further coupled to the input/output data bus 22 whereby data is transferred between the color processor 32 and the RAM 16. Generally, the color processor 32 stores a particular set or palate of colors, from which a particular incremental area is colored. As will be explained, the colors as originally transferred from the tape unit 29 to the RAM 16, are addressed selectively in the RAM 16 by addresses developed by the timing system 18, and/or the color processor 32 to be described below.

As indicated above, the color processor is operative in the first or text mode, or in the second or paint mode.

Referring now to FIG. 5A, there is shown a schematic block diagram of the color processor 32 in which the I/O data bus 22 delivers color command signals to be variously stored in a TEXT mode color address controller 81 or in an art hardware circuit 79. As will be explained in detail later, corresponding address signals are selectively read out and applied via the color pointer bus 78 to the color memory 62, to derive a selected color signal. As seen in FIG. 5A, the color memory 62 is divided into a text memory 62B having eight addressable locations for storing eight colors, from which the image is formed in either the text or paint mode, and a second or symbol memory 62A, into which eight colors may similarly be stored. As will be described, the address or color pointer signals are applied via the color pointer bus 78 and the A or B select address circuit 65 to the color memory 62, to address one of the eight locations within either memory 62A or 62B to read out its corresponding color signal. In an illustrative embodiment of this invention, each of the eight memory locations has room to store eight bits, two bits for each of the primary colors, red (R1, R0), green (G1, G0) and blue (B1, B0), and two spares.

In the second or paint mode, a set of color pointers is transferred from the RAM 16 via the input/output data bus 22 to be stored within the art hardware circuit 79. As indicated above, the images are formed upon the screen of the CRT 34 in the paint mode by deriving a set of color pointers corresponding to each square or dot pattern of the square array as shown in FIG. 5B. In particular, the art hardware 79 derives three color pointers corresponding to the right square, the middle square and the left square, each color pointer being comprised of three bits. It is understood that a series of the square arrays as shown in FIG. 5B are assembled horizontally across the face of the screen of the color CRT 34 to form a text line of for example 96 such squares and that a plurality of such text lines for example 64 is formed down the screen of the color CRT 34 to display a color image. First and second RAM addresses are developed by the timing system 18 to be applied via the RAM address bus 24 to the RAM 16 to read out during the first and second look-ups, the first and second groups of color pointers to provide the three color pointers, one for each square of the square array as seen in FIG. 5B. In particular, during the first look-up, the following set of color pointers is transferred to a memory or latch 66 of the art hardware circuit 79; the color pointers take the following form:

|  | MSB |  |  | PPS Word |  |  | LSB |  |  |
|---|---|---|---|---|---|---|---|---|---|
|  | 8* | 7 |  | 6 | 5 | 4 | 3 | 2 | 1 |
| 1st look-up | c2 | c1 | c0 | b2 | b1 | b0 | a2 | a1 | a0 |
|  | right dot pair |  |  | middle dot pair |  |  | left dot pair |  |  |

The bit c2, designated with an asterisk, of the right dot or square pointer is not derived during the first look-up, but instead is derived during the second look-up of the pointers within the RAM 16, and is combined with the remaining eight bits (c1 to a0) as indicated above to form the complete three pointers for each of the squares of the square array as shown in FIG. 5B. In particular, the bits a0, a1, and a2 are derived during the first look-up to provide a pointer for the left dot pair or square, the bits b0, b1 and b2 are derived during the first look-up to provide the pointer for the middle dot pair or square, and only the bits c0 and c1 are derived during the first look-up to derive a portion of the pointer for the right dot pair or square as shown in FIG. 5B. As will be explained in some detail later with respect to FIGS. 27A and 27B, the RAM address for the first look-up in the paint mode, is comprised of the following fourteen bits:

|  | Page | Word |
|---|---|---|
| Address of 1st look-up | [P6 P5 P4 P3 P2 P1 P0 | W6 W5 W4 W3] W2 W1 W0 | of which those eleven bits disposed within the bracket form the page and word address for the RAM 16 to read out therefrom the above-given first look-up of data, while the three bits, W2, W1 and W0, are applied via the RAM address bus 24 to a ninth bit select latch 73 to determine, as will be explained, which of the eight c2 bits as derived during the second look-up, are to be combined with the first eight bits obtained during the first look-up to obtain the complete three pointers. In particular, the ninth bit select latch 73 acts as a decoder to apply a control signal to one of eight select circuits 74 to apply the selected ninth bit to the ninth bit latch 69.

The art hardware circuit 79 and in particular the timing of the transfer of signals to and from the circuit 79, is under the control of an art controller 80, into which the timing signals in the form of the dot clock as applied via conduit 26C of the timing bus 26, a text mode disable signal and the output of the character counters as applied via conduit 26C from the timing system 18. The art controller 80 provides a first strobe that is applied to the first latch 66 and to the ninth bit latch 69, to be described, thus enabling the latches 66 and 69 to receive color pointers during the first and second look-ups, respectively. The additional ninth bit c2 of the right dot pointer is required to identify the color for the third square, and during the subsequent or second look-up, the following color pointer bits are obtained:

2nd look-up c28 c27 c26 c25 c23 c22 c21

The color pointer bits c2 are then loaded into the ninth bit latch 69, and are transferred to a third color block driver 72 to complete the three sets of color pointers. In order to appropriately display a color associated with the square of a square array, the art controller 80 strobes the first, second and third drivers 68, 70 and 72, as well as the one-of-eight select circuit 74, whereby the color pointers corresponding to the left, middle and right dot pairs are transferred via a color pointer bus 78 and the select address circuit 65 to address the color memory 62. As indicated above, the color pointers C21 to C28 provide the ninth bit for eight first look-ups, the bit C21 being that ninth bit for the first of the first look-ups, and the bit C28 being the ninth bit for the eighth, first look-up. As will be explained in detail later with respect to FIGS. 27A and 27B, the RAM address of the second look-up is formed by the timing system 18 as follows:

Address of 2nd look-up 0 0 0 0 0 1 P3 P2 P1 P0 W6 W5 W4 W3

By comparing the RAM address of the second look-up and that of the first look-up, it is seen that the second look-up is formed by merely shifting the bits of the first look-up to the right and using the selected bits P3, P2, P1, P0, W6, W5, W4 and W3 to address a second portion of the RAM 16.

In the first or text mode, the color processor 32 may operate either in a LOAD NEW COLOR POINTERS process whereby new color pointers are loaded into a color pointer latch 82 of the text mode color address controller 81, or in a PAINT DOT process to address the previously-loaded color pointers therein, whereby the selected color pointers are read out via enabled drivers 84, the color pointer bus 78 and the select address circuit 65 to address selected color signals within the text memory 62B.

The timing signals for enabling the selective actuation of the controller 81 and the hardware circuit 79 take the form of the dot clock, as shown specifically in FIG. 3A, the text mode signal, the output signals CC1 to CC6 of the character counter of the timing system 18, as shown in FIG. 3F, the output signals VC1 to VC9 of the vertical counters of the timing system 18 as shown in FIG. 4A, and other signals as will be described. The conduit for delivering these signals from the timing system 18 is shown generally in FIG. 1 as a timing bus 26 interconnecting the timing system 18 and the color processor 32; in FIG. 5A, these conduits will be more specifically identified. In either the PAINT DOT process or LOAD NEW COLOR POINTERS process, a display strobe is applied to the select address circuit 65 to enable the color pointer bus 78 to address the color memory 62.

The loading of color data and in particular the color signals into the color memory 62 from the RAM 16 is accomplished via the I/O data bus 22 into the memory 62 during the vertical scan I/O time slot as shown in FIG. 3H. In particular, the output of the vertical counter is applied via the timing bus 26A to the A or B select address circuit 65, as enabled by a load strobe applied thereto, to selectively address those locations within the memory 62 to receive the corresponding color signals applied thereto via bus 22. In this regard, the output of the vertical counter also is applied to the RAM 16 as an address signal to address those selected portions within RAM 16 to read out therefrom the color signals to be loaded into the memory 62.

In either the PAINT DOTS PROCESS or the LOAD NEW COLOR POINTERS process of the text mode, a RAM address signal developed by the timing system 18 is applied to the RAM 16. An indirect address is read out in response thereto from a first portion of the RAM 16, as shown in FIG. 1, during the CHAR time slot as shown in FIG. 4J, and is re-applied to the timing system 18. The bits of the RAM output forming the indirect address appears as follows:

1st look-up R1, a6 a5, a4, a3, a2, a1, a0

The timing system 18, as will be explained in detail later, adds to the result of the first look-up a binary signal indicative of the text line of the characters being displayed (see FIG. 2), which provides a RAM address identifying a second portion of the RAM 16, to be read-out during the second look-up as identified by the time slot DOT as seen in FIG. 4J. If it is desired to paint dots, i.e. the PAINT DOTS PROCESS, the bits of a second address are read out as follows:

2nd look-up R2 R3 d6, d5, d4, d3, d2, d1

The above data of the second look-up are applied to a latch controller 90, of the text mode color address controller 81, which initially reviews the R3 control bit to determine whether the color processor 32 is to be operated in the PAINT DOT process or LOAD NEW COLOR POINTERS process. In particular, the sixth and seventh control bits of the second look-up, designated R2 and R3 and, the seventh bit of the first look-up, i.e. R1, are used as control bits, and all three of these control bits are applied via the conduit 91 to the latch controller 90. The latch controller 90 acts as a logic circuit to interpret the instructions as provided by the control bits R1, R2 and R3. The controller 81 further includes a latch and parallel to serial convertor 88 that acts as a foreground/background decoder whereby the color pointers of these portions of the displayed image, as shown generally in 5C, may be identified. In FIG. 5C, there is shown a character "A" which is colored with a foreground color against a particular background color surrounded by an edge of a still different color.

Generally, if the controller 90 detects a zero R3 control bit, the latch controller 90 will then operate the text color address controller 81 in the PAINT DOTS process in the following fashion. The latch controller 90 actuates the converter 88 to strobe in and store the above d6 to d1 given results of the second look-up. In turn, the latch controller 90 strobes out in serial fashion at the rate of the dot clock DCLK the previously-entered bits to be applied via an exclusive OR gate 86 to the latch controller 90. The latch controller 90 receives the data of the second look-up derived from the latch 88 and acts as a decoder for energizing selectively one of the foreground or background drivers 84, thereby to apply the corresponding color pointers that have been stored previously into the latch color pointer 82, via color pointer bus 78 and the select address circuit 65 to address and to read out from the addressed location of the text memory 62b, the selected color signals. In particular, the bits d1 to d6 as read out from the latch 88 through the exclusive OR gate serve as control signals to the latch controller 90, whereby upon receipt of a "1" bit, a latch enable signal is generated by the controller 90 and applied via conduit 95B to enable the foreground driver, whereas in response to a "0" bit, an enable signal is generated by the controller 90 and applied via the latch 94A to enable the background driver. In this manner, the previously-stored color pointers of the foreground and background are read out through selectively actuated drivers and applied to the color pointer bus 78.

In the text mode, the color pointers for each of the background, edge and foreground portions of the image as shown in FIG. 5C are formed of but two designated bits, shown as follows:

| Pointers | | | | | | Color Memory |
|---|---|---|---|---|---|---|
| Edge | | Background | | Foreground | | Address |
| e1 | e0 | b1 | b0 | f1 | f0 | |
| 1 | 1 | — | — | 1 | 1 | 7 |
| 1 | 0 | — | — | 1 | 0 | 6 |
| — | — | — | — | 0 | 1 | 5 |
| — | — | — | — | 0 | 0 | 4 |
| — | — | 1 | 1 | — | — | 3 |
| — | — | 1 | 0 | — | — | 2 |

-continued

| Pointers | | | | Color Memory |
|---|---|---|---|---|
| Edge | | Background | Foreground | Address |
| 0 | 1 | 0 | 1 | — | — | 1 |
| 0 | 0 | 0 | 0 | — | — | 0 |

As indicated above, the foreground pointer is partially formed of those two bits f0 and f1 as indicated, and the third bit f2 (not shown above) is selected as a "1". Thus, the color pointer for the foreground could illustratively be 111 to address that color signal within that location of the text color memory 62b. Similarly, the background color pointers b0 and b1 are combined with a preselected bit b2 of "0" to address those locations within the text color memory 62b, while the edge bits e1 and e0 are combined with a bit e2 which is either a "0" or a "1" in order to be the same as e1. In this manner, a limited amount of data permits each of the edge, background and foreground portions of the image as shown in FIG. 5C to be colored with any one of four colors.

As indicated in FIG. 5A, the latch controller 90 also reviews the R1 and R2 control bits and in its PAINT DOT process, where the R3 bit is 0, the controller 90 is armed upon reciept of the first look-up signals wherein there is a "1" R1 signal, and upon receipt of a subsequent signal wherein R2 is "1" and R1 is a "1", the latch controller 90 applies the DOT invert signal as a "1" to EXCLUSIVE OR 86, which inverts the data (d6 to d1) being shifted from latch 88. When either R1 or R2 is a "0", the DOT invert signal is a "0" and the data shifting from latch 88 is not inverted by the EXCLUSIVE OR 86. The output of EXCLUSIVE OR 86 selectively enables the foreground driver if a "1" or the background driver of a "0". R1 and R2 can thereby be used to reverse the background and foreground portions of an image being displayed using the PAINT DOT process.

In the LOAD NEW COLOR POINTERS process, the control bits from the first and second look-ups are also applied to the latch controller 90, and if the control bit R3 is a "1", the latch controller 90 operates the text mode color address controller 81 in the LOAD NEW COLOR POINTERS process as follows. In particular, the controller 90 causes the six least significant bits of the second look-up reproduced as follows, to be loaded into the color pointer latch 82:

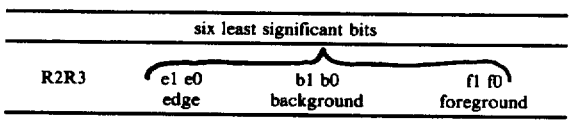

| | six least significant bits | | |
|---|---|---|---|
| R2R3 | e1 e0 <br> edge | b1 b0 <br> background | f1 f0 <br> foreground |

As seen above, the two least significant bits f1 and f0 of the second look-up identify a portion of the foreground color pointer, whereas the next two bits b1 and b0 define a portion of the background color pointer, and the 5th and 6th significant bits e1 and e0 identify a portion of the color printers for the edge portion. The third bits f2, b2 and e2 of these pointers are preselected in the manner indicated bove. These aforementioned bits are first applied to and stored in the latch 82, to be transferred to the color pointer bus 78 by the drivers 84 in accordance with the strobe signals developed by the latch controller 90. In the LOAD NEW COLOR POINTERS process, the latch controller 90 responds to the following sets of conditions. If the control bits R1, R2, R3, as derived during the first and second look-ups are "0", "0" and "1", respectively, the latch controller 90 stores the new bits (e1, e0, b1, b0, f1, f0) into the latch 82 and permits the shifting of zeros into latch dots 88, applies the zeros via the non-inverted, EXCLUSIVE OR gate 86, and paints them with the new background color pointers b1 and b2, as by strobing via conduit 95a the background drivers 84. As a result, the background color pointers stored in latch 82 are applied by the actuated background driver of the drivers 84 to the memory 62.

If the control bits R1, R2 and R3 are, respectively, "1", "0" and "1", the latch controller 90 stores the new bits into the latch 82 and energizes the foreground driver of the drivers 84 to apply the foreground corresponding f1, f0 pointers to the text memory 62B. In similar fashion, if the control bits R1, R2 and R3 are respectively "0", "1" and "1", the latch controller 90 first stores the new bits into the latch 82 and energizes the edge driver of drivers 84 as via conduit 95C, to apply the new edge color pointers e1, e0 via the color pointer bus 78 to the text memory 62B. In a still further operation, if the latch control bits R1, R2 and R3 are respectively "1", "1" and "1", the controller 90, after loading the new bits, then is enabled to modify the existing set of color pointers, the controller 90 acts to toggle the least significant bit of the foreground and background pointers within the register 82 and further applies the actual six-bit code or dots, i.e. d6-d1, via the drivers 84, the bus 78 and the select address circuit 65 to the text memory 62B.

As indicated above with respect to the description of FIG. 1, there is provided symbol generators 20 that permit the display of special characters such as a cursor for particularly identifying a designated point of the CRT display. In order to selectively apply colors to the symbol portion of the CRT display, a set of tri-state generator drivers 76 permit the timed transfer of color pointers corresponding to that symbol via the color pointer bus 78 and an enabled selected address circuit 65 to the symbol memory 62A of the color memory 62, whereby the desired color is addressed and is read out via the latch 64 to be applied to the interface circuit 33. The symbol memory portion 62A stores in selected portions thereof the library or palette of colors to be applied to color the displayed symbol.

An alternate mechanization of the preferred embodiment of the text mode described above incorporates a larger text color memory, for example sixteen words of 8-bit length, which is addressed by a color pointer developed from the first and second look-up control bits R1, R2 R3 in addition to the first look-up data bits d1-d6. In this mechanization, there is only one process, the PAINT DOT process, whereby the data d1-d6 are always gated into latch 88. The INVERT DOT signal is always false precluding the inverting of data by EXCLUSIVE OR gate 86. A color printer is formed from the bits R1, R2, R3, di, where di refers to the six data bits d1-d6 as they are successively shifted from the latch 88. This 4-bit color pointer is applied to an expanded 4-bit color pointer bus 78 connected to a similarly-expanded select address circuit 65 which in turn is used to address the expanded text color memory 62B.

With reference now to FIGS. 6A to 6D, there is shown a detailed schematic circuit of the color process as shown diagrammatically in FIG. 5A. With respect to FIGS. 6A, B and C, data is transferred via bus 22 to load the color memory 62 comprised of two tri-state memory devices, to the symbol generator drivers 76 (see FIG. 6D) comprised of tri-state drivers and the art controller 80 (see FIG. 6B) also comprised of tri-state drivers. Data is also transferred to the color memory 62 comprised of separate memory units and connected to the A or B select address circuit 65 (see FIG. 6C), and to the latch 66 (see FIG. 6D). Further, the specific circuitry of the latch controller 90 is illustrated in FIG. 6E. The latch controller 90 is shown as being coupled to receive data via the bus 22 for controlling the drivers 84, as explained above. In addition, the drivers 72, 70 and 68 (see FIG. 6E) are connected to the pointer bus 78 for conveying data to the color memory 62. Further, the one-of-eight select circuit 74 is likewise coupled to the bus 78. As shown in detail in FIG. 6C, the latch 66 is connected to receive data from the I/O data bus 22 and is coupled to the drivers 72, 70 and 68.

VIDEO INTERFACE CIRCUIT 33

Figure 7A:
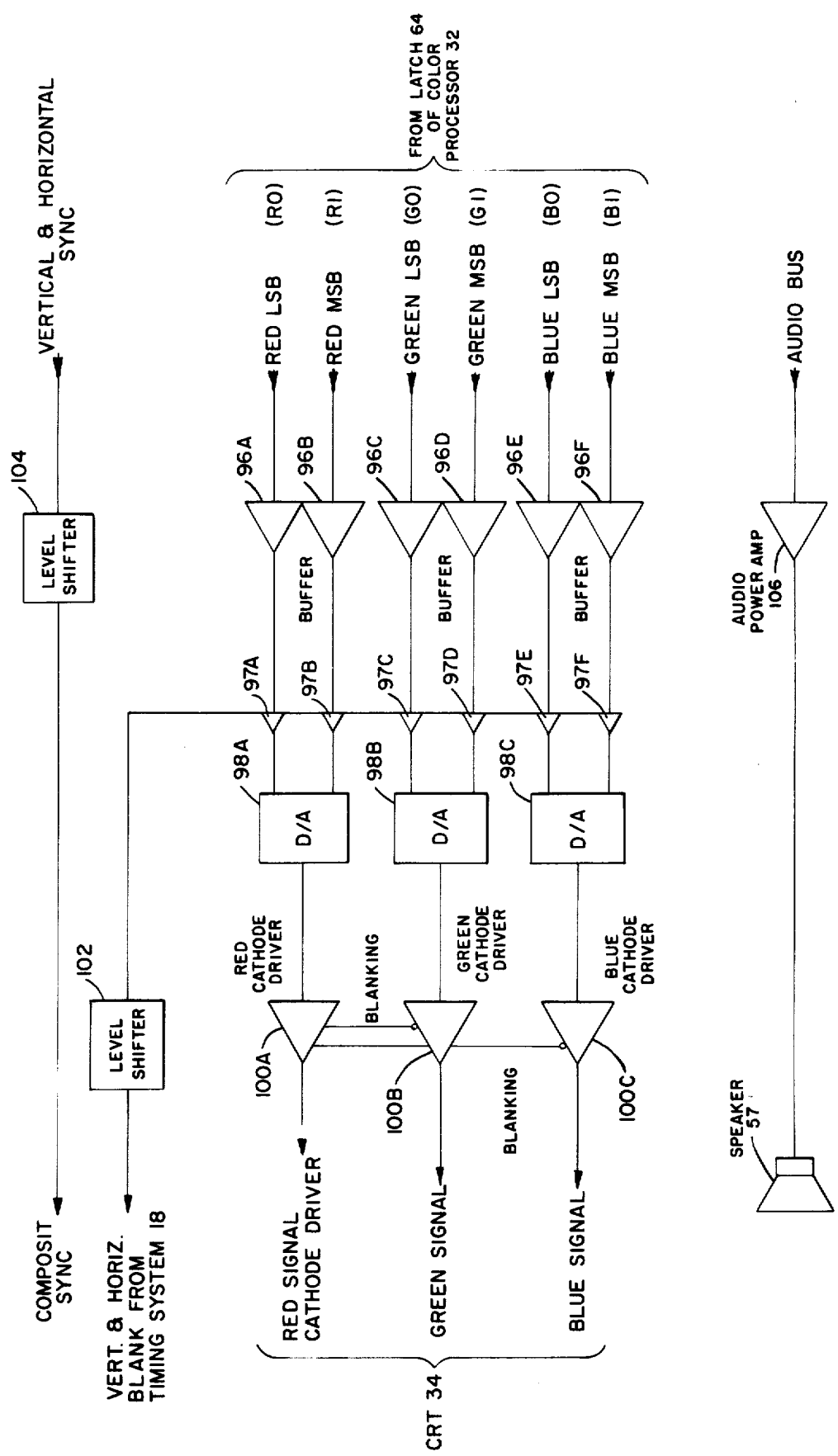
Figure 7B:
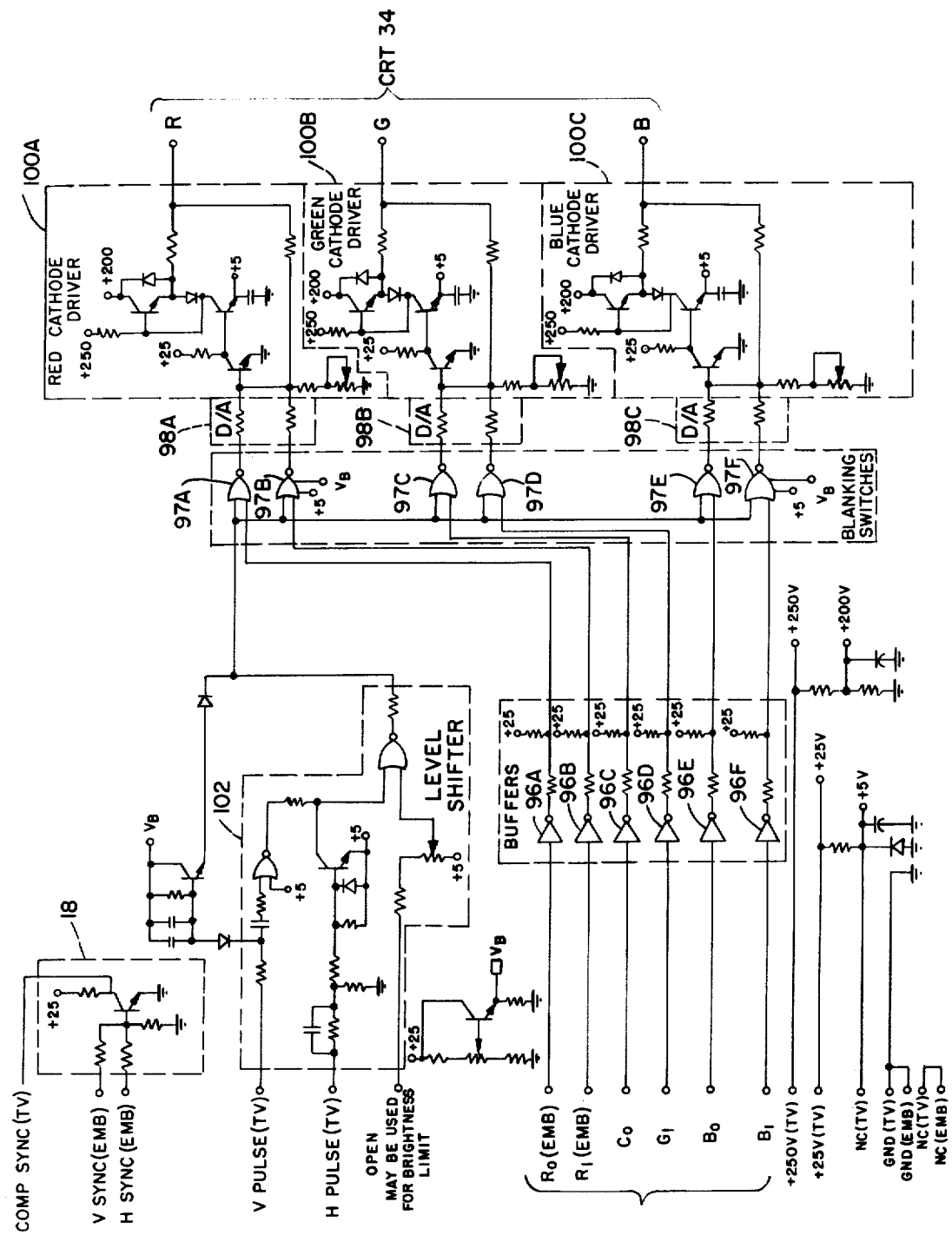

In FIG. 7A, there is shown a schematic block diagram of the video interface circuit 33 generally shown in FIG. 1 as interconnecting the output of the color processor 32 to a color CRT 34, and in FIG. 7B, there is shown a detailed circuit diagram thereof. With reference to FIG. 7A, the output of the latch 64 of the color processor 32 as shown in FIG. 5A, comprises two signals R0 and R1 indicative of red, two signals G1 and G0 indicative of green, and two signals B0 and B1 indicative of blue. These color signals are applied via buffer amplifiers 96A to 96E, and enabled gates 97A to 97F to digital-to-analog (D/A) converters 98A, 98B and 98C, with the red signals being applied to the D/A converter 98A, the green signals being applied to the D/A converter 98B, and the blue signals being applied to the D/A converter 98C. The gates 97 are disabled by a blanking signal as derived from a level shifter 102. As generally shown in FIG. 7A, vertical and horizontal blanking information is derived from the timing system 18, whereby the corresponding red, green and blue signals are disconnected from the color CRT 34. The D/A converters 98 convert the inputted, digital color signals to analog signals which are applied via a corresponding cathode driver or amplifier 100 to a cathode of the electron gun of the color CRT 34, i.e. the output of the red cathode driver 100A is applied to the cathode of the red electron gun. The level shifter 102 also provides appropriate horizontal and vertical blanking signals to the drivers 100A, 100B and 100C thereby to disable the output during the horizontal and vertical blanking of the color CRT 34. As also shown, the audio bus is connected via an audio power amplifier 106 to the speaker 59. FIG. 7B shows the detailed circuitry of the elements generally shown in FIG. 7. In particular, the detailed circuitry of the cathode drivers 100 is set out, and similarly the details of the level shifter circuit 102 responsive to the horizontal and vertical timing information are shown.

SYMBOL GENERATOR

Figure 8:
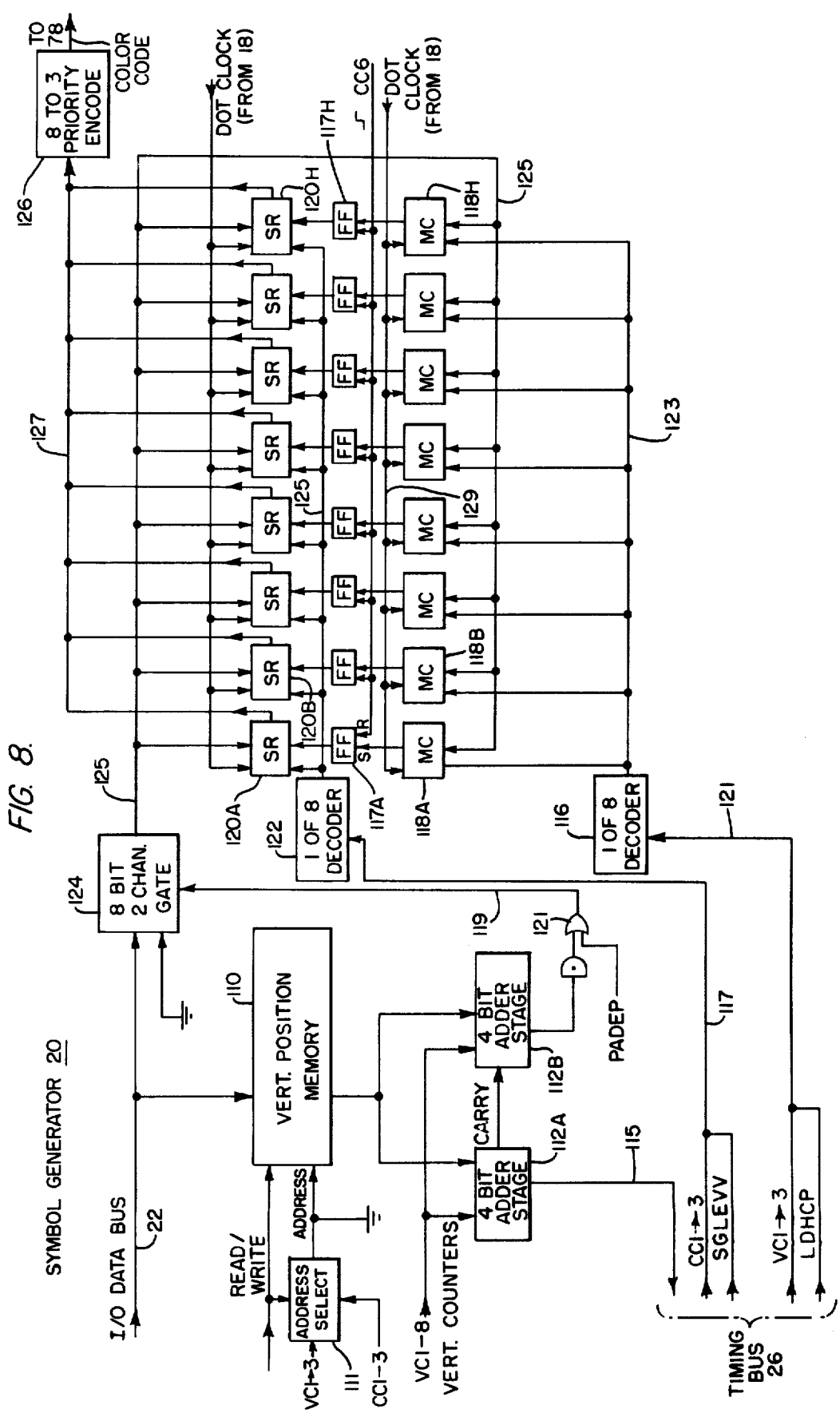
FIGS. 8 and 9A, B and C are, respectively, schematic drawings of the symbol generator as shown in FIG. 1, in the form of a functional block diagram and in the form of a detailed circuit schematic.
Figure 9A:
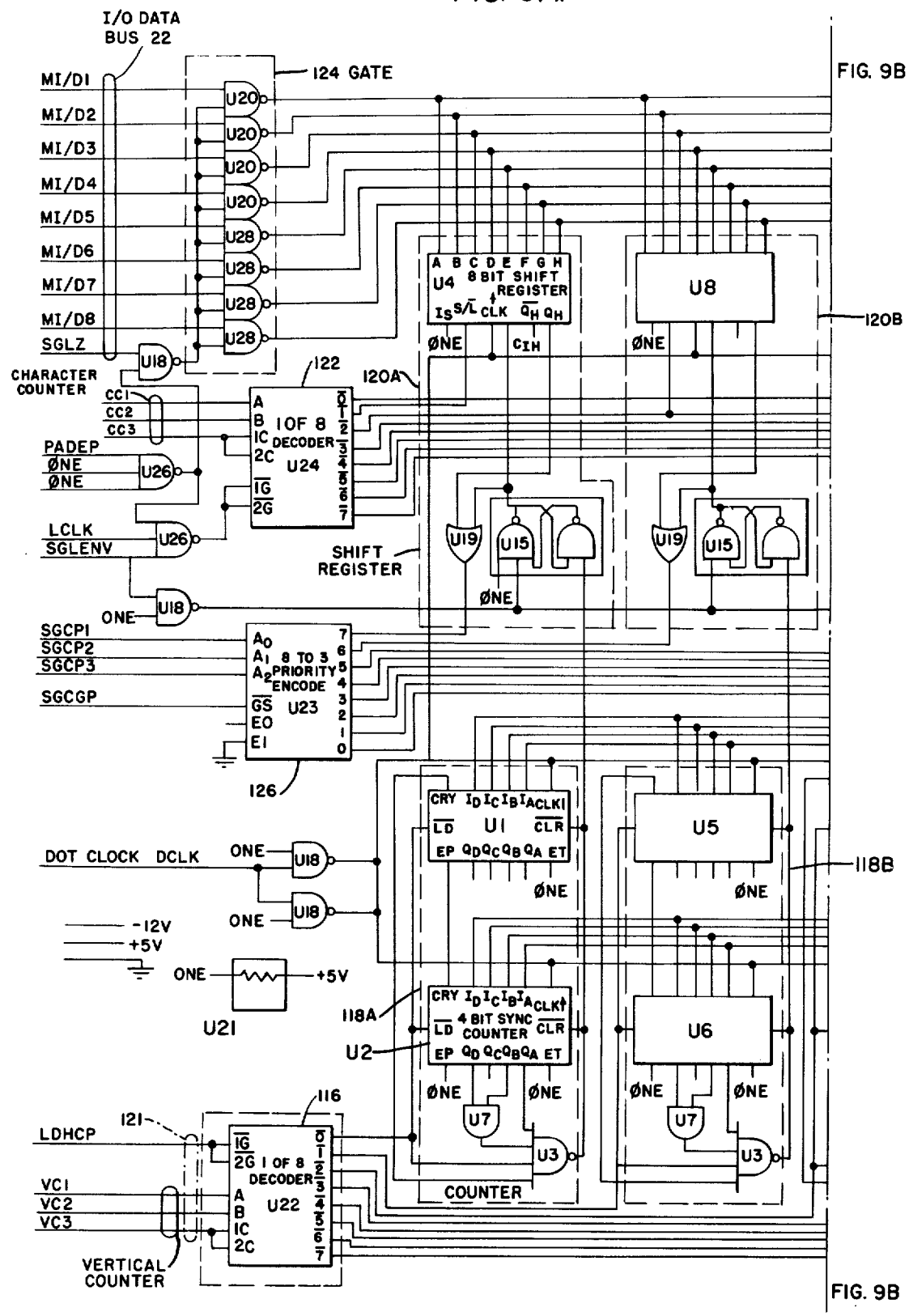
Figure 9B:
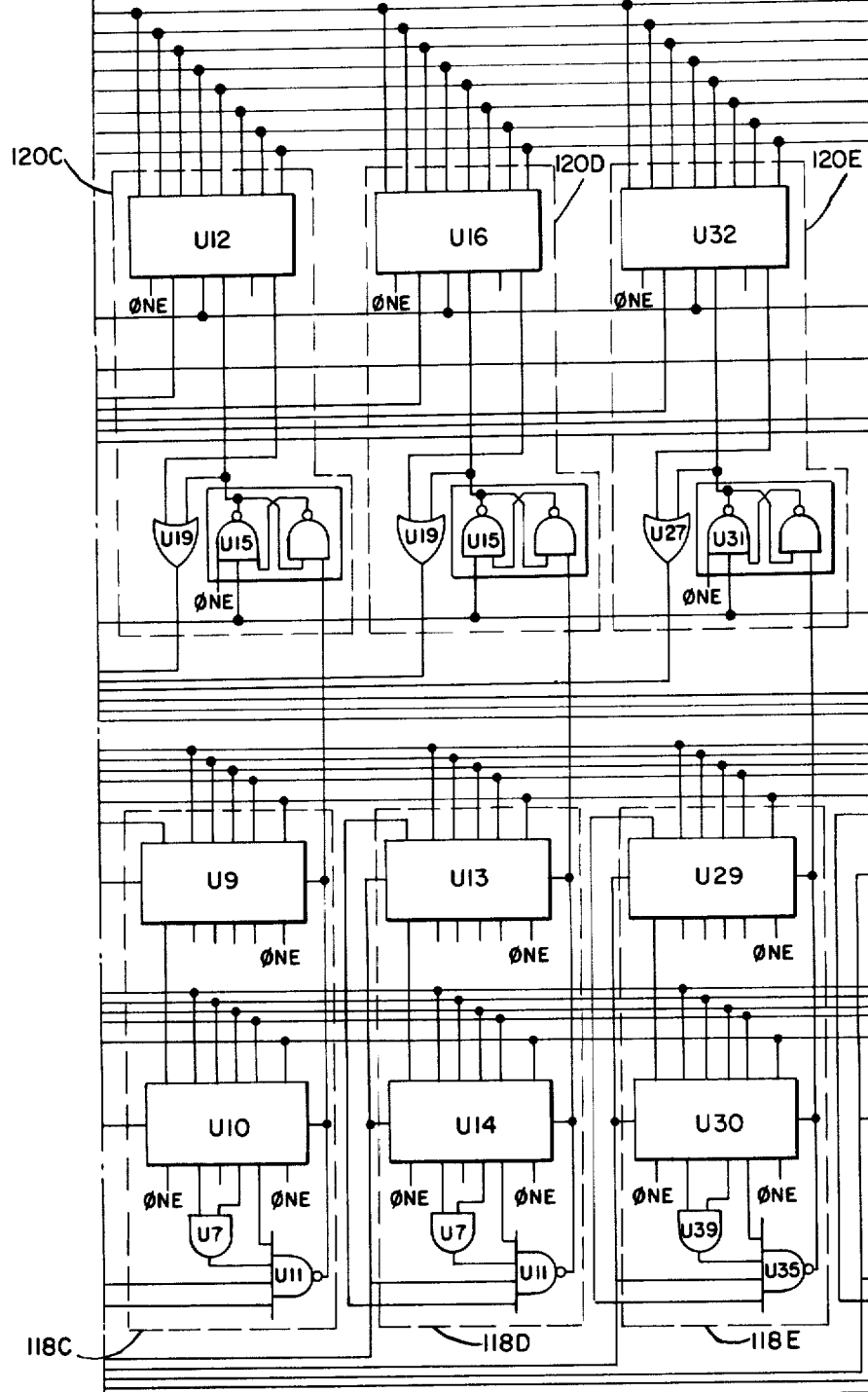
Figure 9C:
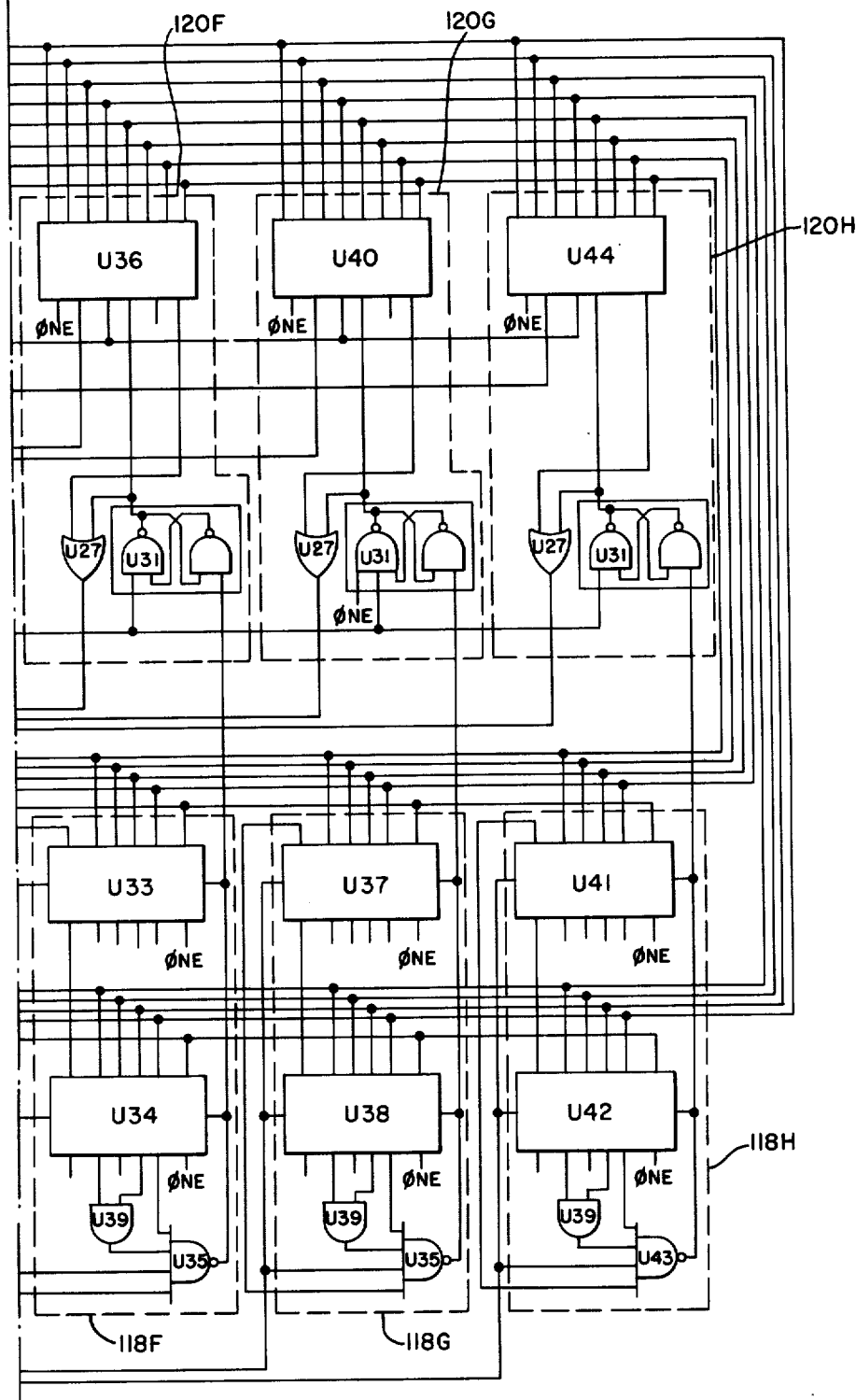

In FIGS. 8 and 9A, B and C, there is shown, respectively, a schematic diagram and a detailed circuit diagram of the symbol generators 20, generally shown in FIG. 1. Referring to FIG. 8, data in the form of the dot patterns to be used for each of eight different symbols, is conveyed from the RAM 16 by the I/O data bus 22 to a gate 124. As will be explained, the enabled gate 124 applies via conduit 125 the dot patterns corresponding to eight symbols, into corresponding memories in the form of serial registers 120. In particular, the gate 124 either gates the dot pattern from the I/O data bus 22 or applies an all-zero word if a dot pattern does not appear on this particular horizontal line. The dot patterns are applied to serial registers 120A to 120H, and loaded into selected registers 120, under control of a one-of-eight decoder 122, to which the outputs of the character counters of the timing system 18 are applied, those outputs being illustrated in FIG. 3F. Enable signals, derived as will be explained in detail later, are applied via conduit 119 to enable the gate 124 to apply the dot patterns to the conduit 125 during selected time slots within the horizontal retrace interval, identified in FIG. 3H by the notations "SG 1 DOTS" to "SG - DOTS". The enable signals are developed at specific vertical line counts corresponding to that vertical position at which the corresponding dot patterns of a character are to appear in the image as displayed upon the screen of the color cathode ray tube 34. Manifestations indicative of the initial vertical position at which the dot patterns are to be displayed for each of the serial registers 120A to 120H are stored in a vertical position memory 110 and upon occurrence of a vertical count corresponding to the stored position, an enable signal is developed and applied via conduit 119 to the gate 124. The character counter outputs CC1-3 are applied as control or address signals via a conduit 117 to the one-of-eight decoder 122 to selectively enable in a sequential manner the serial registers 120A to 120H to receive and to store the dot patterns applied to the bus 125.

The dot patterns are configured to display a particular symbol, illustratively stored in RAM 16, dependent upon the presentation stored upon the storage unit 29. For example, in a war game presentation, it is desired to store in one of the serial registers 120 an image of a tank or perhaps some other war artifact. Such symbols may be read out from the storage unit 29 and initially stored in the RAM 16, as shown in FIG. 1, and upon command are transferred from the RAM 16 via the I/O data bus 22 and the gate 124 to the serial register(s) 120 as selected by the one-of-eight decoder 122.

Further, the manifestation of the initial vertical positions of each of the eight symbols to be stored within the registers 120, is stored within the vertical position memory 110. In particular, the manifestations are applied via the I/O data bus 22 to the memory 110, which is comprised of eight word memories, one for each vertical position manifestation so stored. The addressing of the entry of the vertical position manifestations into the eight word memories of the memory 110 is under control of the output signals VC1-3 of the vertical counter as applied to an address select circuit 111, which is set by the write signal to respond to the vertical count signals. The vertical position memory 110 is so addressed to receive the vertical position signals during the vertical scan input/output time slot of each horizontal retrace period, as shown in FIG. 3H, within the time slots 216 to 224 of the vertical retrace as shown in FIG. 4C. In this regard, it is understood that the output of the vertical counts VC1-3 also is applied to address the RAM 16 to read out the vertical position manifestation and to apply same via the I/O data bus 22 to the memory 110.

As shown in FIG. 8, the vertical position manifestations as stored in the memory 110 are compared, in effect, with the output of the vertical counters VC1-8 by an eight-bit adder 112, which illustratively is divided into four-bit adder storage 112A and a four-bit adder stage 112B, with a carry signal being applied from the stage 112A from which the four least significant bits are derived, to the stage 112B from which the four most significant bits are obtained. The adder stage 112B addes, generally, the vertical position manifestation to the current vertical output VC1-8 derived from the vertical counter, to derive an enabling signal applied via an inverter, an OR gate 121 and the conduit 119 to the gate 124. In particular, in order to read data from the memory 110, the read signal is applied to the address select circuit 11, which in response thereto uses the output of the character counter CC1-3 to address a selected one of the eight memory locations within the memory 110 to read out the corresponding vertical position manifestation and to apply same to each of the stages 112A and 112B. The adder 112 is a 256 Modulo Adder, and upon achieving a sum of 240-255, i.e. the vertical position manifestation plus the output of the vertical counters VC1-8, its four most significant outputs from the stage 112B are rendered all l's, whereby an enable signal is applied via the conduit 119 to enable the gate 124. At the same time, the four least significant bits, as derived from the stage 112A, are applied via the conduit 113 of the timing bus 26 to the RAM 16, and in conjunction with the outputs of the character counter CC1-3 form an address to the RAM 16, whereby the dot patterns are read out and applied via the data bus 22, the enable gate 124 and the conduit 125 to the serial registers 120. In addition, as explained above, the same outputs of the character counter CC1-3 are applied to the one-of-eight decoder 122 to select the serial register 120 in which to load the dot pattern.

In addition, the initial horizontal position within a selected line at which the symbol is to be developed, is stored in a similar fashion into a plurality of modulo 252 counters 118; there being eight modulo 252 counters, 118A to 118H, one for each seria register 120A to 120H. In particular, during the vertical retrace, signals indicative of the initial horizontal positions in the form of count signals, are applied via the I/O data data bus 22, the enabled gate 124 and the conduit 125 to selected of the modulo 252 counters. In particular, a PADEP signal, as shown in FIG. 3C, is applied via the OR gate 121 and conduit 119 to enable the gate 124, to apply count signals as derived from the RAM 16 via the I/O data bus 22, enabled gate 124 and conduit 125 to one of the modulo counters 118A, selected in accordance with the output of a one-of-eight decoder 116. As shown in FIG. 8, the output of the vertical counter VC1-3 is applied via conduit 121 to address the one-of-eight decoder 116 to selectively enable one of the modulo counters 118A to 118H, to receive and store therein its count signal indicative of the initial horizontal position at which the dot pattern according to a selected symbol is to be generated. In this regard, it is noted that the output of the vertical counter VC1-3 also is applied to the RAM 16 to address a selected portion therein from which the horizontal count signals are derived and applied via the I/O data bus 22, the enabled gate 124 and the conduit 126 to a selected one of the modulo 252 counters 118A to 118H. The timing of the enable signal is under the control of the PADEP signal, as shown in FIG. 3C, which enables the gate 124 during the vertical retrace period and in particular during the vertical scan I/O time slot within the horizontal retrace as shown in FIG. 3H.

In operation during the display of an image upon the color CRT 34, the dot clock, as shown in FIG. 3A, is applied via conduit 129 to increment each of the modulo 252 counters 118A to 118H, the dot clock providing an output corresponding to the timing of the scan of the CRT electron beam across each dot or incremental portion of the horizontal line. As each modulo 252 counter 118 counts up, it will eventually reach its reset count, e.g. 251, at which time it generates a set signal to be applied to its corresponding flip-flop of a plurality of flip-flops 117A to 117H, one for each of the modulo counters 118 and serial registers 120. The set signal sets the corresponding flip-flop 117 to generate a shift initiate signal to be applied to its corresponding serial register 120 whereby the previously-entered dot pattern, i.e. 8 dots, is serially read out under the control of the dot clock, and applied via the conduit 127 to an 8 to 3 priority encode circuit 126. The encode circuit 126 gives priority to those registers 120 whose subfixes are in the beginning portion of the alphabet, with highest priority given to the output of serial register 120A. It is understood that the conduit 127 is made up of eight separate inputs to the encode circuit 126 and that the encode circuit 126 generates, in response to the output of each serial register 120, a color pointer to be applied via color point bus 78 to the generator color memory 62A to address a specific location therein to read out its corresponding color signals.

In addition, in the presence of an output as derived from the encode circuit 126, i.e. dot patterns as derived from one of the symbol generators 20, the application of color pointers in either the text or paint modes of operation is suppressed.

Referring now to FIGS. 9A, B and C there is shown a detailed circuit diagram of the symbol generators 20 as schematically shown in FIG. 8. As indicated above, the I/O data bus 22 loads data in terms of the DOT patterns, and the initial vertical positions via the gate 124 into the shift registers 120. As indicated in FIG. 9A, the gate 124 comprises a plurality of NAND gates selectively interconnected. In addition, the output of the vertical counters is supplied via a one of eight decoder 122 to time the loading of the dot patterns into the shift registers 120. The output of the shift registers 120 is read out by actuating signals derived from the modulo 252 counters 118 and supplied to a decoder 126. Further, the details of the modulo 252 counters are shown in FIG. 9A, B and C and are actuated to receive counts from the I/O data bus 22 by actuating signals derived from the one-of-eight decoder 116, which in turn receives timing signals from the output of the vertical counter via conduit 121.

KEYBOARD/STICK CONTROL

Figure 6A:
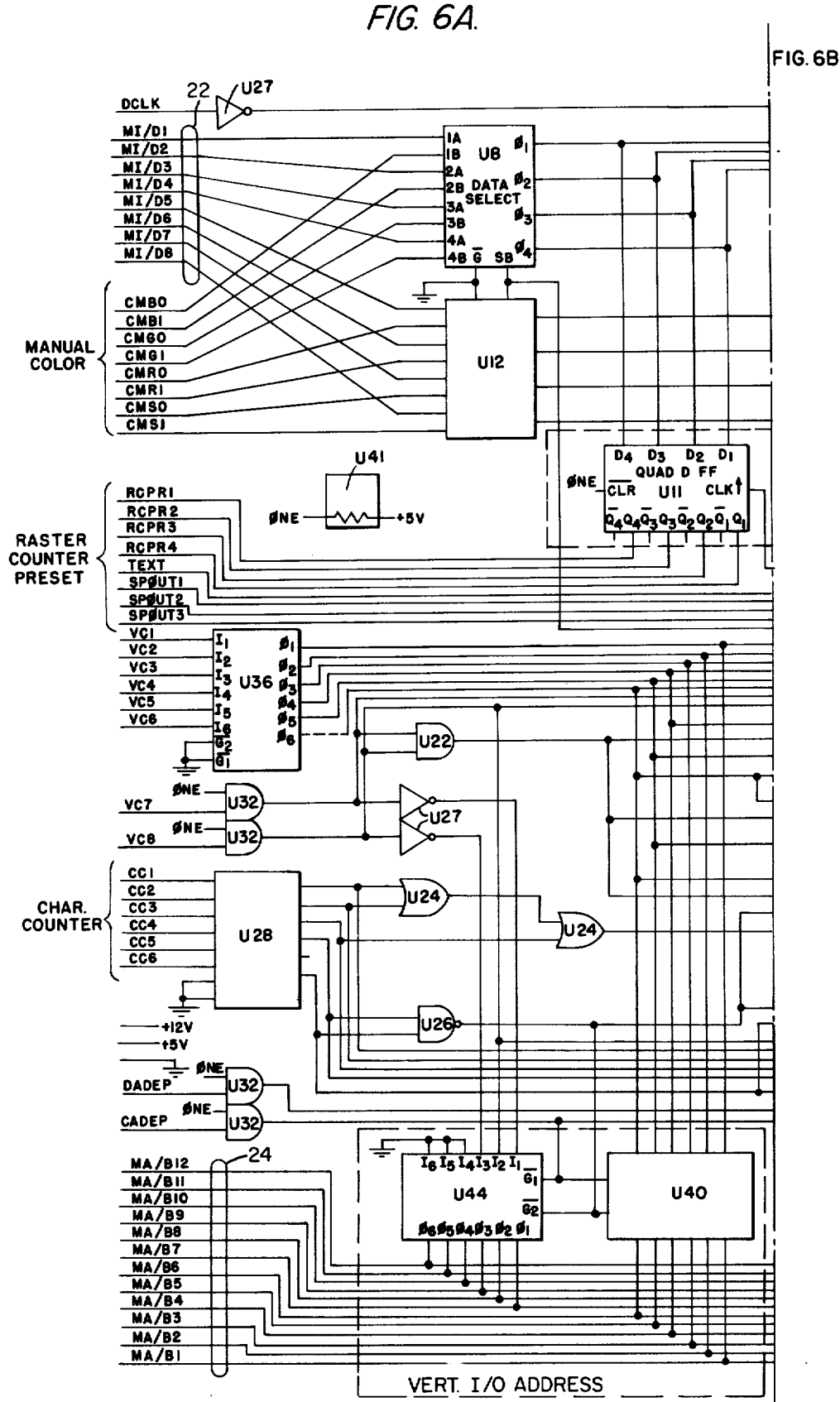
Figure 10:
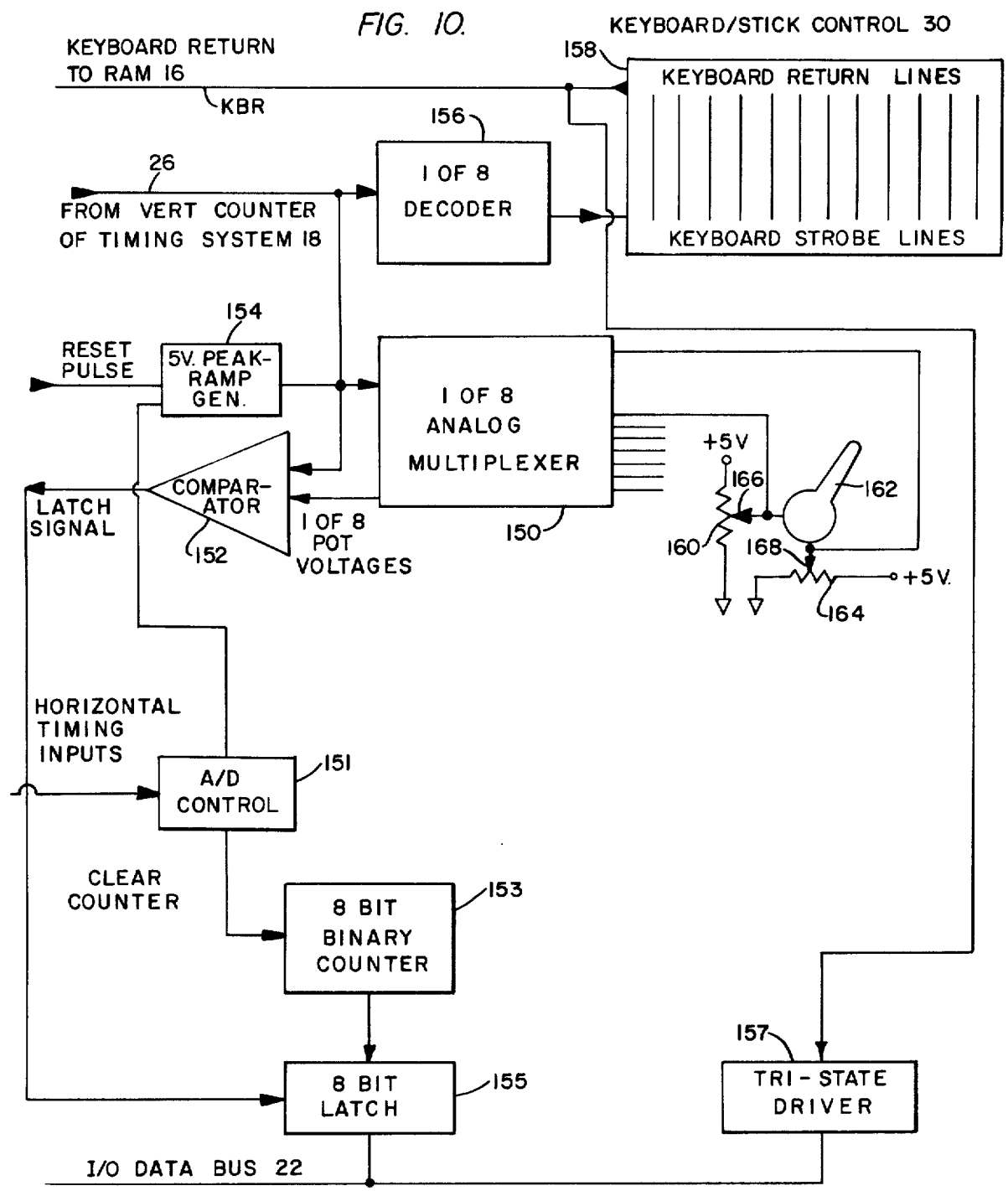
FIGS. 10 and 11 show schematic drawings of the keyboard and the control stick and its associated circuitry, in the form of a functional block diagram and in the form of a detailed circuit schematic, respectively.

In FIG. 10, there is shown the keyboard/stick control 30 whereby viewer input as by manipulating a keyboard 158 or a joystick 162 are put into the system. In particular, the keyboard 158 is comprised of a matrix of intersecting horizontal and vertical conductors over which is placed on overlay designating for the viewer the significance of the array of switches as formed by the points of intersection of the horizontal and vertical conductors. In this regard, it is understood that the system may be programmed to input different types of information dependent upon the presentation as stored upon the storage unit 29; for example, in an educational presentation such as that described above to teach younger children, the sounds and use of the letter "b" in various words, the overlay takes the form of lettered keys, whereby the viewer may put various words into the system. In operation, each of the horizontal conductors forming the keyboard 158 is selectively energized by a one-of-eight decoder 156 to which are applied timing signals as derived from the output of the vertical counter, as shown in FIG. 4A. As the output of the vertical counter increases, the one-of-eight decoder 156 selectively energizes the next horizontal conductor. Upon actuation of a particular area of the keyboard 158, at least one of the horizontal and vertical conductors is interconnected, thereby disposing the interconnected vertical conductor to the high potential applied to the horizontal conductor. Upon that occurrence, an output is derived upon the keyboard return (KBR) conduit, as shown in FIG. 10, to supply such information to a specified location in the RAM 16 via tri-state drivers 60, as shown in FIG. 6A, and I/O data buses 22, the location being specified by the vertical counters.

The timing signals as derived from the output of the vertical counter also are supplied to a one-of-eight analog multiplexer 150, which selectively accesses one of two potentiometers from one of four joysticks, only one of which is shown in FIG. 10. In particular, the joystick 162 is interconnected to the movable taps 166 and 168 of the variable potentiometers 160 and 164, respectively. As illustrated in FIG. 10, a bias voltage, e.g. 5 V, is applied across the potentiometers 160 and 164 to ground, whereby a varying potential as dependent upon the vertical and horizontal position of the joystick 162 is applied via the tap to the multiplexer 150. The multiplexer 150 selectively applies these position signals to a comparator 152 dependent upon the timing of the vertical counter. The position signals are supplied to the comparator 152 to be compared with a ramp output of a ramp generator 154. When the increasing output of the generator 154 equals that as derived from one of the potentiometers 160 or 164, the comparator 152 provides a latch signal, the timing of which is indicative of the amplitude of the potential and therefore the setting of either the horizontal position or vertical position of the joystick 162. The latch signal in turn is applied to a corresponding counter 153, which counts the time from the most recent reset pulse and applies its output to an AID control, which generates the reset pulse in timed relation with horizontal timing inputs, to be applied to the ramp generator 154. The counter 153 continues to count until the latch signal is generated, which time is indicative of the amplitude of the signal output from the multiplexer. The time manifestation as derived from the counter 153 is gated into a latching register 155 by the latch signal and in turn is stored within the RAM 16 at a location determined by the vertical counter. The tristate driver 157 applies the keyboard output to the I/O data bus 22.

Figure 11:
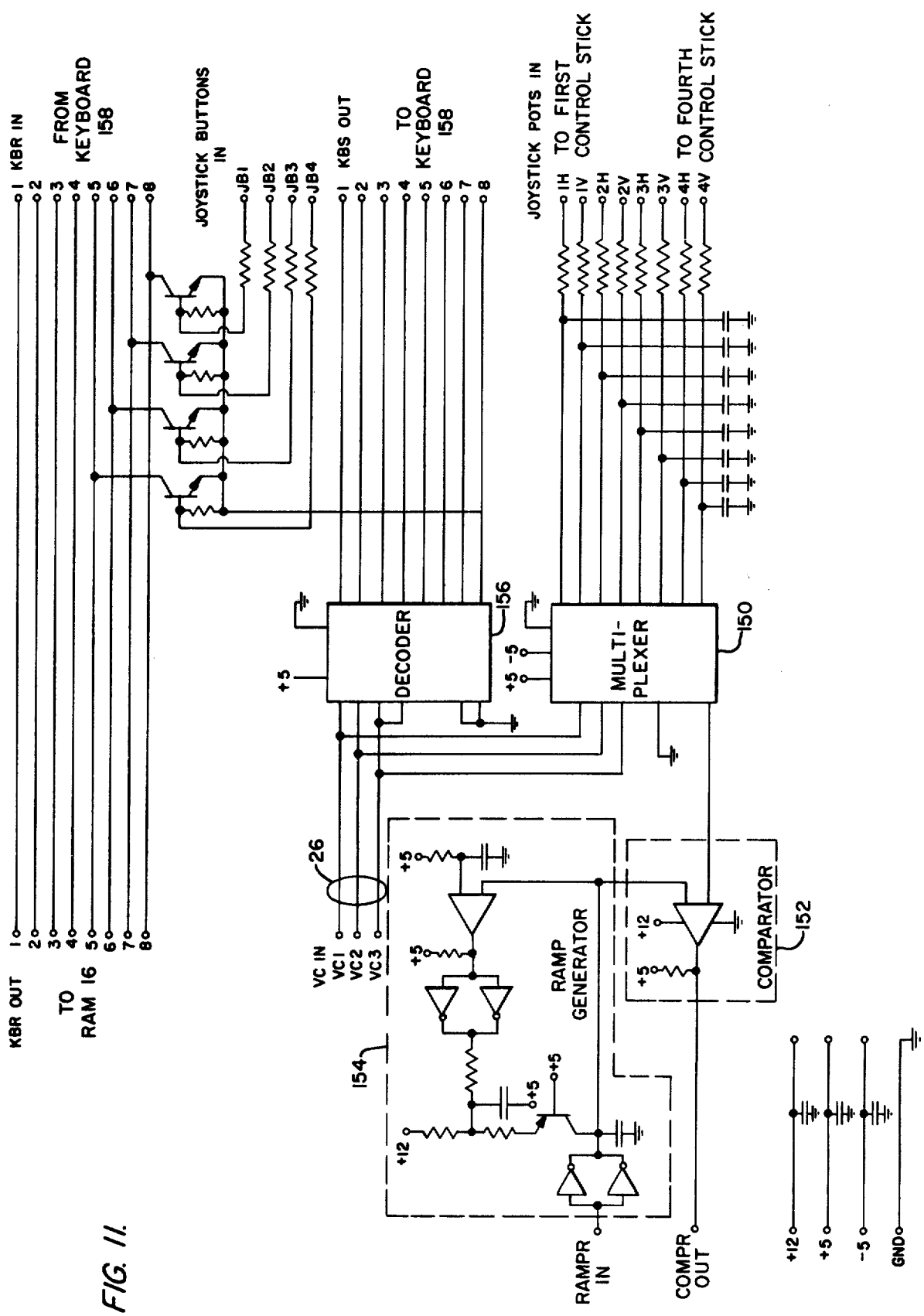

In FIG. 11, there is shown a detailed circuit diagram of the keyboard/stick control 30 as schematically shown in FIG. 10. Timing signals as provided via timing bus 26 from the output of the vertical counter are applied to the decoder 156 which selectively energizes one of eight input conductors to the keyboard 158. Upon actuation of one of the points of intersection between the horizontal and vertical conductors of the keyboard 158, an output is derived from the keyboard 158 and applied via the keyboard return KBR conduit to the RAM 16. The timing signals as derived via timing bus 26, are also applied to the multiplexer 150 which selects one of the lines from one of the pairs of the outputs from the joysticks. The voltages as derived from the potentiometers 160 and 164 of the corresponding sticks are selectively multiplexed and the outputs are applied to the comparator 152 comprised of an operational amplifier. The other input to the comparator 152 is derived from ramp generator 154, the details of which are shown in FIG. 11. The latch signal as derived from the comparator 152 is applied to the counter, whose count is indicative of the amplitude of the voltage and therefore the position of the joystick.

CASSETTE INTERFACE 28

Figure 12:
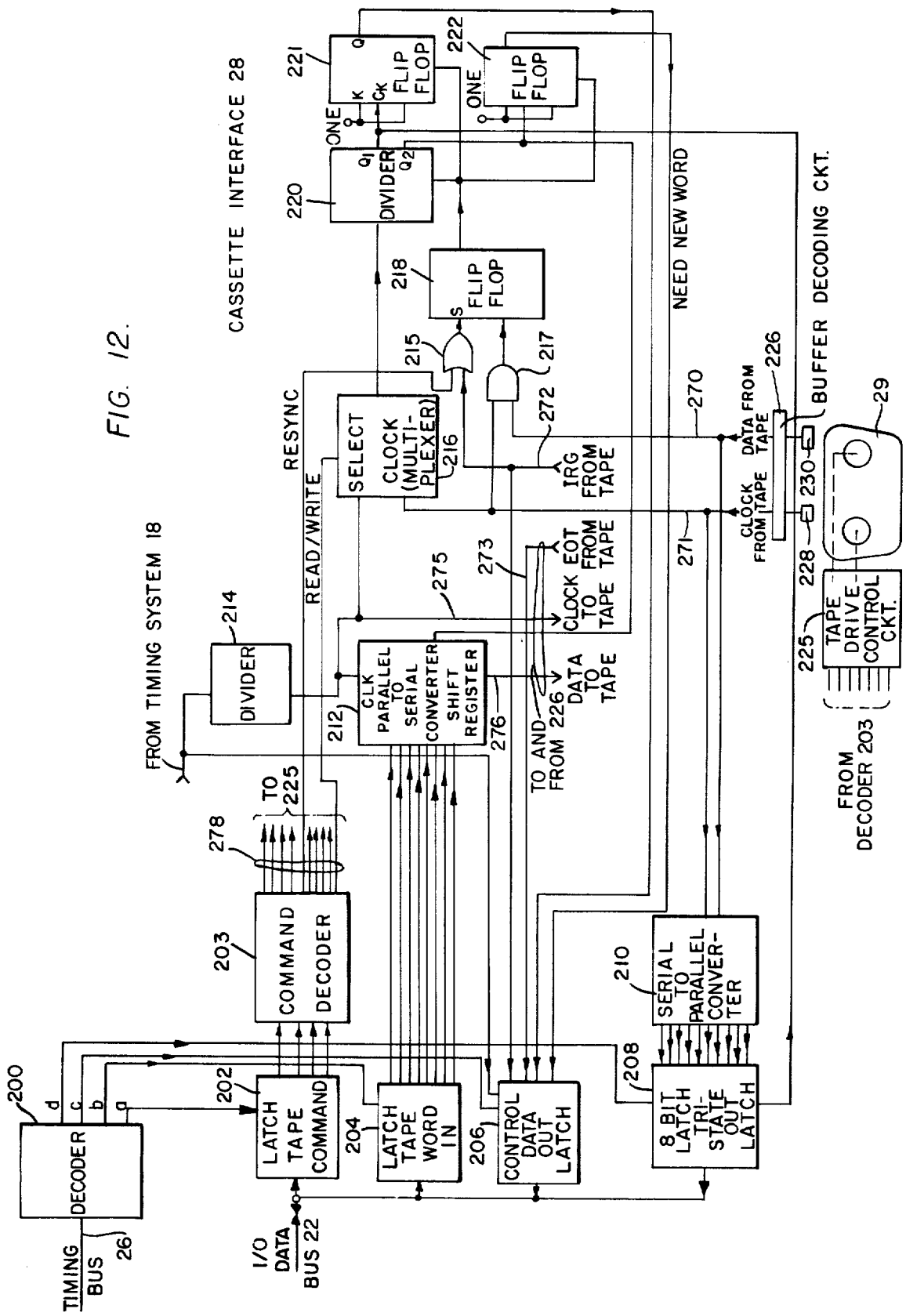
FIGS. 12 and 14 are functional block diagrams of the cassette interface circuit as shown in FIG. 1.
Figure 13A:
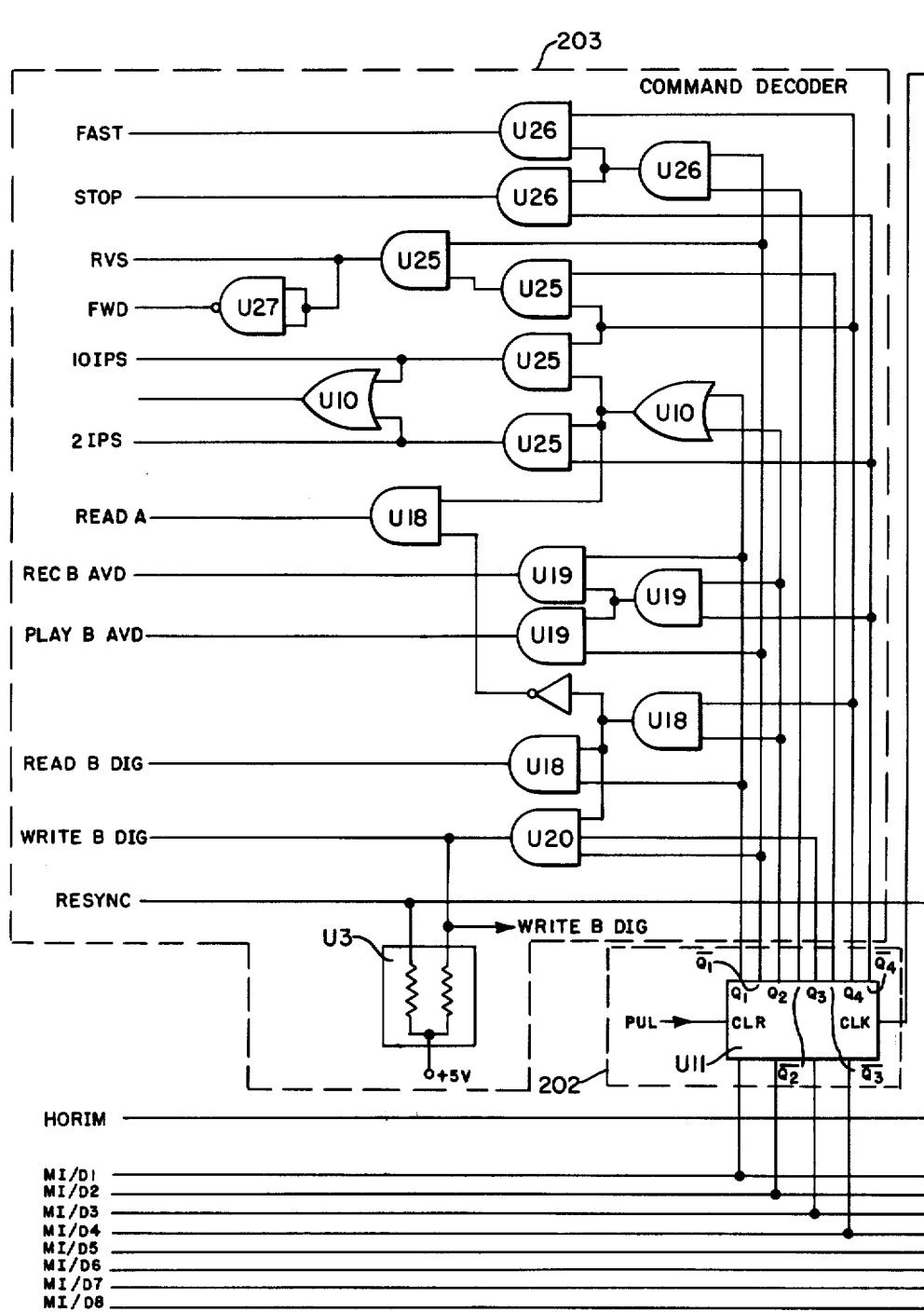
FIGS. 13A, B and C 15, 16, 17 and 18 are detailed schematic drawings of the cassette interface circuit as generally shown in FIGS. 12 and 14.
Figure 13B:
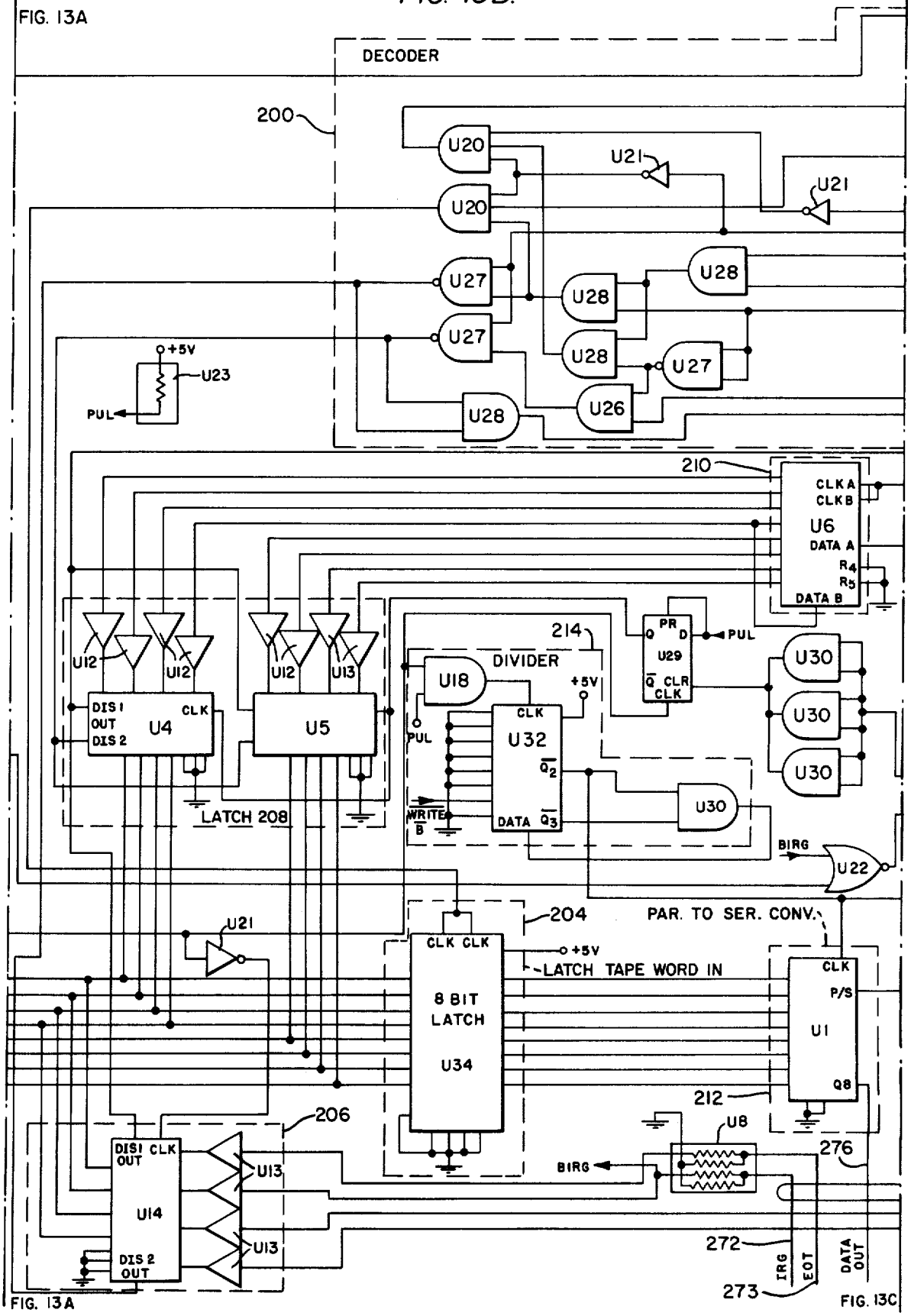

In FIGS. 12 and 13 A, B and C, there are shown, respectively, a schematic diagram and a detailed circuit diagram of the cassette interface 28 as shown generally in FIG. 1. With regard to FIG. 12, timing information is delivered via timing bus 26 to a decoder 200. The decoder 200 is basically a timing control circuit responsive to provide latch signals at selected times during the horizontal blanking period of the CRT 34. In particular, the decoder 200 provides latch signals from its outputs a, b, c and d, respectively, to the latches 202, 204, 206 and 208, whereby data is selectively transferred from the I/O data bus 22 to the tape storage unit 29 and from the storage unit 29 to the I/O data bus 22. The latches 202, 204, 206 and 208 are essentially tri-state drivers or latches whereby data is transferred between the input data bus 22 and the storage unit 29. The signals as derived from the outputs a, b, c and d of the decoder 400 control the time slots as shown in FIG. 3J corresponding respectively to the TAPE CONTROL OUT (out of RAM), the TAPE DATA OUT (out of RAM), the TAPE CONTROL IN (into RAM) and the TAPE DATA IN (into RAM). More specifically, the decoder 200 is responsive to the timing signals from the timing system 18 to set the latch 202 during the TAPE CONTROL OUT (out of RAM) slot whereby demands for controlling the driving of the tape unit are transferred by the tape command latch 202 to be applied to a command decoder 203, which decodes the transferred signals to control a variety of functions performed by the tape drive control circuit 225 upon the storage unit 29. As shown in FIG. 12, the storage unit 29 may take the form of a cassette unit having a tape driven between two reels thereof. There are provided two recording heads 228 and 230, for respectively reading and writing data from first and second tracks upon the tape of the storage unit 29. The recording heads 230 and 228 are associated with an interface buffer and decoder circuit (as will be explained in detail with respect to FIG. 14) associated with the input and output conduits 270, 271, 272, 273, 274 and 276, whereby data is transferred from the tape of the storage unit 29 and the remaining elements of the entire system as shown in FIG. 1. The command decoder 203 is responsive to the control commands as transmitted via the I/O data bus 22 to actuate the tape drive control circuit 225 to perform the following operations upon the storage unit 29:

(A) Stop the tape;

(B) Stop the tape and retract the recording heads 228 and 230;

(C) Direct the tape at a fast forward speed of 10 inches/second, as opposed to the normal speed of 3⅞ inches/second;

(D) Rewind the tape:

(E) Read data from the first track of the tape as from recording head 230;

(F) Read data from the first track and in response to a resync, timing signal, as will be described;

(G) Read data from the first track as by recording head 230 and further to play or to read audio information as derived from the second track as by recording head 228;

(H) Resync the timing system 18;

(I) Write digital data on the second track as by recording head 228;

(J) Read data from the second track of the tape as by recording head 228, to read data from the second track and to resync the timing system 18.

The data recorded upon the storage medium, e.g. the tape of the storage unit 29, is disposed in first and second tracks, the first track receiving a self-clocking signal, program data and block gaps, while the second track receives audio information and digital self-clocking data. More specifically, the program data includes information identifying the set or library of characters to be displayed upon the color CRT 34, as illustrated in FIG. 2, and the palette of colors from which these characters are colored. The digital self-clocking data is that data evolving from data that is written via the keyboard/stick control 30. In particular, the viewer may type in data upon the keyboard in the form of Christmas lists or other data to be stored upon the second track of the tape of the storage unit 29. In an illustrative embodiment of this invention, data is stored in a manner so that there are provided approximately 1600 transitions per inch or 800 bits per inch of data which may be typically recorded or read back at a taped velocity of 3¾ inches/second. Data is recorded upon the tracks in a format having a postamble, an interrecord gap (IRG), a preamble and an end-of-tape (EOT) signal. More specifically, the IRG's are approximately one inch long, while the EOT and preamble signals are provided by clock gaps larger than approximately 5 inches. The IRG's are envelope detected and the first "1" bit after the IRG indicates the start of data. Data then is read out from, for example, the first track in the form of eight-bit bits with the least significant bit being read first. The microprocessor 12 is responsive to the IRG and commands a resync signal to prepare the interface circuit 28 to read the next one and to be ready to receive the data flow from the first track of the tape of the storage unit 29.

Referring to FIG. 12, data is transferred from the RAM 16 (see FIG. 1) via the I/O data bus 22 to a tape word in latch 204. During the TAPE DATA OUT (out of RAM) time slot (within the horizontal retrace period) as shown in FIG. 3J, the decoder 200 develops its latch signal upon its b output to enable the latch 204 to transfer data that is applied thereto from the input/output data bus 22. As seen in FIG. 12, the eight bits of data are applied along corresponding lines to a parallel-to-serial converter in the form of a shift register 212. The data is applied in parallel form to the shift register 212 and is read out in serial form to be applied via a conduit 276 and the buffer decoding circuit 226 to the second track of the tape of the storage unit 29 via recording head 228.

As is evident from the configuration of the cassette interface 28, as shown in FIG. 12, data is read into and from the storage unit 29, requiring two clock signals. The first clock signal is derived from the timing system 18 in the form of a horizontal blanking signal as applied to the divider's circuit 214; the clock signal derived from the timing system 18 is used to control the recording of data onto the second track. The second clock signal is used to control the reading out of data, and is recorded upon the tape of the storage unit 29, to be read out via one of the recording heads 228 or 230, the buffer decoding circuit 226, and applied to a multiplexer 216. Depending upon which mode of operation is effected, the multiplexer 216 utilizes one of the first and second clock signals to facilitate the loading or unloading of data from either latch 204 or 208.

As seen in FIG. 12, the command decoder 203 derives from the control data transmitted via the I/O data bus 22 a write signal that is applied to the select clock or multiplexer circuit 26, which selects a clock signal either from the timing system 18 or that stored upon the storage unit 29, dependent upon whether a write or read signal is received, respectively. In a write mode as indicated by the receipt of a signal from the decoder 203, the clock signal as derived from the timing system 18 is applied to a divider 214 which provides at its output a clock signal that is applied to the parallel-to-serial converter 212 and also to the multiplexer 216. In response to the clock signal, the parallel-to-serial converter 212 reads out serially the inputted data via a conduit 276 and the buffer decoding circuit 226 to the recording head 228 to thereby record inputted data, as received, for example, from the keyboard/control stick 30 to the second track of the tape of the storage unit 29.

In order to read out data from the tape of the storage unit 29, the decoder 200 applies an actuating signal from its output during the TAPE DATA IN (into RAM) time slot as shown in FIG. 3J, to the latch 208, whereby data received from a serial-to-parallel converter 210 is latched or strobed out and applied via the I/O data bus 22 to the RAM 16, as shown in FIG. 1. As shown in FIG. 12, self-clocking data are derived from the first and second tracks of the tape storage unit 29 via recording heads 230 and 228, respectively, and applied to a buffer decoding circuit 226, which will be explained in detail later with respect to FIG. 14. The self-clocking data from both tracks is applied selectively to the decoding circuit 226 which decodes the self-clocking data and applies a data signal to the serial-to-parallel converter 210, and a clocking signal to a clock input of the serial-to-parallel converter 210. In an illustrative embodiment of this invention, the cassette or storage unit 29 stores on its first track the set of characters of which the character is formed, as well as the text string, i.e. the sequence and order in which the characters are to be applied to the color processor 32 and the color CRT 34. In addition, the microprocessor programs determining the nature of the presentation, e.g. LUNAR LANDING program, also are stored on the first track. The second track receives data from the system 10, including inputs made via the keyboard or joystick, as well as other computations or calculations made by the system. For example, if it is desired to store data such as a Christmas card list, it would be entered via the keyboard and stored upon the second track of the cassette 29.

During the TAPE CONTROL IN (into RAM) time slot, as shown in FIG. 3J, control data in terms of flags, are generated by the cassette interface 28 and applied to the microprocessor 12, as seen in FIG. 1, indicating that data has been read out and stored in the latch 208 and is in a state to be read out therefrom. As indicated above, the format of the first track of the tape of the storage unit 29 includes the inner record gap (IRG) that indicates that a block of data is to follow thereafter. The buffer decoding circuit 226 detects such IRG and applies a signal thereof to the conduit 272 which applies the IRG signal to the control data out latch 206 and also to an OR gate 215 to set a flip-flop 218. Upon the detection of the IRG as indicated, the flip-flop 218 generates a signal to reset a divider circuit 220, and each of the JK flip-flops 221 and 222. During the data read out mode of operation, the clock derived from the tape is applied via the multiplexer 216 to the divider circuit 220, which, upon detection of the eighth tape clock pulse, provides a high pulse from its Q1 output to the clock input of the flip-flop 221, causing it to toggle so that a data ready toggle output as derived from its Q output terminal is applied to the control data output latch 206, causing it to generate a flag that is transmitted during the TAPE CONTROL IN (into RAM) time slot, as shown in FIG. 3J, to the microprocessor 12 to indicate that a new word of data has been stored in the data out latch 208. During the subsequent TAPE DATA IN (into RAM) time slot, the microprocessor 12 transmits control data to the decoder 200 whereby the data out latch 208 is strobed or latched to effect the readout of data therefrom, to be applied via the I/O data bus 22 to the RAM 16.

The cassette interface 28 shown in functional block diagram form in FIG. 12, is shown more specifically with respect to the detailed schematic circuit of FIG. 13. The command decoder 203 is illustrated in FIG. 13 as comprising a plurality of interconnected AND gates from which command signals are derived from the latch 202. In addition, the detailed circuitry of the decoder 200 is shown comprised of AND gates and flip-flop circuits to which are applied the timing signals in the form of the outputs of the character counter and the dot clock, and CADEP signals. Further, each of the latches 202, 204, 206 and 208 is illustrated as being connected to the I/O data bus 22. Further, the output of the TAPE WORD IN latch 204 is shown as being applied to the parallel-to-serial register 212, and the output of the serial-to-parallel converter 210 is shown as being applied to the latch 208. In addition, the logic circuitry of the select clock multiplexer 216 is shown for providing an output to the divider circuitry 220.

Figure 14:
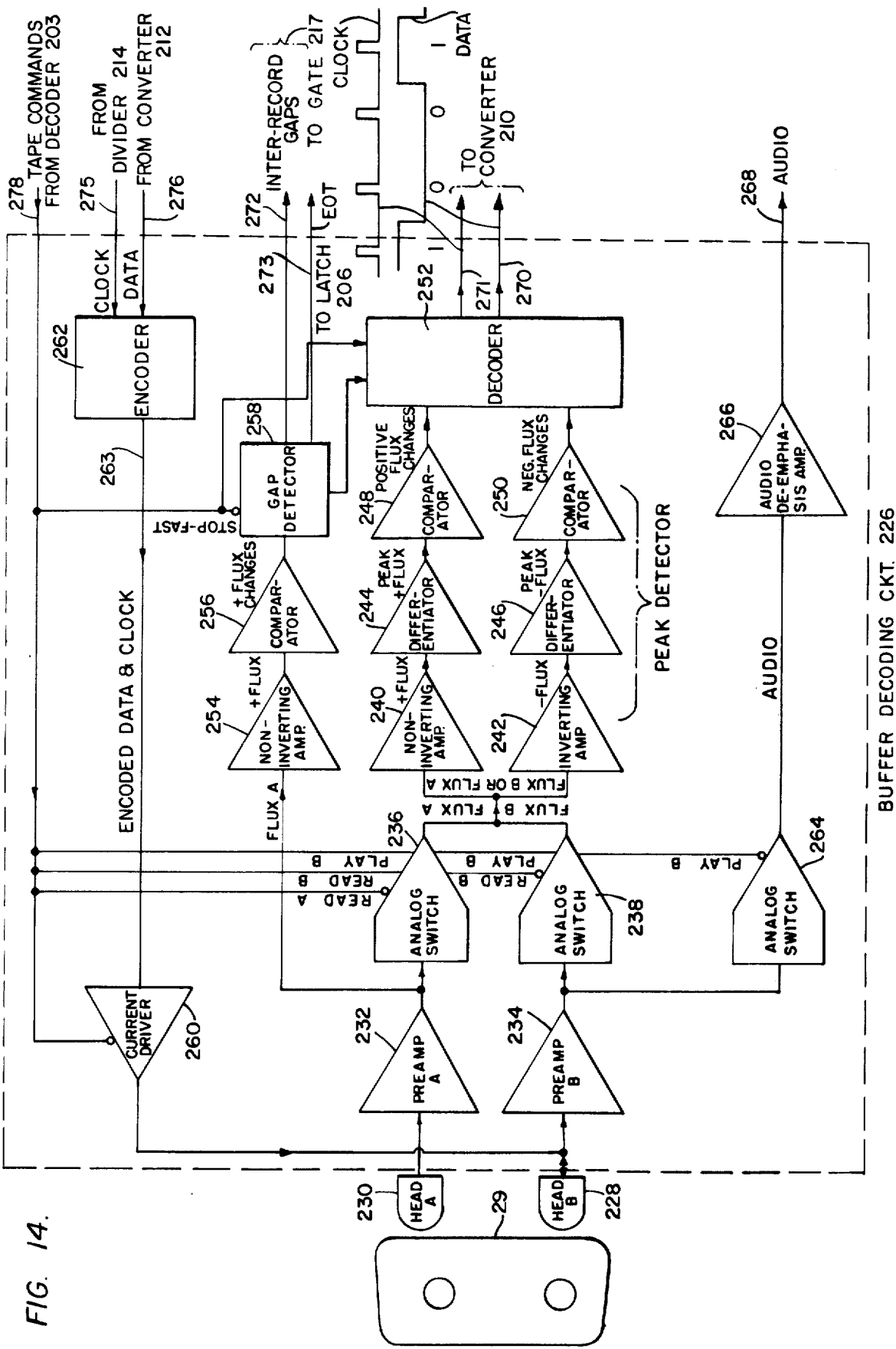

The buffer decoding circuit 226, as generally shown in FIG. 12, will now be more specifically described with regard to the schematic diagram of FIG. 14. The first and second tracks of the storage unit 29 are read, respectively, by the recording heads 230 and 228, with the data derived therefrom applied respectively via preamplifiers 232 and 234 to analog switches 236 and 238. As indicated above, the decoder 203, as shown in FIG. 12, applies command signals via the conduit 278 to each of the analog switches 236 and 238 to command the analog switch 236 to selectively read data from the first track of the tape of the storage unit 29, to read data from the second track thereof by analog switch 238 and to play or read audio information as recorded on the second track of the tape of the storage unit 29 by actuating the analog switch 264.

The analog data is applied via the actuated switch 264 to be amplified and applied by an audio de-emphasis amplifier 266 to an audio channel 268. The data derived from one of the analog switches 236 or 238, is in the form of flux reversals that are indicative of the recorded data. Thus, the succession of changes of flux are applied to two channels for detecting, respectively, positive or negative flux changes; more specifically, to detect positive flux changes, the signal is applied via the non-inverting amplifier 240 to a peak detector comprised of a differentiator 244 and a comparator 248, which provides an output when the positive-going peak fluxes exceed a particular predetermined level. In similar fashion, the read-out data is applied via an inverting amplifier 242, a differentiator 246 to a comparator 250 whose output is indicative of negative flux changes. The output of both of the comparators 248 and 250 are applied to a decoder 252 for providing two outputs via conduits 270 and 271, respectively, the first indicative of the data in binary form and the second output as a clock signal. These two outputs are applied as shown in FIG. 12 to the serial-to-parallel converter 210.

Further, control signals may be derived from the first track of the tape of the storage unit 29 by applying the output of the preamplifier 232 to a peak detector comprised of a non-inverting amplifier 254 and a comparator 256, whose output is indicative of positive-going flux changes and is applied to a gap detector 258. The gap detector 258 provides a first signal via conduit 272 indicative of the inter-record gap (IRG) that occurs between blocks of data within the first track of the tape of the storage unit 29. A second output is derived from the gap detector 258 indicative of the end-of-tape signal as stored upon track 1, and is applied via data conduit 274 to the control data out latch 206. In order to write data upon the second track of the tape of the storage unit 29, such data as derived from the tape word in latch 204 is applied via conduit 276 to an encoder 262, while a clock signal as derived from the divider 214 as applied thereto via conduit 275. The encoder 262 encodes the clock and data information together to be applied in the form of a self-clocking data signal via a current driver amplifier 260 and the recording head 228 to the second track of the tape of the storage unit 29. Further, tape commands are derived from the decoder 203 and applied via conduit 278 to actuate the current driver 260 to permit such recording.

Figure 15:
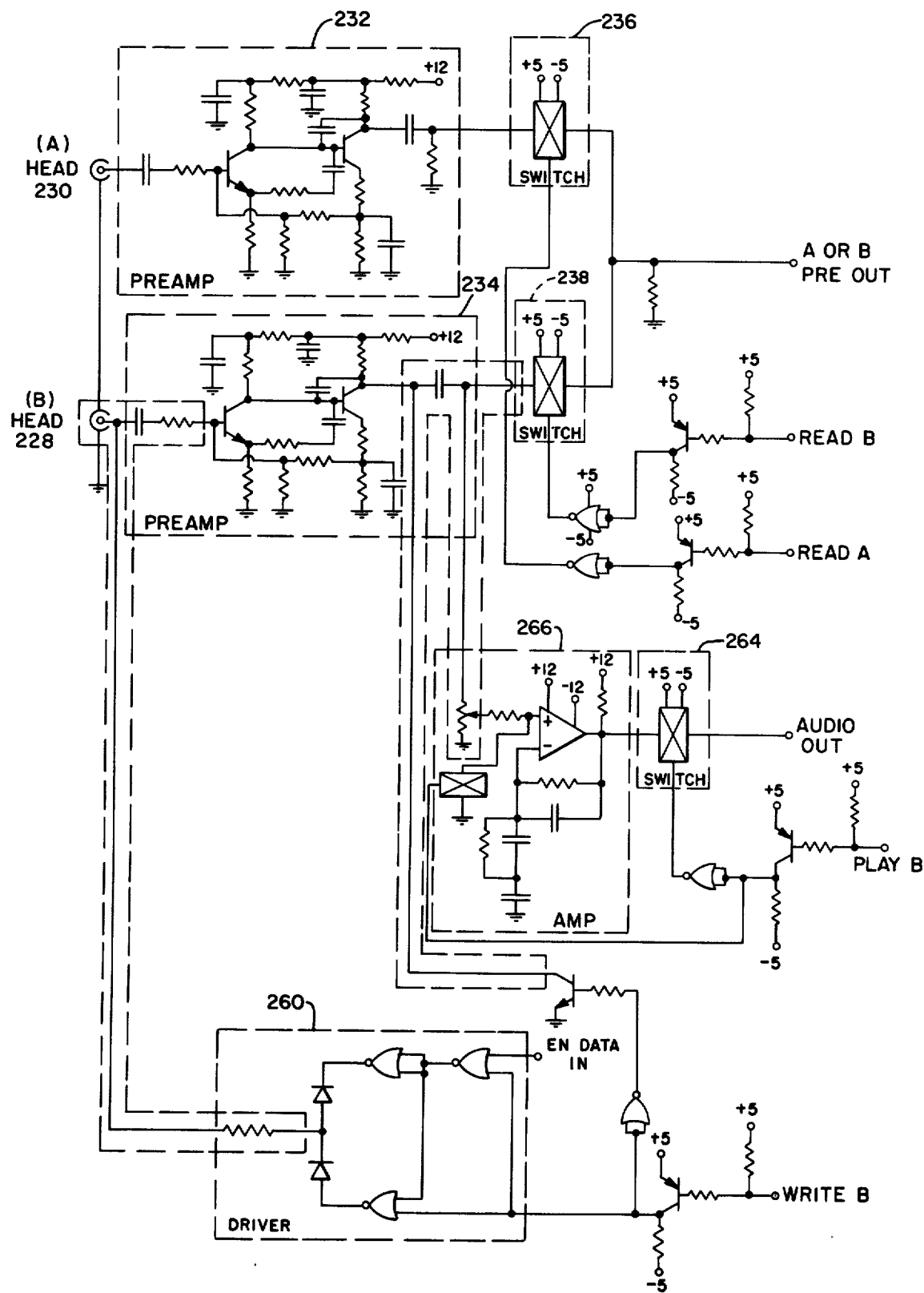
Figure 16:
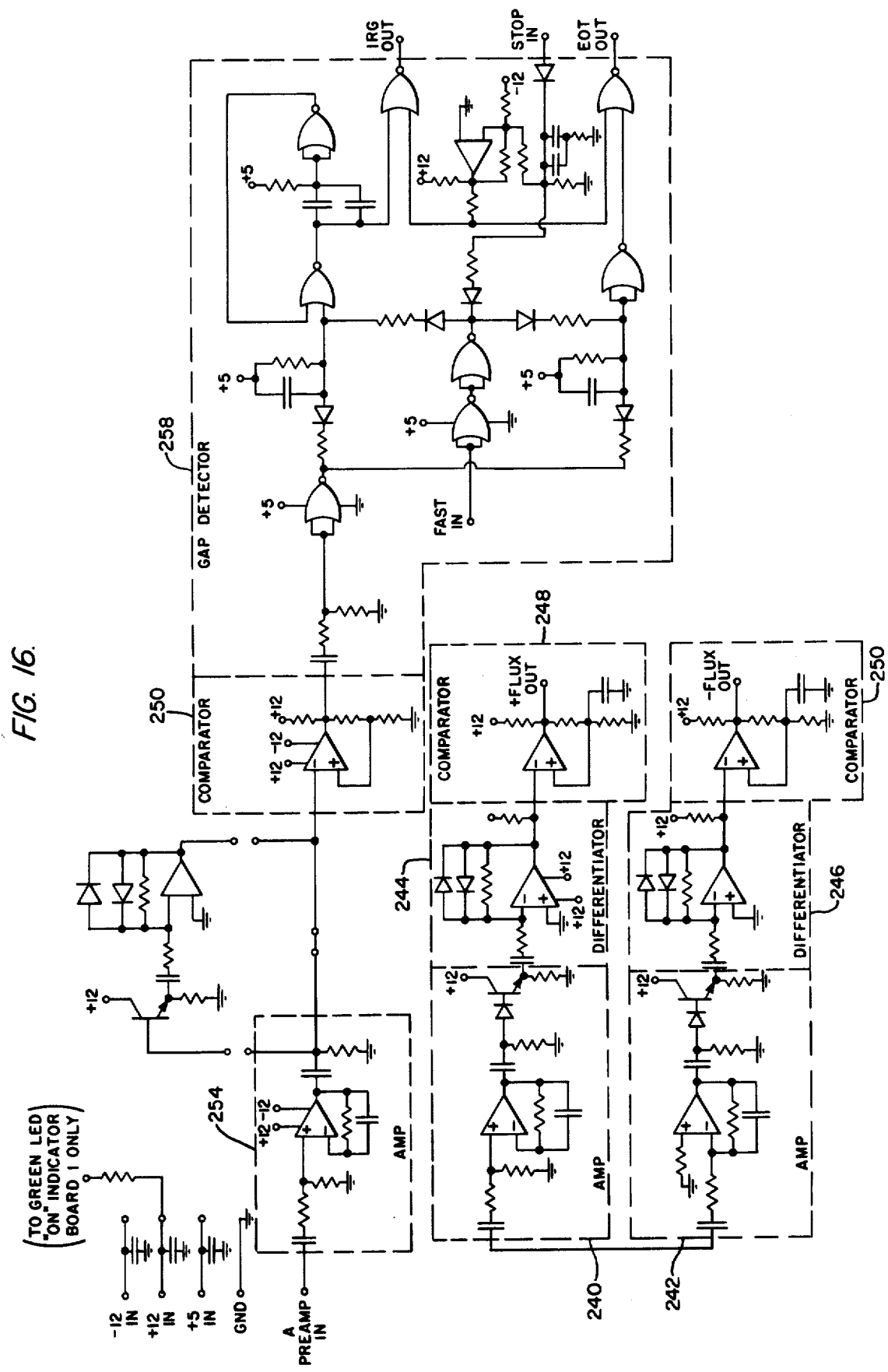

The detailed circuit elements of the buffer decoding circuit 226, schematically shown in FIG. 14, are set out in FIGS. 15, 16, 17 and 18. In FIG. 15, there is shown the detailed circuit elements of the preamplifiers 232 and 234, respectively, amplifying the output of the signals derived from the recording heads 230 and 228. In addition, the output of these amplifiers is applied via two switches 236 and 238, respectively. The audio signal as derived from the second track of the tape of the storage unit 29 is derived from the recording head 228 and applied to the preamplifier 234 via the de-emphasis amplifier 266 and the analog switch 264. In addition, clock and data signals are applied to the current driver 260, details of which are shown in FIG. 15, to be recorded via the recording head 228 upon the second track of the tape of the storage unit 29. In FIG. 16, there is shown the detailed circuits of the non-inverting and inverting amplifiers 240 and 242 for receiving the output of the analog switches 236 and 238. The amplifier signals in turn are peak-detected by the differentiator 244 and the comparator 248, and the differentiator 246 and the comparator 250 to provide output signals to the decoder 252. The output of the preamplifier 232 is applied to the amplifier 254 taking the form of an operational amplifier whose output in turn is applied to the comparator 250. The output of the comparator 250 is applied to the gap detector 258, details of which are shown in FIG. 16; the gap detector 258 detects and provides signals indicative of the IRG and EOT of the data stored on the first track of the tape of the storage unit 29. As indicated, a stop-in signal as derived from the decoder 203 in response to control data signals derived via the data bus 22 and the latch tape command 202, is applied to the gap detector 258, as seen in FIG. 16.

Figures 17, 18:
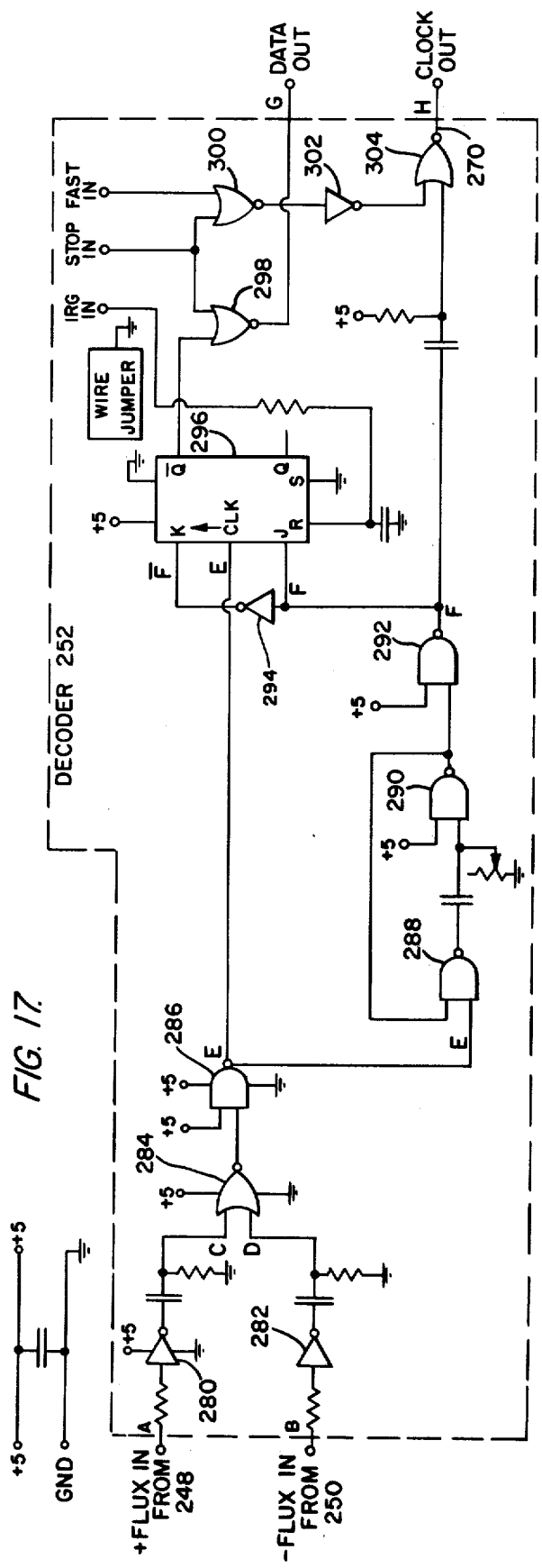

In FIG. 17, there is shown a detailed circuit element schematic of the decoder 252 generally shown in FIG.

Figure 19:
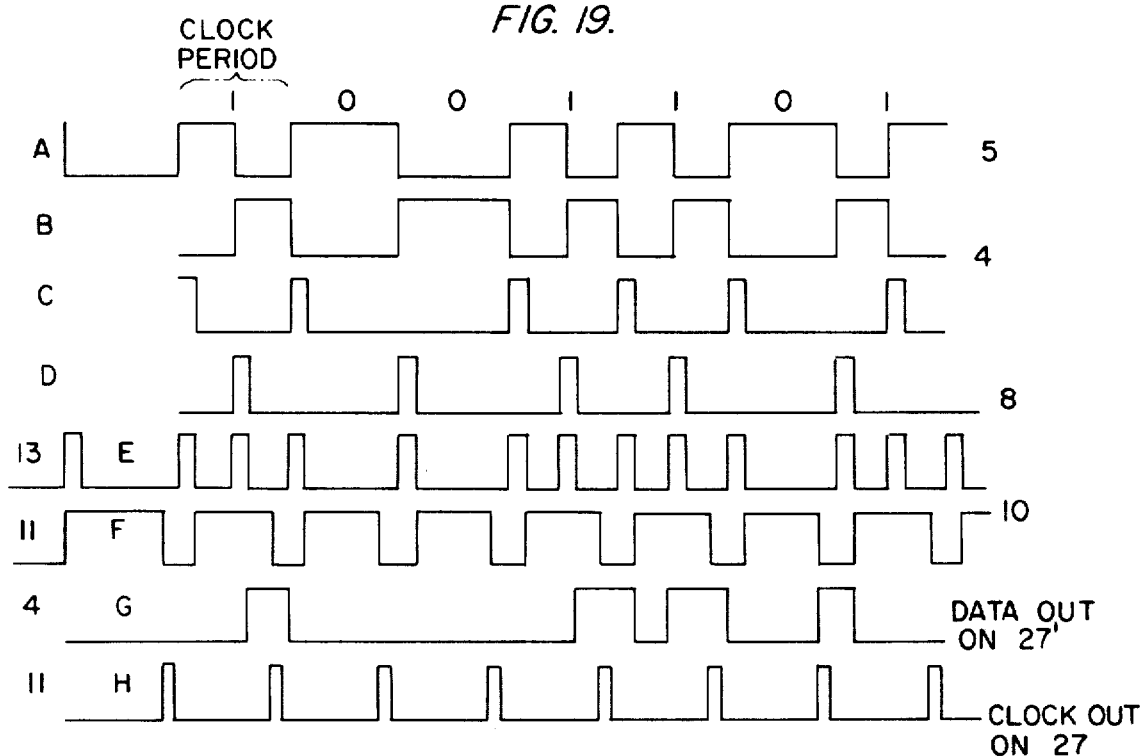
FIGS. 19 and 20 are, respectively, a graphical showing of the electrical signals as developed in the circuits of FIGS. 17 and 18.

14, and it will now be explained with regard to the timing diagram shown in FIG. 19. As a comparison of FIGS. 17 and 19 will indicate, the signals appearing at various points in the circuit of FIG. 17 are shown respectively in the corresponding FIGS. 19A-19H. The output signals derived from the comparators 248 and 250 indicative, respectively, of the positive and negative flux changes are applied at the inputs of the decoder 252 and appear as signals A and B as shown respectively in FIGS. 19A and 19B. Signals A and B are applied respectively to amplifiers 280 and 282 and subsequently to differentiators 281 and 283, each comprised of a capacitor and a resistor as shown in FIG. 17. The output signals C and D of the differentiator circuits 281 and 283 are shown respectively in FIGS. 19C and 19D, taking the form of positive-going pulses indicative of the change of flux of the input signals A and B. As seen in FIG. 17, the signals C and D are combined by an OR gate 284 to provide signal E comprising each change of flux and indicative of the data information as well as the clock signal. By observation of input signals A and B, it is seen that a high or one-bit signal is indicative of a change of flux during a given clock period and that the clock data is supplied by a transition at the end of each such period. Signal E is applied to a one-shot delay circuit comprised of AND gates 288 and 290 which provide an output signal to gate 292 whose output F is shown in FIG. 19F. The aforementioned one-shot delay responds to the negative transitions of the positive-going pulses to provide an output pulse delayed by approximately ⅜ths of a clock period. The signal E and the signal F are applied to the clock input and to the J input of a JK flip-flop 296, while an inverted F signal provided by inverter 294 is applied to the K input thereof. The JK flip-flop 296 provides at its Q output a high or "1" signal for one-half of a clock period in response to a transition as seen in either FIG. 19A or 19B in the middle of the clock period. As seen in FIG. 17, the output of the JK flip-flop 290 is provided via a NOR gate 298 to provide a data out signal via conduit 271 to the converter 210, as shown in FIG. 12. The F signal derived from the gate 292 is applied to a differentiator 303 comprised of a capacitor and a resistor as shown, which are responsive to the negative transitions of the F signal to provide a train of clock signals as is applied by the conduit 270 to the converter 210.

Figure 20:
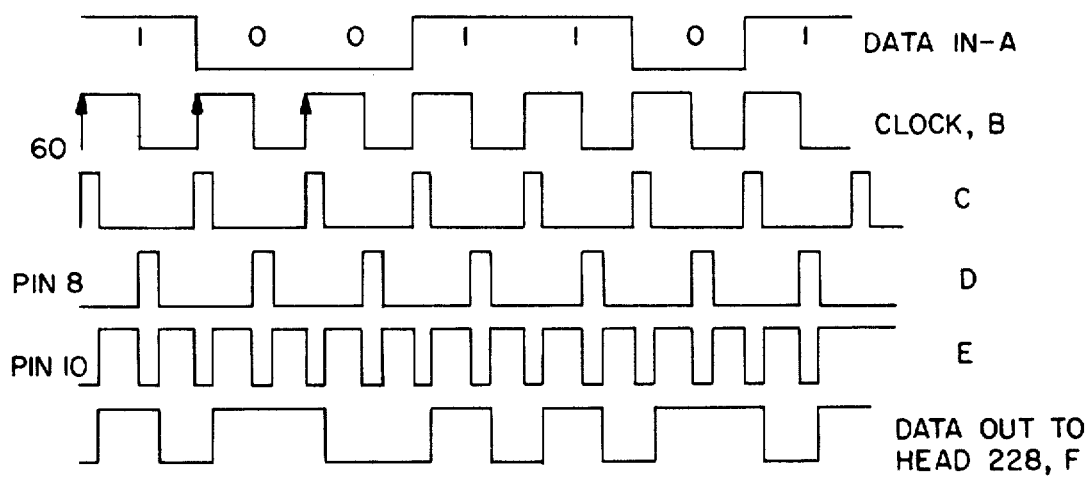

In FIG. 18, there is shown a detailed circuit diagram of the encoder 262, as generally shown in FIG. 14, for encoding clock data as shown in FIG. 20B and as derived from the divider 214, and information data as shown in FIG. 20A, as derived in serial form from the converter 212, to provide a self-clocking data signal to be applied via conduit 263 and the current driver 260 to the recording head 228 to be recorded upon the second track of the tape of the storage unit 29. The signals that appear at various points in the circuit of the encoder 262 and as identified by the prime letters therein, correspond to the signals shown in FIGS. 20A-20F; for example, the data signal A' and the clock signal B' are shown respectively in FIGS. 20A and 20B. The clock signal B' is applied to a pair of buffers 306 and therefrom to a first differentiating circuit 307 comprised of a capacitor and a resistor to provide a series of spike C' corresponding to the positive-going edges of the clock signal B', and via inverter 310 to a second differentiating circuit 311 comprised of a capacitor and a resistor for providing a series of spikes D' corresponding to the negative-going edges of the clock signal B'. The train of spikes C' and D' is applied to a NOR gate 314 which provides an output signal E to the clock input of a JK flip-flop 316. The data signal A' is applied along with the clock signal B' to a NOR gate 308 followed by an inverter 312, which provides a high output if the data input signal A' or clock signal B' is high; otherwise, its output is zero. The JK flip-flop 316 changes its state when the clock signal B' goes high and, if the data signal A' is high, when the clock signal B' goes low, to provide the output F' at its Q̄ output. The encoded data signal F' is applied via the current driver 260 to the recording head 228 whereby input data as derived from the keyboard/stick control 30 may be stored upon the second track of the tape of the storage unit 29.

AUDIO CIRCUIT 58

In FIG. 21, there is shown a schematic diagram of the audio circuit 58, generally shown in FIG. 1, for energizing a speaker 59 to emit continuing or intermittent sound of controlled time, harmonic and frequency. As seen in FIG. 1, data illustratively in the form of six, eight-bit words is transferred over the I/O data bus from the RAM 16 during the vertical retrace period and, in particular, between the horizontal line counts of 248 to 253, i.e. the AUDIO time slot as shown in FIG. 4C, to a plurality of latches 402, 404, 406, 408, 410 and 412. Timing control is provided from the timing system 18 via the timing bus 26 to latch the aforementioned latches 402 during the AUDIO time slot. In particular, the output of the character counter as seen in FIG. 3F, the output for the vertical counter as seen in FIG. 4A and the DOT clock pulses as seen in FIG. 3B, are applied to a strobe decoder 400, which responds to the aforementioned inputs to selectively energize in sequence each of the latches 402, 404, 406, 408, 410 and 412 to accept the aforementioned six, eight-bit words.

In particular, a control word is transferred into the latch 402; this control word sets the initial frequency to be generated by a first wave form generator 426, in a manner to be explained. Control words indicative of a change of frequency and gain are applied from the latch 404 to a first control circuit 416. In turn, the control circuit 416 provides a first ramp-up or ramp-down signal to a frequency ramp circuit 414, whereby the initially-set frequency may be increased or decreased.

Similarly, the first control circuit 416 provides a ramp-up or ramp-down signal to a gain ramp circuit 434, thereby increasing or decreasing a gain output signal in accordance with the control signals received from the first control circuit 416. The frequency ramp circuit 414 provides in digital form a signal indicative of the desired frequency to a digital-to-analog converter 424, which in turn applies an analog frequency control signal to the first waveform generator 426. In an illustrative embodiment of this invention, the generator 426 provides three output signals of varying harmonic content, e.g. a sinusiodal, a sawtoothed and a squarewave signal, one of which is selected by the switches 428a, b and c to be applied to a variable gain amplifier 430. The first gain ramp circuit 434 provides a four-bit control word to a digital-to-analog converter 436 to control the gain of the amplifier 430. Thus, the frequency and the gain, as well as the harmonic content of the signal derived from the first wave generator 30 may be effectively controlled to provide controlled audio signals via an audio bus 57 to the speaker 59.

As shown in FIG. 21, a second waveform generator 440, whose gain frequency and harmonic content may be controlled in a similar fashion to that described above, is provided to apply a sound signal via the audio bus 57 to the speaker 59. The second waveform generator 440 receives a frequency control signal from a frequency ramp circuit 418. A gain control signal is developed by a gain ramp circuit 446 and applied via a digital-to-analog converter 448 to a variable gain amplifier 442, whereby the volume or amplitude of the output of the second waveform generator 440 is controlled. In an illustrative embodiment of this invention, the volume of either of the waveform generators 426 or 428 may be chosen to be one of sixteen levels and may be ramped up (increased) or ramped down (decreased).

Further, an eight-bit control word is applied to latch 410 to determine the harmonic content of the output of the first and second waveform generators 426 and 440, a four-bit word for each of the aforementioned generators. Upon being actuated by the strobe decoder 440, the latch 410 applies its two four-bit control words to the function decoders 422 to selectively close the switches 428a, b and c, and 439a, b and c, to determine the harmonic content of the signals applied to the variable amplifiers 430 and 442. In addition, the output of the generators 426 and 440 may be applied selectively to speaker 59 by closing one or both of the switches 432A and 432B.

In similar fashion, an eight-bit control word is applied to the latch 412, the first four-bit control word indicative of the volume of the output derived from the waveform generator 426, and the second four-bit word to determine the gain or volume of the output of the waveform generator 440. Upon being actuated, latch 412 applies its two control words to set the initial gain or colume into the gain ramp circuits 434 and 446, respectively. As explained above, the initial gain so set may be increased by ramping upward and decreased by ramping downward.

Figure 22A:
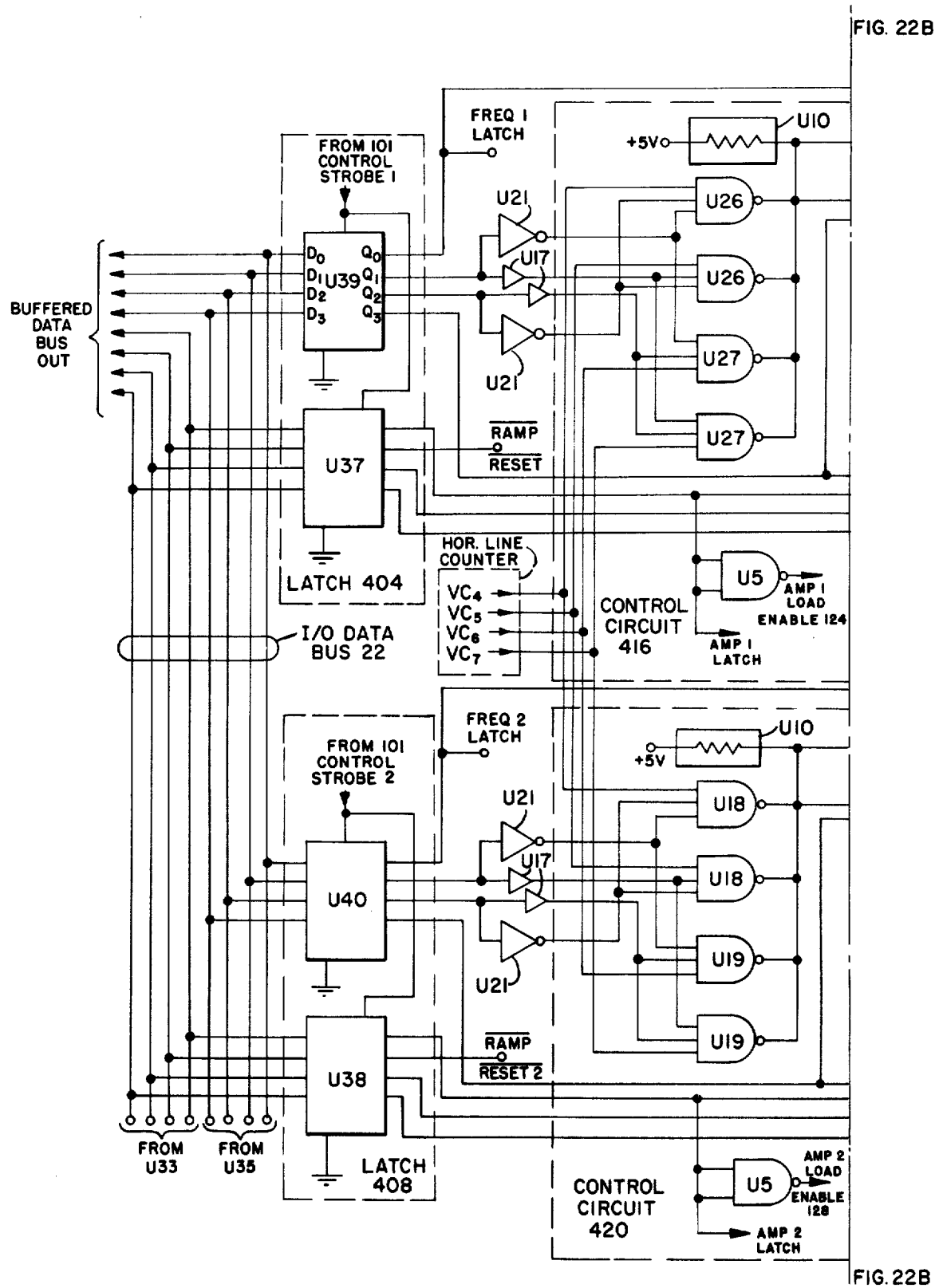
Figure 22B:
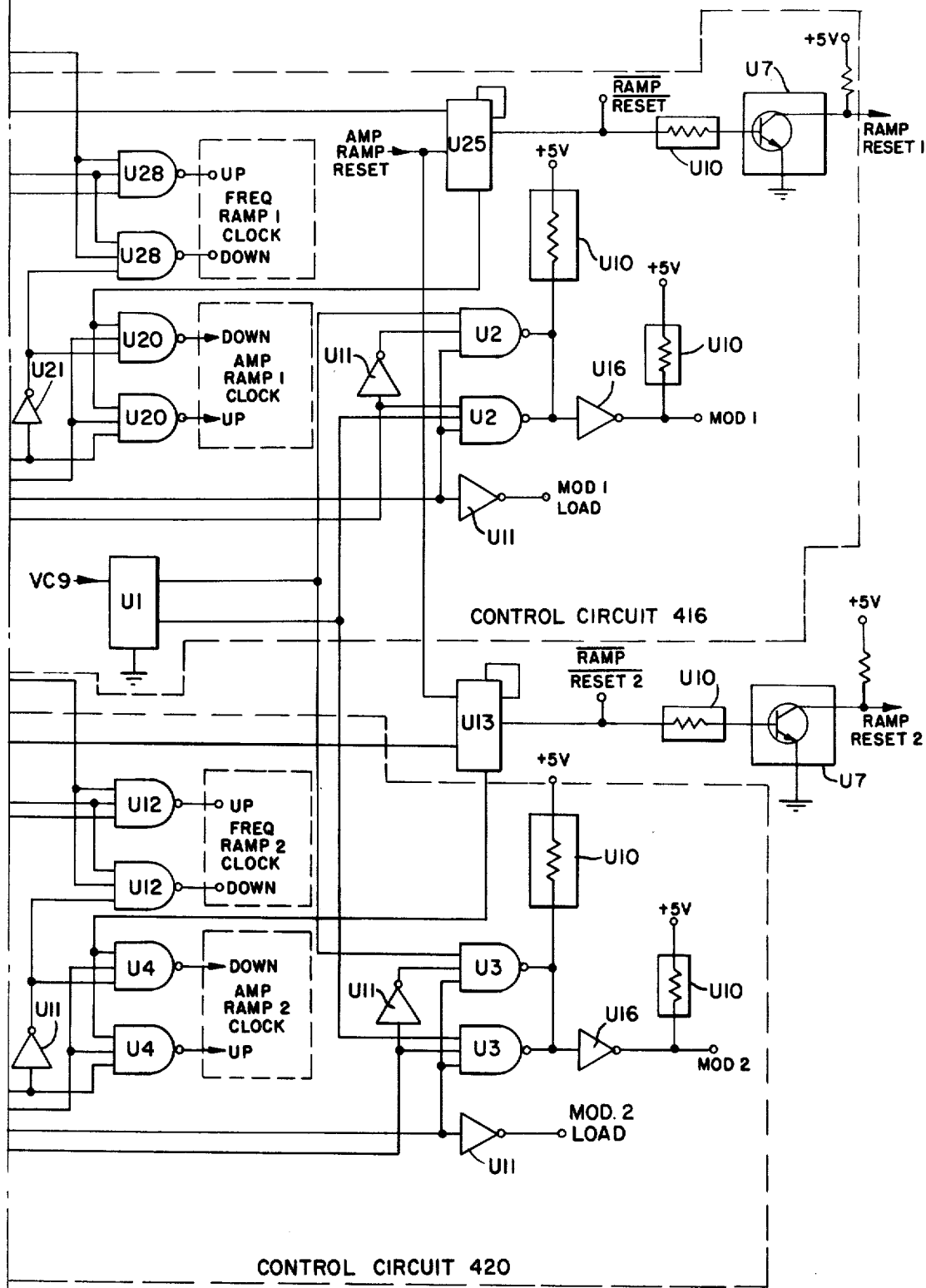
Figure 23:
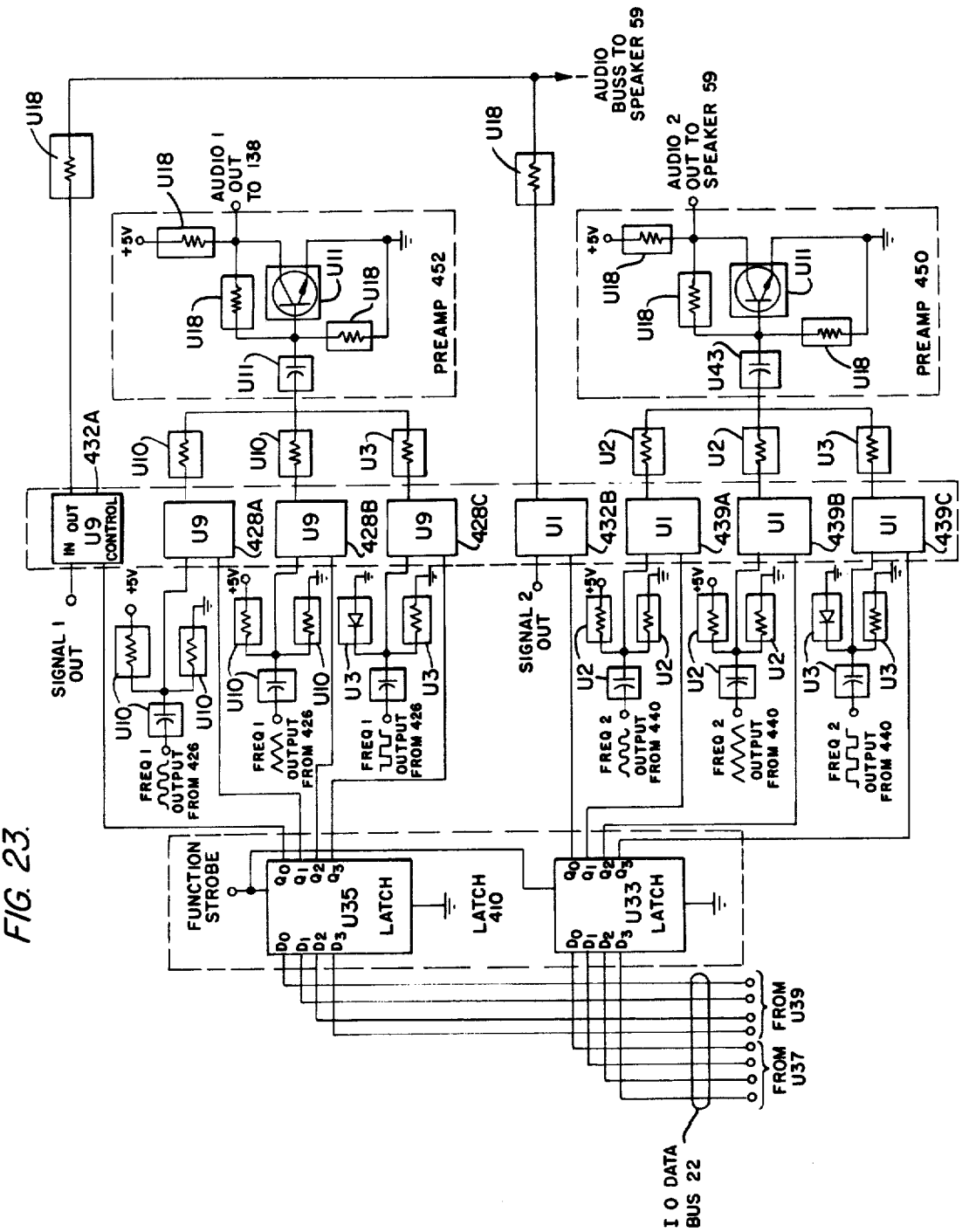

In FIGS. 22A and B, 23, 24, 25 and 26, there is shown detailed circuit diagrams of the audio circuit 58, as schematically shown in FIG. 21. In FIGS. 22A and B, there is shown the I/O data bus 22 for conveying control words to latches 404 and 408 for the control of the change of volume of the generators 426 and 440 (see FIG. 26). In particular, the latch 404 is connected to the first control circuit 416 for developing a reset signal to ramp up or down the gain or volume of the audio signal as controlled by the variable gain circuit 434 (see FIG. 24), and also, a change of frequency of the audio signal to ramp up or down the frequency ramp circuit 434, whereby the frequency of the generator 426 is controlled. In similar fashion, the second control circuit 420 provides a first output to the gain ramp circuit 446 and a second output to the frequency ramp circuit 418. In FIG. 23, control words indicative of the particular function or harmonic to be applied to the speaker 59, are provided to the latch 410 (see FIG. 23) and in particular two four-bit words are applied to the two latches thereof indicative, respectively, of the harmonics to be applied from the first waveform generator 426 and from the second waveform generator 440 to the speaker 59. As shown in FIG. 23, the varying harmonic signals as derived from the waveform generator 426 are applied selectively to the switches 428a, b and c, one of which is selected to be applied via a preamplifier 452 (not shown in FIG. 21) and a variable gain amplifier 430 to the speaker 59. A further control signal is applied to a switch 432a whereby the first audio output may be applied or defeated. In similar fashion, the varying harmonic outputs as derived from the second wave generator 440 (see FIG. 26) are applied selectively via an enabled one of the switches 439a, b and 3 and a preamplifier 450 (not seen in FIG. 21) via a second output to the variable gain amplifier 442 and then to the speaker 59. The output of the second waveform generator 440 may be defeated or applied depending upon a signal as applied to the switch 432b.

Figure 24:
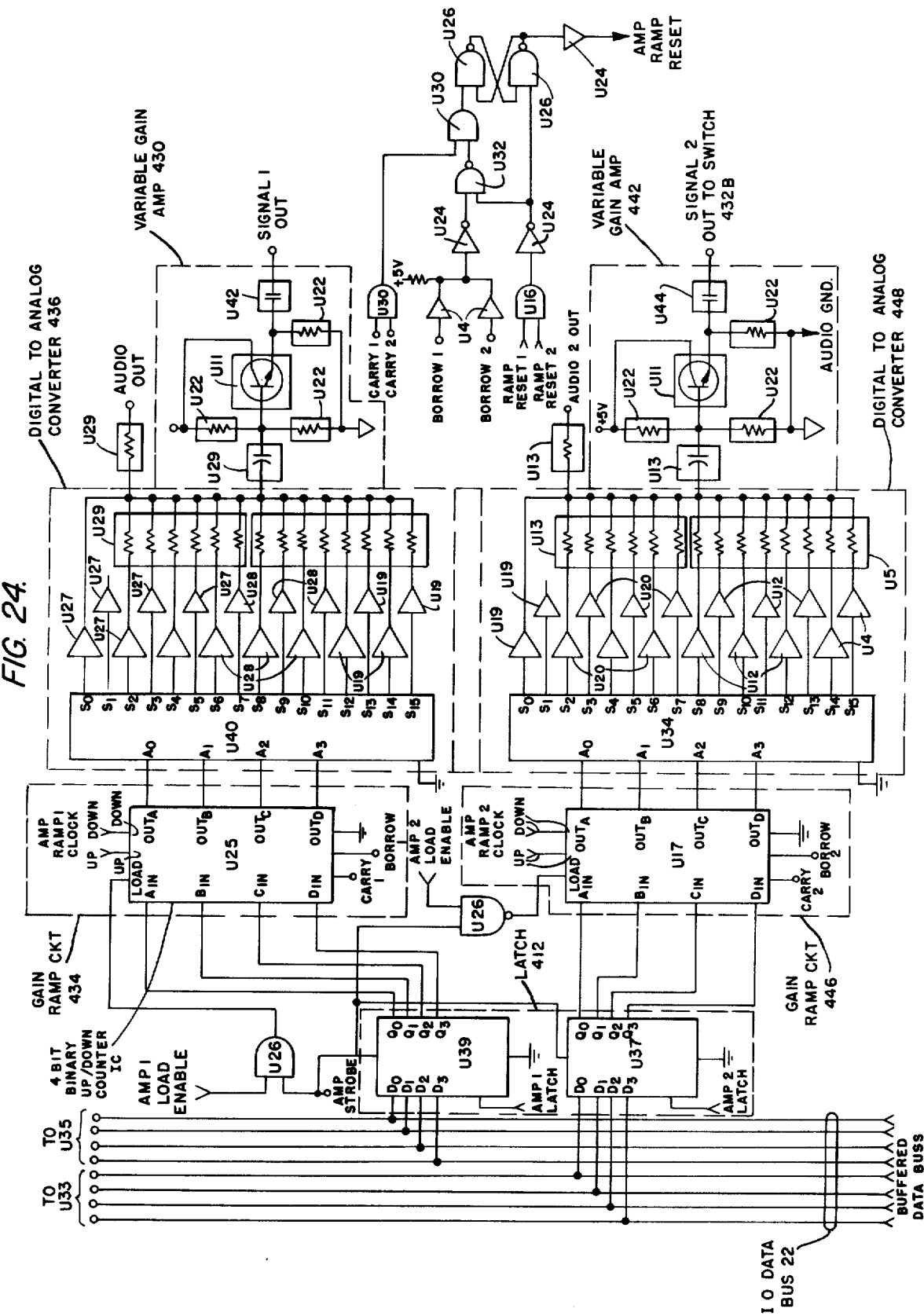

In FIG. 24, there is shown the detailed circuits for applying control words via the I/O data bus 22 and the latch 412 to the gain ramp circuits 434 and 446, whereby the preset gain is made to ramp up or ramp down under the control of the control circuits 416 and 420. The output of the gain ramp circuits 434 and 446 are applied, respectively, to digital-to-analog converters 436 and 448. The analog signals as developed by the converters 436 and 448 are applied to control the gain of variable gain amplifiers 430 and 442, whereby the gains of the output signals derived from the wave generators 426 and 440 are varied. In turn, the outputs of the amplifiers 430 and 442 are applied selectively via the switch 432 to the speaker 59.

Figure 25:
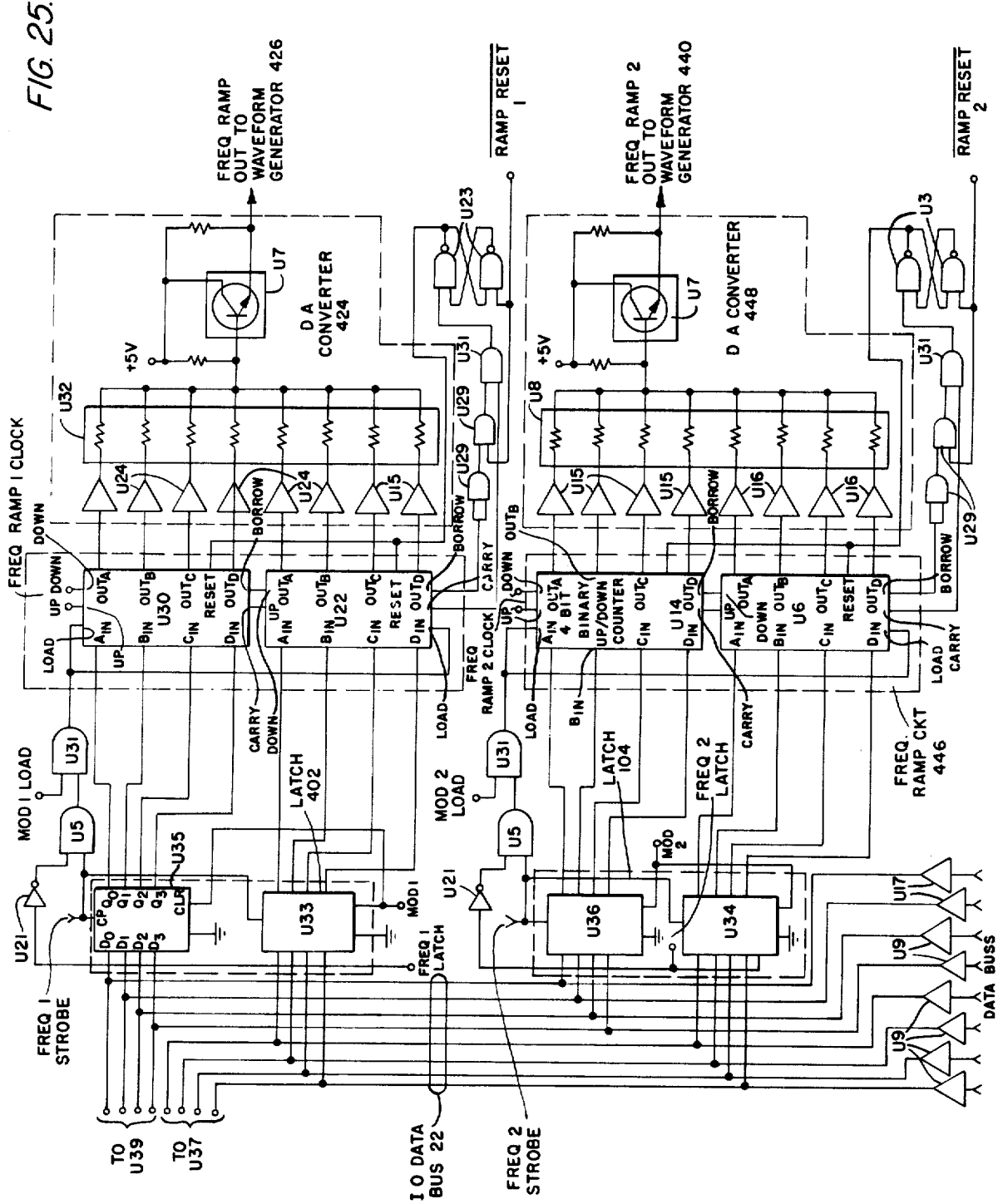

In FIG. 25, the control data words as derived from the I/O data bus 22 are applied to latches 402 and 406 indicative of the initial frequency to be set within the frequency ramp circuits 414 and 418. As seen in FIG. 25, the outputs of the latches 402 and 406 are applied to the frequency ramp circuits 414 and 418, each taking the form of two counters for receiving count-up and count-down signals respectively from the first and second control circuits 416 and 420. The outputs of the frequency ramp circuits 414 and 418 are applied via additional analog converters 424 and 438 to the first and second waveform generators 426 and 440.

Figure 26:
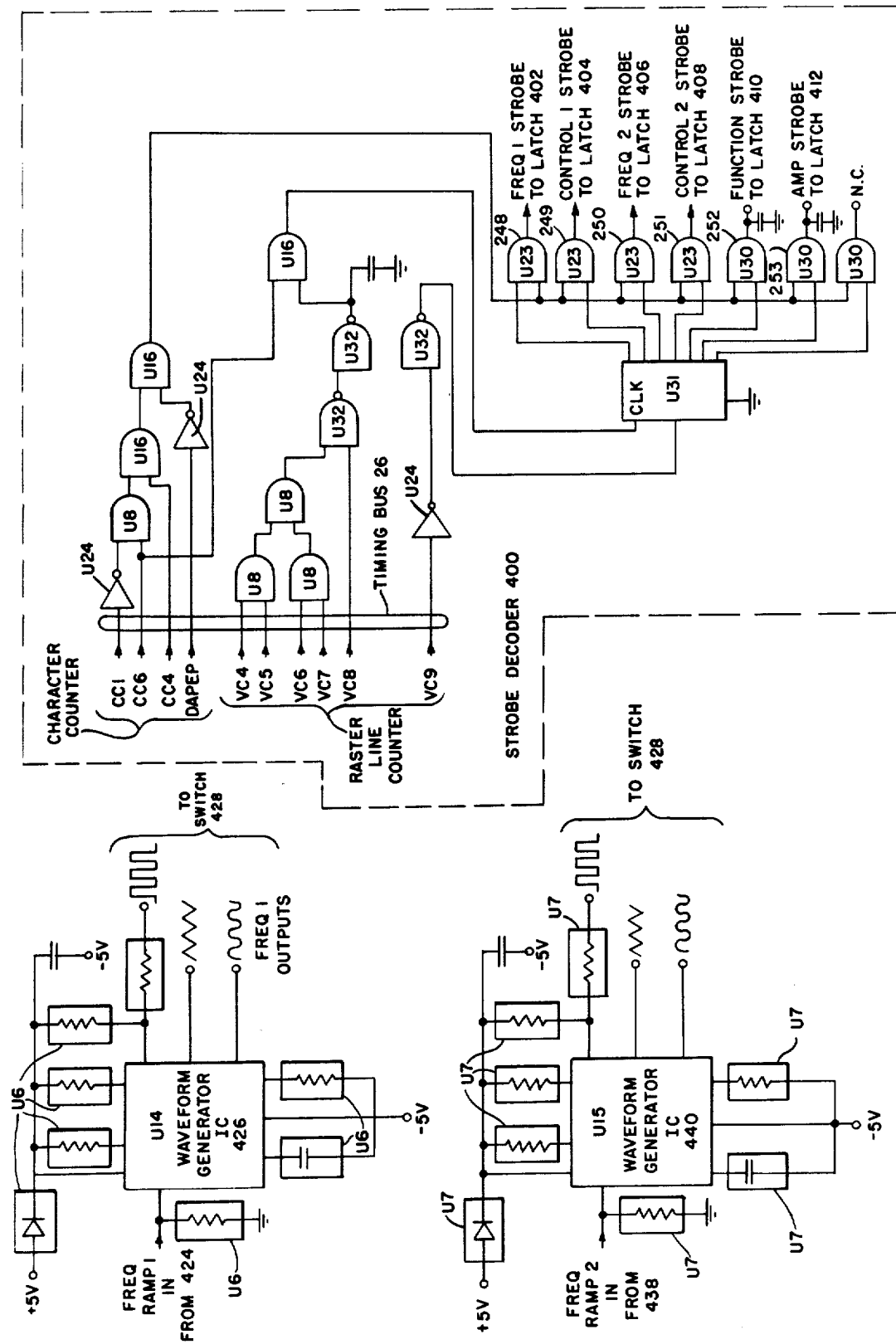

In FIG. 26, there is shown detailed circuit drawings of the first waveform generator 426 responsive to the output of the digital-to-analog circuit 424 and for generating and applying sinusoidal, sawtoothed and squarewave waveforms to the switches 428. In similar fashion, the second waveform generator 440 is responsive to the output of the digital-to-analog circuit 438 for generating sinusoidal, sawtoothed and squarewave waveforms to be applied to the switches 439. In addition, there is shown the details of the strobe decoder 400. In particular, the outputs VC4, VC5, VC6, VC7, VC8 and VC9 of the vertical counter, as shown in FIG. 4A, are applied to a first set of logic gates to generate from the gate 403 a clock signal. Further, the output of the character counter and in particular CC1, CC4, as shown in FIG. 3F, as well as the clock signal BADEP as shown in FIG. 3E, are applied to a second set of gates to provide from gate 401 an enabling signal indicative that the fortieth character of a line of the CRT 34 has been scanned, thereby to apply an enabling signal, in common, to one input of eight gates from which strobe signals are developed to be applied to latches 402, 404, 406, 408, 410 and 412. The clock signal is applied to clock a counter to provide outputs in sequence during a specified audio time slot, as shown in FIG. 4C, to enable a plurality of gates, whereby strobe signals are applied to the latches 402 to 412.

TIMING SYSTEM 18

Figure 27A:
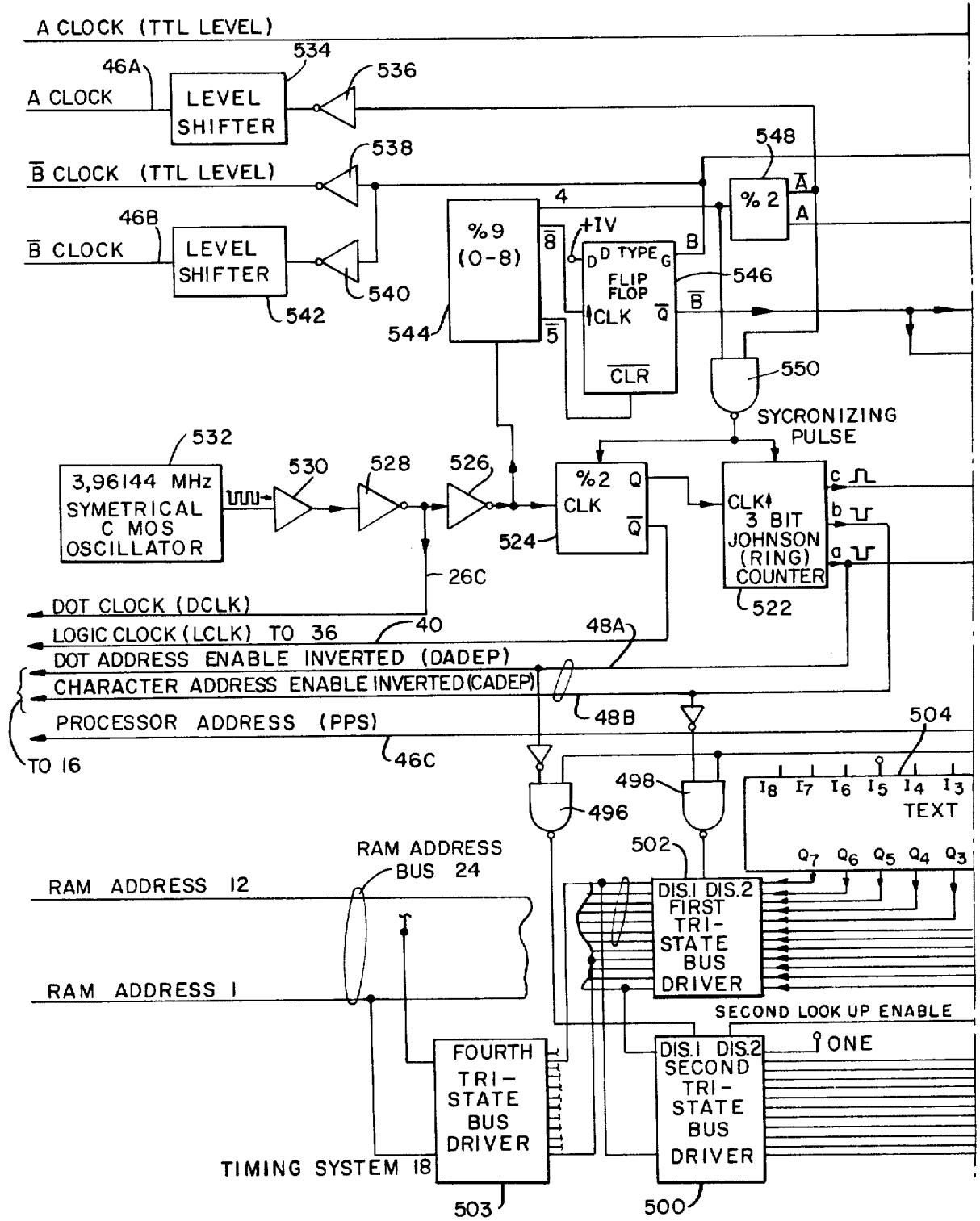
FIGS. 27A and 27B, and 28A and 28B and 29, are schematic drawings of the timing system as shown in FIG. 1, in the form of a functional block diagram and in the form of detailed schematic circuit drawings, respectively.
Figure 27B:
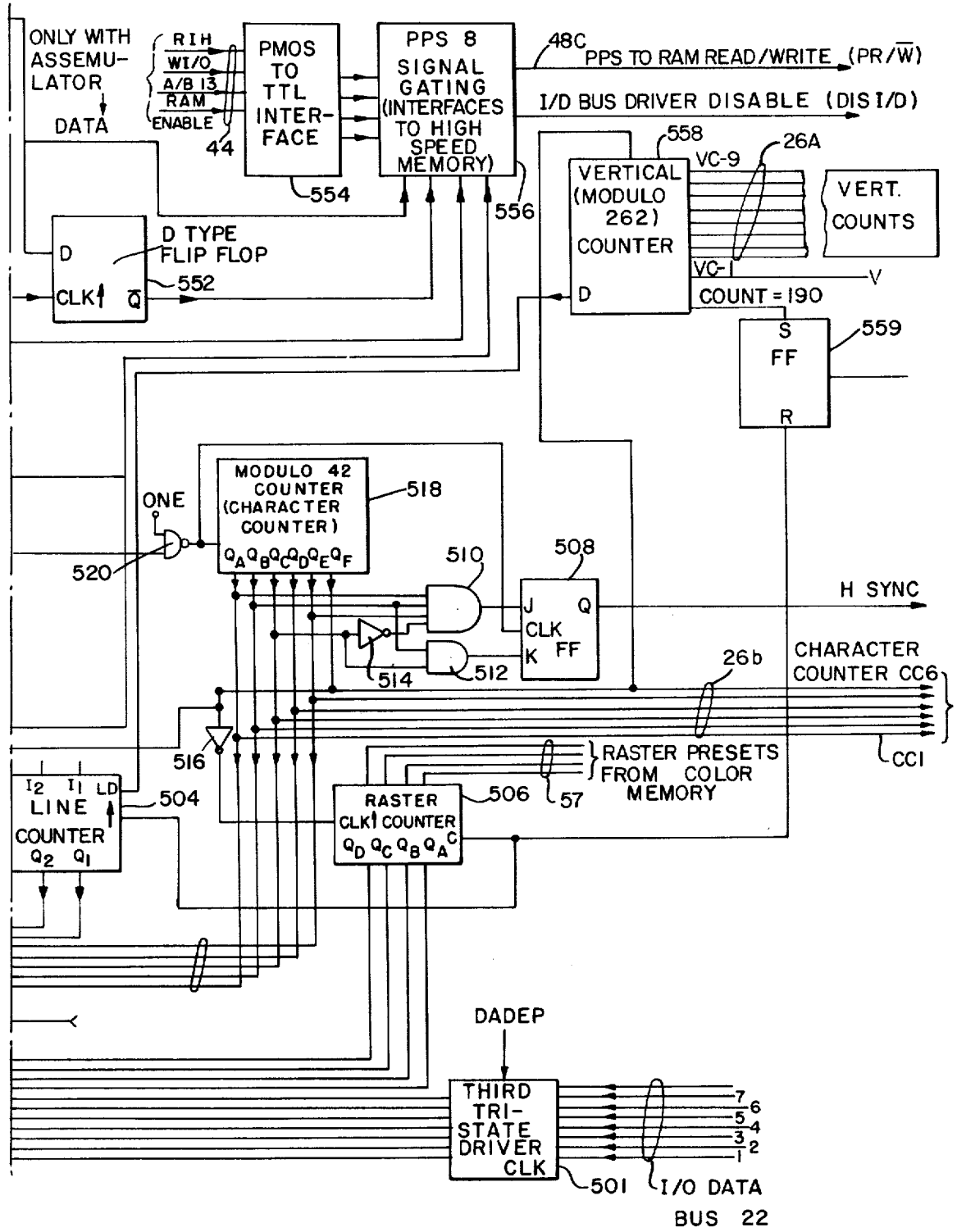
Figure 28A:
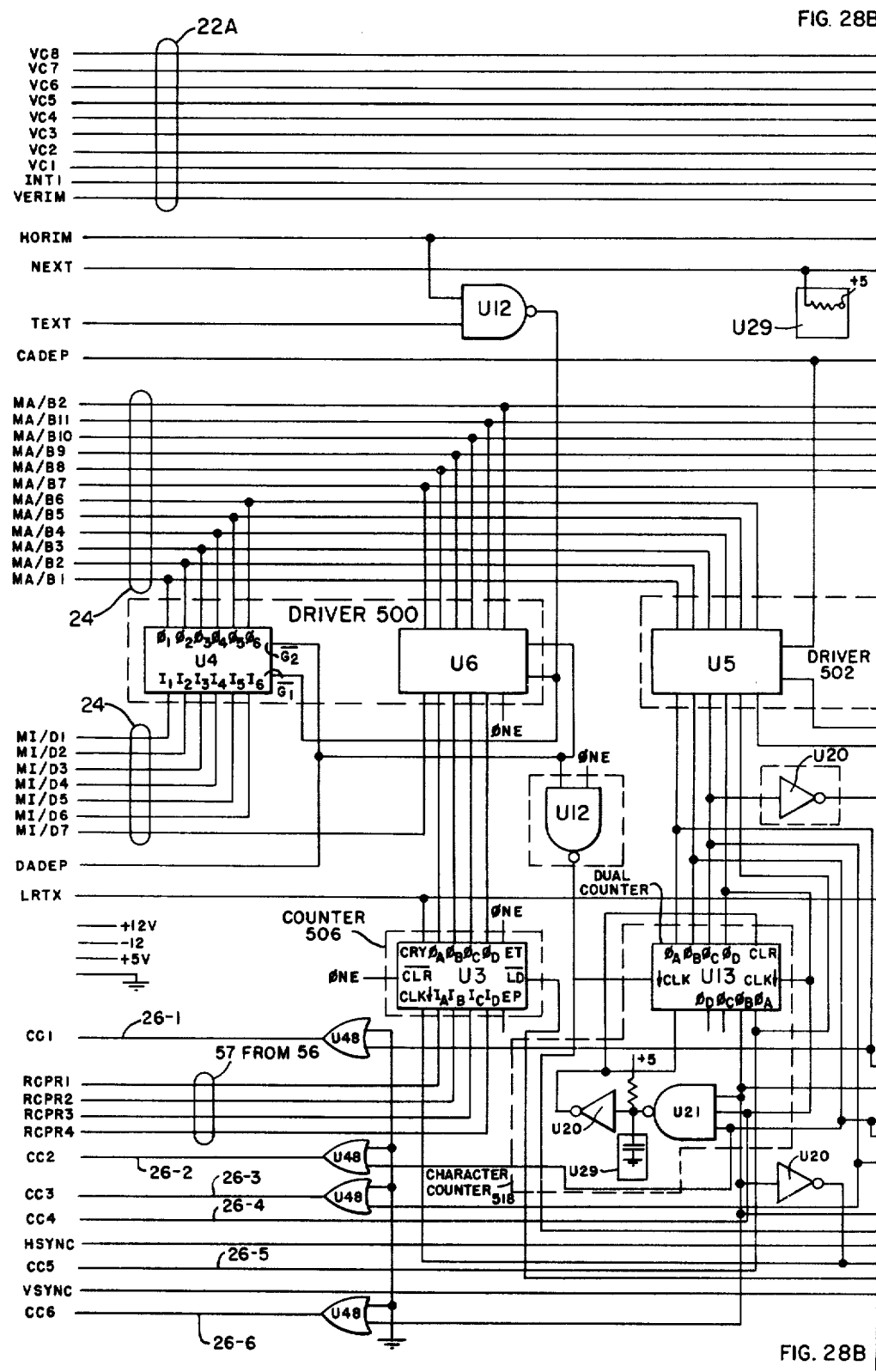
Figure 28B:
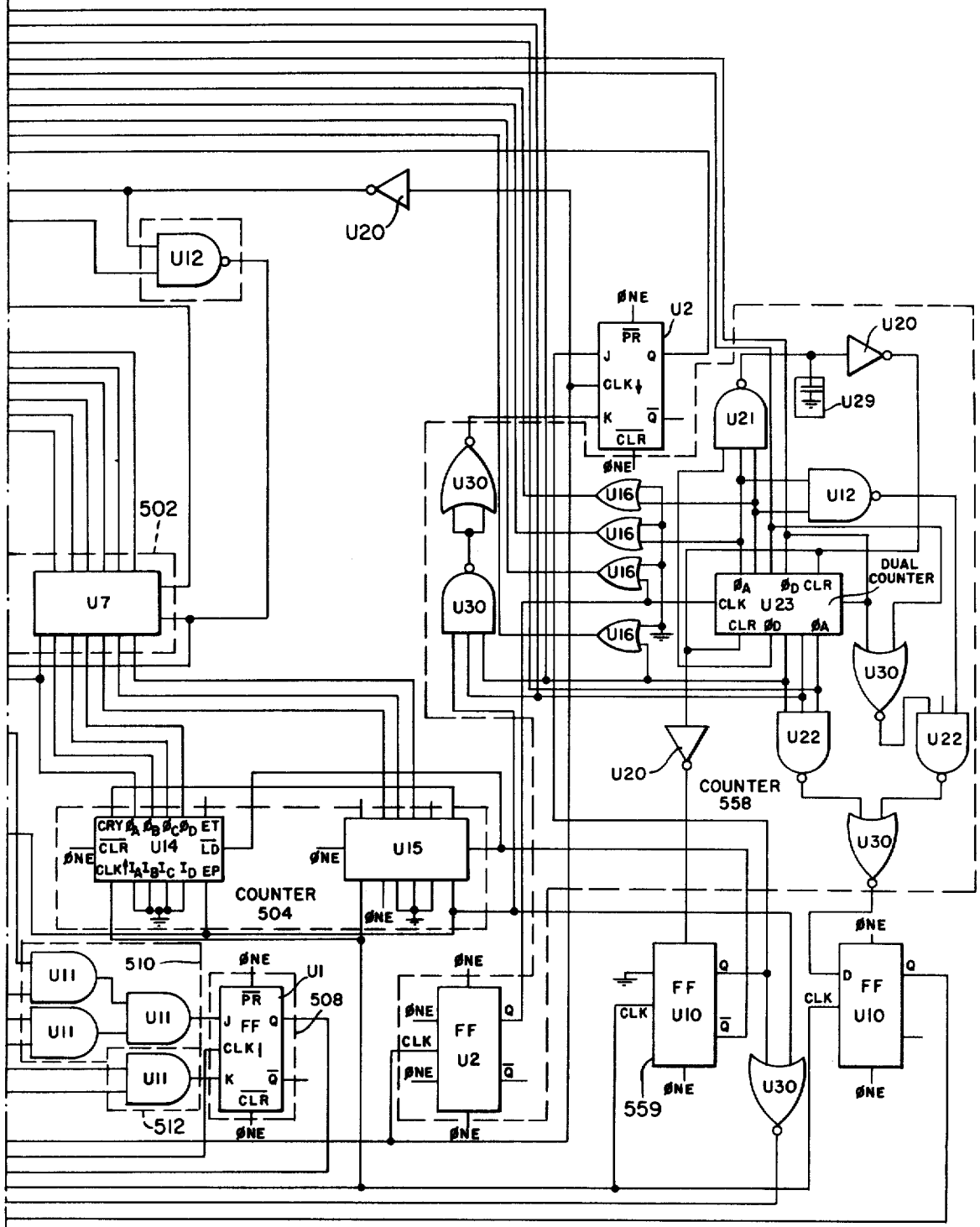
Figure 29:
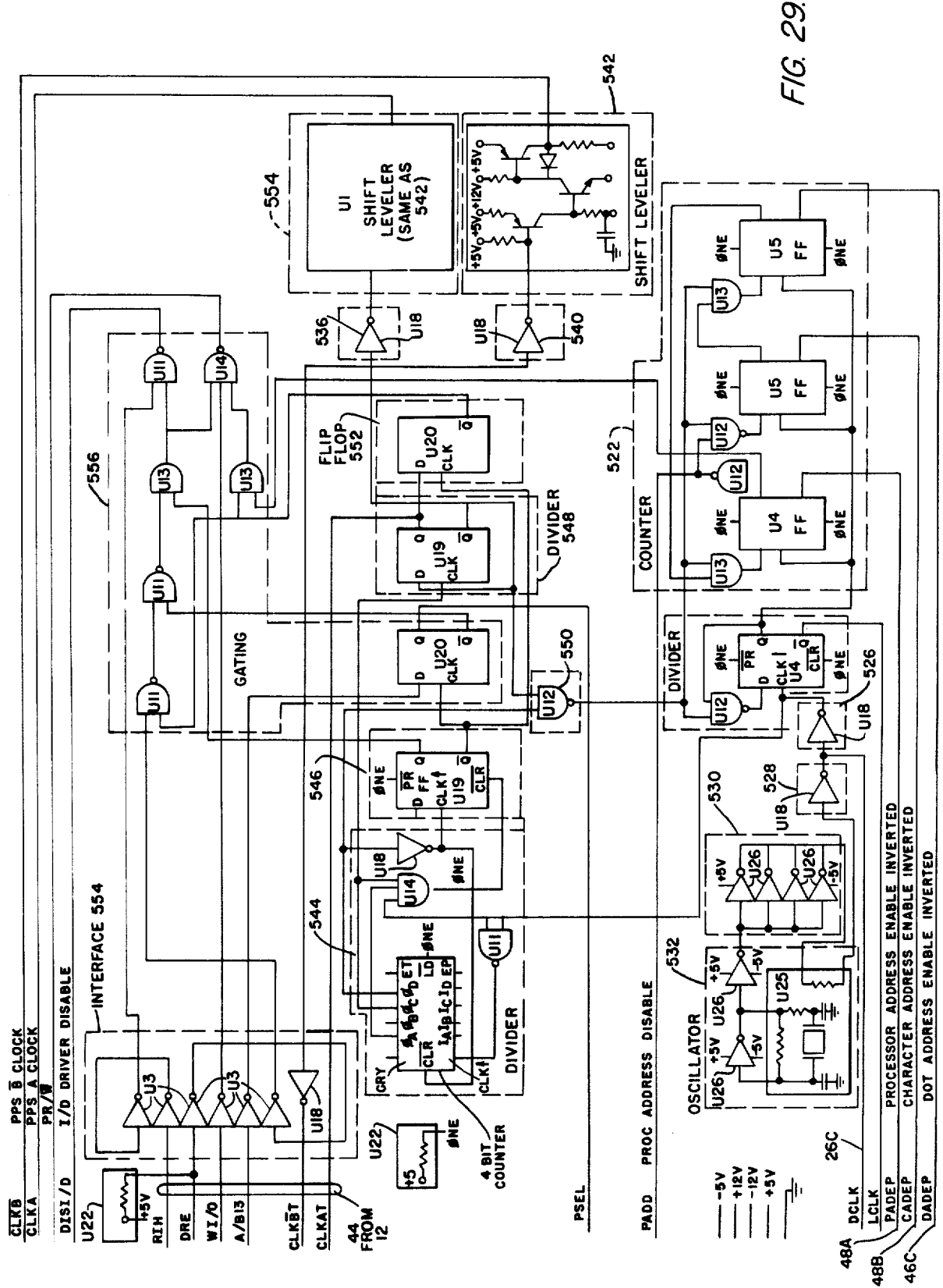

The timing system 18 as generally shown in FIG. 1, is shown in schematic block diagram form in FIGS. 27A and 27B and it is shown in detailed circuit form in FIGS. 28 and 29. With reference now to FIG. 27A, there is shown a master clock 532 comprising a symmetrical CMOS oscillator for generating a master clock signal of 3.96144 MHz for providing a master clock signal as shown in FIG. 3A to a CMOS-to-TTL converter 530. The converter output is applied to a TTL inverter 528 to provide a dot clock signal as seen in FIG. 3A that is applied to a timing conduit 26C (generally identified in FIG. 1 by the numeral 26) that is connected to various of the circuits including the color processor 32, the symbol generators 20, etc. The output of the inverter 528 is applied via an inverter 526 to a divide-by-two circuit 524, whose Q output is applied to a clock input of a three-bit Johnson-type ring counter 522. The outputs of the Johnson ring counter 522 are 660 Kc signals corresponding to the rate of display of the characters as shown in FIG. 2, i.e. 32 characters for a horizontal scan line. As seen in FIG. 27A, the output of the TTL inverter 528 provides a DOT clock (DCLK) as shown in FIG. 3A. Further, the $\overline{Q}$ output of the divider circuit 524 provides a logic clock LCLK signal as shown in FIG. 3B that is conveyed by conduit 40 to the microprocessor RAM interface circuit 36 as shown generally in FIG. 1. In addition, the a and b outputs of the three-bit ring counter 522 provide, respectively, dot address enable inverted signals (DADEP) as shown in FIG. 3C for controlling the timing of the second look-up, and a character address enable inverted signal (CADEP) as shown in FIG. 3D for controlling the timing of the first look-up. The DADEP and CADEP signals are applied as command signals via conduit 48 to RAM 16.

A first counter output as derived from its output terminal A is applied via an inverter 520, as seen in FIG. 27B, to the character counter 518 illustratively taking the form of modulo 42 type counter. A series of outputs as derived from its QA to QF output terminals provide the character counter outputs CC1 to CC6, as shown in FIGS. 3F1 to 3F6. As previously explained, the character counter outputs CC1–CC6 provide time and control signals to the interface circuit 28, the keyboard/stick control circuit 30 and to the color memory 62 within the color processor 32.

Further, the output of the character counter 518, as seen in FIG. 27B, also is applied to a first tri-state bus driver 502, as seen in FIG. 27A. In turn, the first tri-state bus driver 502 applies first address signals to the RAM 16 via the RAM address bus 24 (see also FIG. 1) comprised of conduits 1-12 as illustrated in FIG. 27A. The first address signals effect in the text mode of operation a first look-up or address of data within the RAM 16, the first look-up of information in the RAM 16 being used, in turn, to derive a second address for addressing information in a second, different portion of the RAM 16. As described above, the data being read out during the second look-up of the text mode is applied to the color processor 32 to color a set of characters for display upon the color CRT 34.

In the paint mode of operation, first and second direct addresses are developed by the timing system 18 and applied to the RAM 16 to provide corresponding two readouts of data, which when combined as explained above, form a complete set of pointers whereby the color memory 62 of the color processor 32 may be addressed to read out the desired color signals. In the paint mode, the first address is derived from the first tri-state bus driver 502 and is applied via the RAM address 12 during the first look-up time slots CHAR, as indicated in FIG. 3H. The address as derived from the first tri-state driver 502 is given as follows:

| | Page | Word |
|---|---|---|
| Address of 1st look-up | $P_6\ P_5\ P_4\ [P_3\ P_2\ P_1\ P_0\ |$ | $W_6\ W_5\ W_4\ W_3\ W_2\ W_1\ W_0]$ |

At the second look-up time slot DOT as indicated in FIG. 3H, the second direct address is derived from a fourth tri-state bus driver 505. As indicated, the input to the fourth tri-state bus driver 503 is connected to selected of the outputs of the first tri-state bus driver 502 to effect a shift of the data derived from the first tri-state bus driver 502 to provide the following second address:

Address of 2nd look-up $0\ 0\ 0\ 0\ 0\ 1\ P_3\ |\ P_2\ P_1\ P_0\ W_6\ W_5\ W_4\ W_3$ As indicated by the above-given second address, the intercoupling between the drivers 502 and 503 effects a shift to the right of the eleven least significant bits of the first address to provide the second address. The output of the fourth tri-state bus driver 503 is selectively connected to the RAM address bus 24 to address the RAM 16 obtaining the second look-up data as indicated above.

As seen in FIG. 1, the first address to be applied to the RAM 16 during the first address period, indicated in FIG. 3H as "CHAR", is formed as indicated in FIGS. 27A and 27B by the output of the character counter 518 indicating thereby which character is being displayed upon the screen of the color CRT 34. In addition, data indicative of which text line of the characters, as illustrated in FIG. 2, is also applied from a text counter 504 to the first bus driver. As shown in FIG. 27B, the text line counter 504 is incremented once for each text line scan of the color CRT 34. In particular, one of the outputs of the character counter, i.e. QF, corresponding to the output CC6 is applied via an inverter 516 to a raster counter 506 which counts the number of horizontal or scan lines (see FIG. 2) that have been scanned in forming the characters upon the color CRT 34 and provides an output from its C terminal, indicating the occurrence of each M line of the scan corresponding to the M raster lines of dots that form a single character as illustrated in FIG. 2; the counter output is applied to a clock input of the counter 504 to increment the text line counter 504 to indicate thereby that character within the next text line that is to be address within the RAM 16.

The raster counter 506 provides a preset count indicative of the M lines within a single character as applied via conduits 57 from a latch 505 of the color processor 32 as seen in the detailed schematic diagram of FIG. 6A. The preset count equals 16-M, where M is the number of raster lines within a character, and is set by the programmer in determining the makeup of the image to be displayed. Data is derived from the storage unit 29 and is used in the calculations of the microprocessor 12 to determine the desired preset count to be read out of RAM 16 during the RASTER PR/MODE time slot as shown in FIG. 3H, and stored within the latch 505 as seen in FIG. 6A. The thus stored preset count is available via conduit 57 to be continuously reloaded into the raster counter 506 upon its counting to its preset count.

Thus, as explained above, the first tri-state bus driver 502 forms a first address during the first look-up period "CHAR" from the output of the text line counter 504. The first address is applied in the text mode of operation via the RAM address bus 24 to address a first portion of the RAM 16 to read out a character in the form of a pattern of dots (six dots by M lines corresponding to a character as illustrated in FIG. 2). This readout is used as an indirect address and is reapplied via the I/O data bus 22, as shown in FIG. 27B, to a third tri-state bus driver 501 that is latched by the DADEP signal as shown in FIG. 3E, into a second tri-state bus driver 500. The second tri-state driver 500, as shown in FIG. 27A, forms a second address to be applied during a second look-up period, as indicated in FIG. 3H by the notation "DOT", to derive from a second portion of the RAM 16 the individual dot patterns, as shown in FIG. 2, that make up each character C. In particular, the second tri-state driver 500 receives via the enabled, third driver 501 (see FIG. 27B) from the I/O data bus 22, seven bits of data from the first look-up within the RAM 16 and, in addition, four additional bits from the raster counter 506 indicating which raster or scan line of 12 lines within a character that is currently being scanned by the color CRT 34. As indicated in FIG. 27A, the second tri-state driver 500 applies its output to the RAM address bus 24 during the second look-up within the time slot "DOT" to read out data from the RAM 16 corresponding to the dot pattern then to be displayed upon the color CRT 34.

The second tri-state driver 500 has a first input DIS2 to which a second look-up enable signal is applied. As illustrated in FIG. 27A, a disable signal is developed from a NAND gate 496 in response to the CC6 output of the character counter 518, and to the inverted DOT address enable signal (DADEP), whereby the second bus driver 500 is disabled during other time slots other than the slot "DOT". In similar fashion, a disable signal is developed by NAND gate 498 in response to the CC6 output of the character counter 518, and to an inverted CADEP signal (indicative of the first look-up as derived from the conduit 48B) to disable the driver 502 during the horizontal blanking period.

As shown in FIG. 27B, the CC6 output of the character counter 518 is applied to a vertical counter 558 of the modulo 262 type, for providing vertical count output signals VC1 to VC9 as shown in FIG. 4A. As explained above, the outputs VC1 to VC9 of the vertical counter are applied via timing bus 26A (a part of the bus 26 shown in FIG. 1) variously as timing signals to the color memory circuit 62 of the color processor 32 and to the keyboard/stick control 30. In addition, upon reaching a count, e.g. 192, corresponding to the number of lines within a display as shown in FIG. 2, a signal is derived from the counter 558 and applied to a flip-flop 559, whereby a vertical flagging signal is derived and applied via the color processing circuit 32 to blank vertically the CRT 34 at the end of the current text line.

Further, it is necessary that the operation of the microprocessor 12 be coordinated with the clock or timing signals developed by the timing system 18, and in particular, that the control signals developed by the microprocessor 12 be synchronized with the timing and control signals developed by the timing system 18. As shown in FIG. 1, the timing signals of the microprocessor 12 are applied via conduit 44 to the timing system 18 and in particular, as shown in FIG. 27B, the conduit 44 is coupled to a PMOS-to-TTL interface 554. It is understood that the microprocessor 12 may illustratively be an integrated circuit of the PMOS variety and that its output signals of the PMOS format must be converted to the TTL format of which the various components of the timing system 18 are comprised. Thus, the interface 554 adjusts the voltage and current levels from the PMOS format to those required for the TTL format. As specifically illustrated in FIG. 27B, the following signals are conveyed along the conduit 44 to the interface 554, namely a read inhibit signal (RIH) for inhibiting the reading of data from the RAM 16, a write I/O signal (WI/O) for writing information onto the I/O data bus 22 from the microprocessor 12, an address bus signal (A/B13), and a RAM enable signal for permitting data transfer from the RAM 16 to the microprocessor 12. In turn, the aforementioned signals, as adjusted, are applied by the interface 554 to a microprocessor signal gating circuit 556, which serves as an interface or buffer to permit appropriate timing of the signals to the high speed memory, i.e. RAM 16. As indicated in FIG. 27B, in response to appropriate timing signals, the signal gating circuit 556 develops a microprocessor to RAM read/write (PR/$\overline{W}$) signal to effect control of the reading and writing operations of the RAM 16 from the microprocessor 12. There is further provided an input-/output bus driver disable signal (DIS I/O) that is applied to each of the tri-state drivers associated with the various elements of the system as shown in FIG. 1 that are connected to the I/O data bus 22, whereby selected tri-state drivers are enabled or disabled, and the various circuits are correspondingly connected or disconnected during their time slot(s) from the I/O data bus 22.

As generally shown in FIG. 1, the timing system 18 provides a set of timing signals via the conduit 46 to the microprocessor 12 to coordinate its timing functions with those of the remaining part of the system as shown in FIG. 1. In particular, as shown in FIG. 27A, a clock signal is derived from the inverter 526 and is applied to a divide-by-nine circuit 544, which provides a first output for each count 3 to count 4 transition to a divide-by-two circuit 548 which provides a first $\overline{A}$ signal and a second A signal. The $\overline{A}$ signal is applied via an inverter 536 and a level shifter 534 necessary for converting the $\overline{A}$ signal to the PMOS signal format of the microprocessor 12, to be applied via conduit 46 and in particular conduit 46A to the microprocessor 12. A second signal indicative of the count 8 to count 0 transition is provided by the divide-by-nine circuit 544 and is applied to the clock input of a D-type flip-flop circuit 546, which provides upon its Q output a signal via an inverter 538 to provide a $\overline{B}$ clock signal and also through an inverter 540 and a level shifter 542 to provide a B clock signal (of a PMOS format) via conductor 46B to the microprocessor 12. The B clock signal also is applied as an enabling signal to the microprocessor signal gating circuit 556, as shown in FIG. 27B. The $\overline{Q}$ output of the flip-flop 546 as well as the A output of the divide-by-two circuit 548 are respectively applied to the clock input and the D input of a D-type flip-flop 552 which in turn provides as a $\overline{Q}$ output a timing signal to the gating circuit 556. As shown in FIGS. 27A and 27B, the $\overline{B}$ clock signal as derived from the flip-flop 546 as well as the C output of the three-ring counter 552 are applied to the gating circuit 556 to provide suitable gating of the command signals as derived from the microprocessor 12 to be applied in turn to the RAM 16 via bus 48C, and also to the tri-state driver circuits of the various circuits as shown in FIG. 1. In this manner, the control signals generated by the microprocessor 12 are synchronized with the timing signals provided by the timing system 18.

Figure 6B:
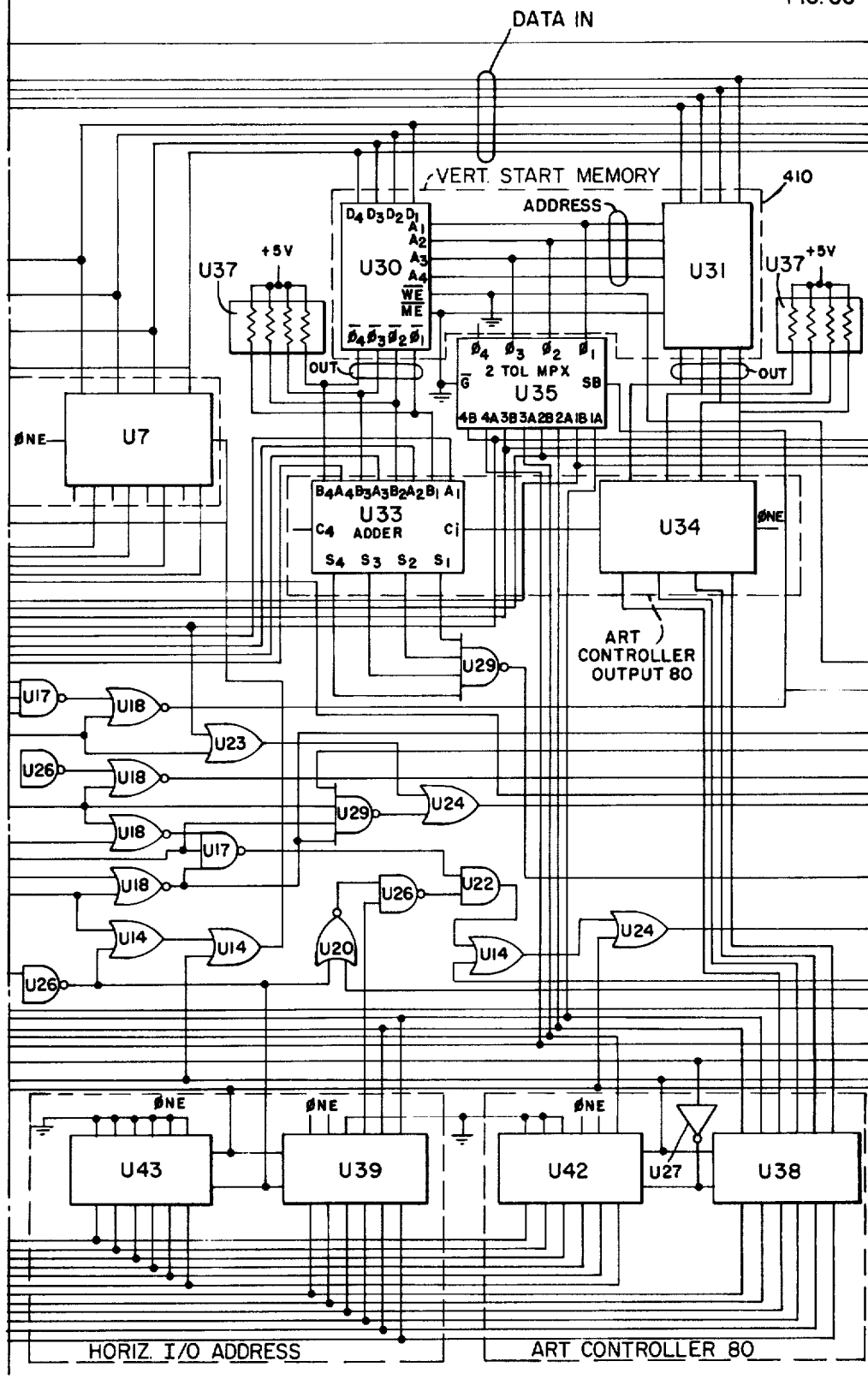
Figure 6C:
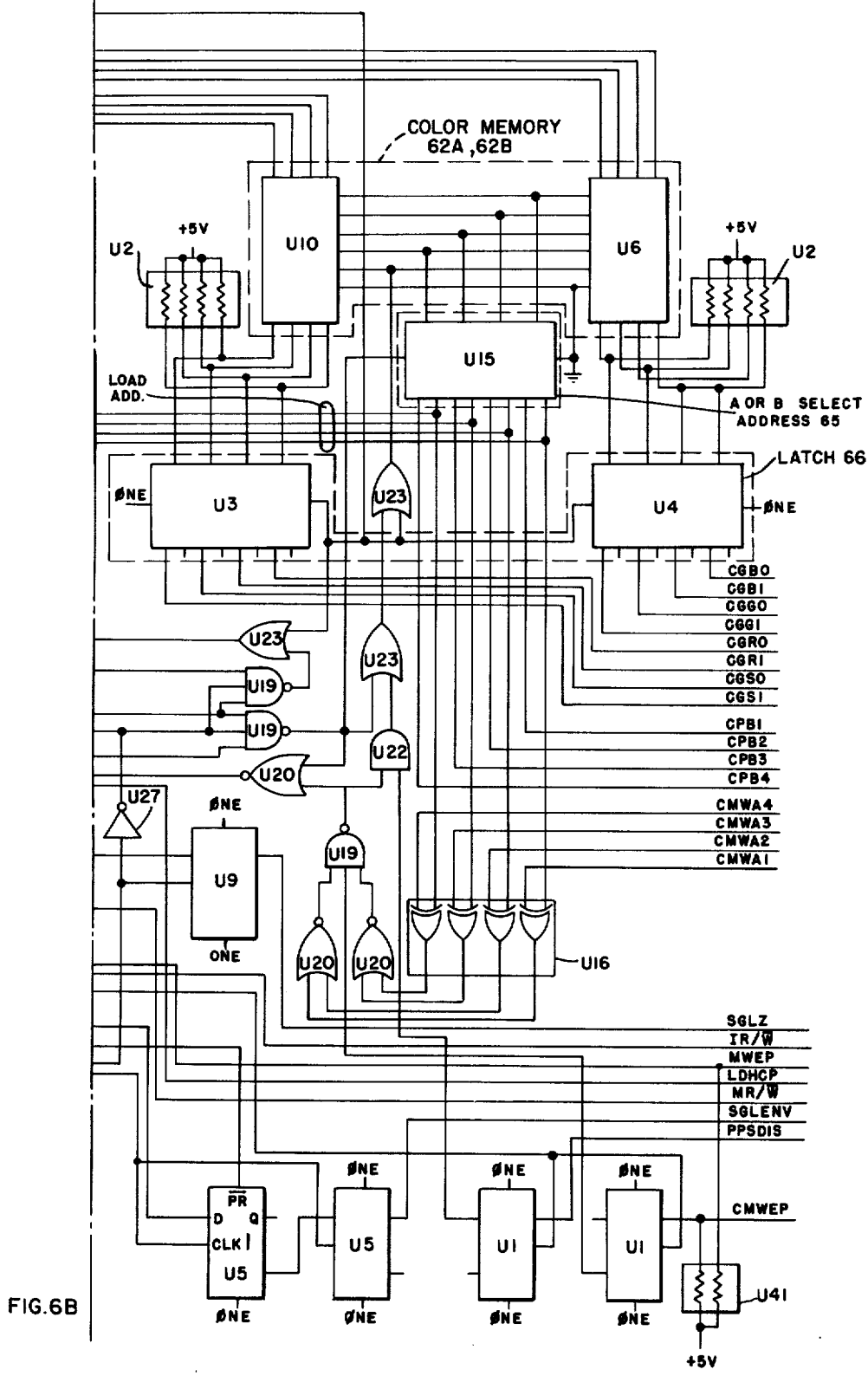
Figure 6D:
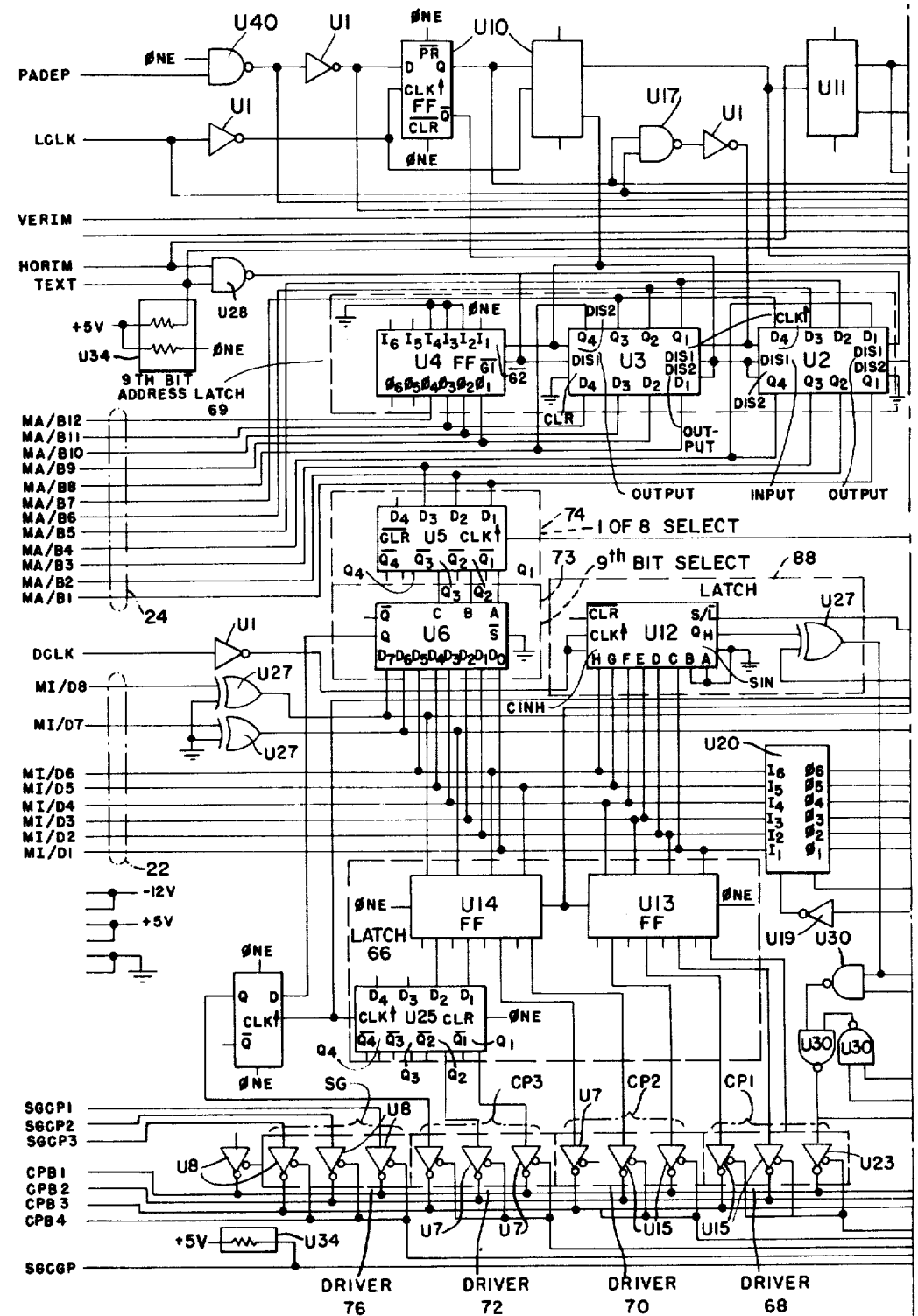

In FIGS. 28A and B and 29, there is shown detailed circuit diagrams of the timing system 18 schematically shown in FIGS. 27A and 27B and as generally shown in FIG. 1. In FIGS. 28A and B, the detailed circuit elements of the vertical counter 558 are shown for providing vertical output signals VC1-VC8 upon the timing bus 26. The first and second drivers 502 and 500 for providing, respectively, the first and second addresses are shown as each comprising two hex-type tri-state drivers. In the paint mode of operation, the second look-up is accomplished by the fourth tri-state bus driver 503, which is shown in FIG. 6B, the results of which in turn are applied to the RAM address bus 24. Raster preset information indicative of M raster lines within a character from the color processor 32 is applied from the latch 505 (see FIG. 6A) to the raster counter 506 (see FIG. 28A), which in turn applies signals indicative of the scanned horizontal lines to the second bus driver 500. The counter 518 as well as the text line counter 504 are shown as being connected to the first bus driver 502 and in particular to the separate hex-type tri-state drivers thereof. Further, there is shown in FIG. 28B the use of the gates 510 and 512 for connecting selected outputs of the vertical counter 518 to the JK flip-flop 508.

In FIG. 29, command signals as derived from the microprocessor 12 are applied via bus 44 and the interface circuit 554 to the signal gating circuit 556, the details of which are shown in FIG. 29 as comprising a series of gates and a flip-flop circuit whereby the command signals including the read/write signal are synchronized with respect to the timing system 18. The I/O bus driver disable is applied to the tri-state drivers of the circuits of the overall system as shown in FIG. 1. Further, the particular driving circuits for the crystal oscillator 532 are shown whereby a master clock output signal is applied via the inverters 530, 528 and 526 to a divide-by-two circuit 524 as well as to a divide-by-nine circuit 544. The output of the divide-by-two circuit 524 in turn is applied to the three-bit Johnson ring counter 522 shown in FIG. 29 as comprised of flip-flop circuits. The output of the divider 544 in turn is applied to a flip-flop 546 and to a divide-by-two circuit 548. The divide-by-two circuit output applied to a D-type flip-flop 552, and also via an inverter 536 to a level shifter 534, whereby a clock A signal is derived. In similar fashion, the output of the divider circuit 548 also is connected via an inverter 540 to a level shifter 542, the details of which are shown to provide a shift in the voltage and current levels of the clock B output as is applied via conduit 46B to the microprocessor 12 as shown in FIG. 1.

ADDRESS AND DATA INTERFACE CIRCUITS 36 AND 38

Figure 30:
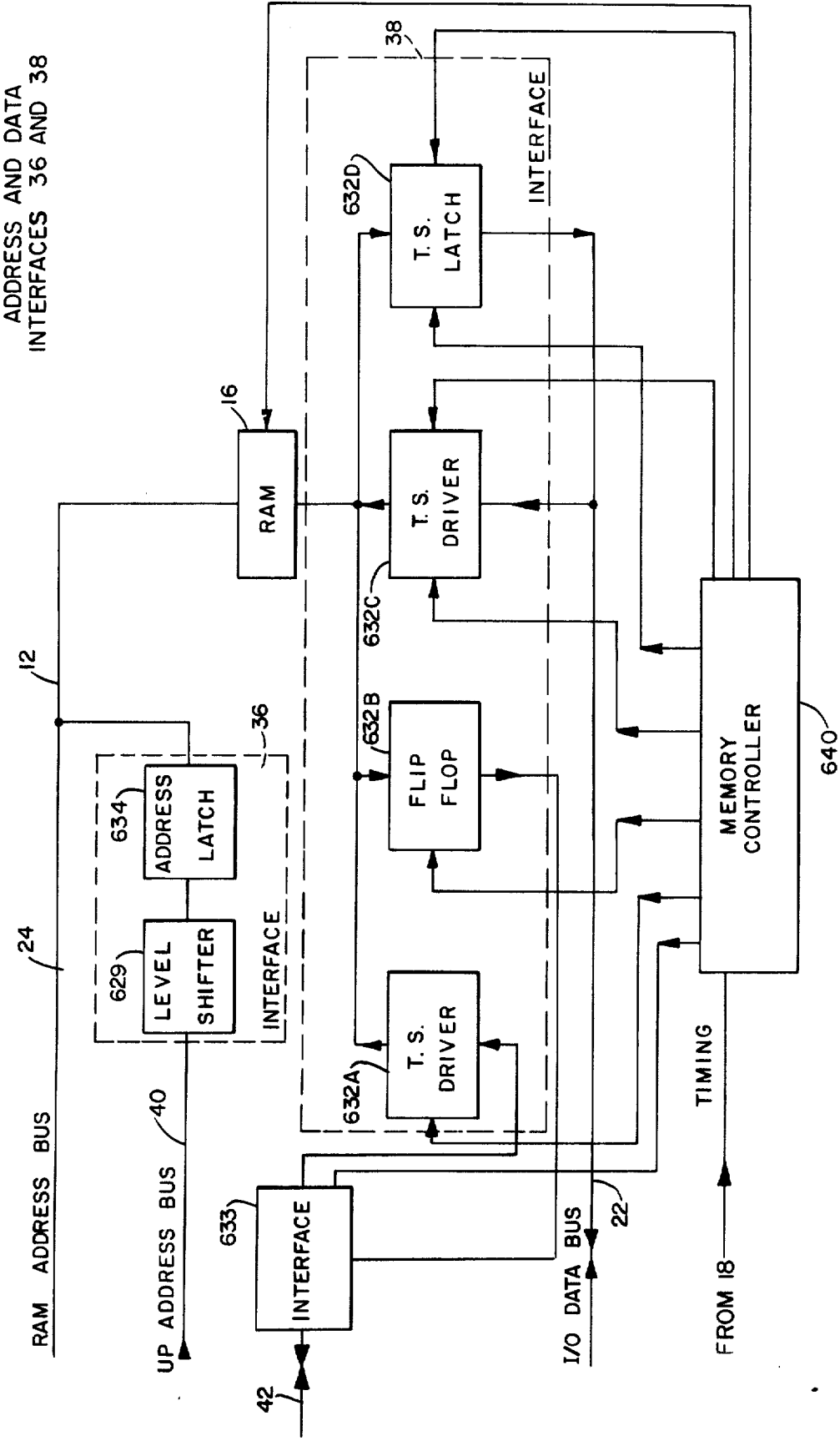
FIGS. 30 and 31A, B and C are, respectively, a functional block diagram and a detailed schematic drawing of the random-access memory (RAM) and its associated interface circuitry, as more generally shown in FIG. 1.

There is shown in FIG. 30, a schematic diagram, the address and data interface circuits by which data transfers are made between the RAM 16 and the microprocessor 12, and address signals are applied from the microprocessor 12 to the RAM 16, as generally shown in FIG. 1. With regard to FIG. 30, addresses as developed by the timing system 18, for example by the tri-state drivers 500 and 502, are applied via the address bus 24 to address specific sections within the RAM 16. In addition, the microprocessor 12 develops commands or address signals that are applied to the RAM 16 via an interface circuit 36 comprising level shifters 629 and address latch 634. Data is transferred from the I/O date bus 22 to the RAM 16 via a tri-state latch 632C and from the RAM 16 to the data bus 22 via latch 632D. Data is transferred from the microprocessor 12 to the RAM 16 by the level shifter 633 and the tri-state driver 632A and from the RAM 16 to the microprocessor 12 by the latch 632B and tri-state level shifter 633. As indicated in FIG. 30, read/write control signals are applied from a memory controller 640 to each of the drivers 632A and 632C and latches 632B and 632D and level shifter 634 to control the transfer of data to and from the RAM 16. A group of timing signals as derived from the timing system 18, including the logic clock (LCLK), clock CLKAT, clock CLKBT and a memory read/write signal (PR/$\overline{W}$), is applied to the memory control 640 to control the reading and writing operators of the RAM 16.

Figure 31A:
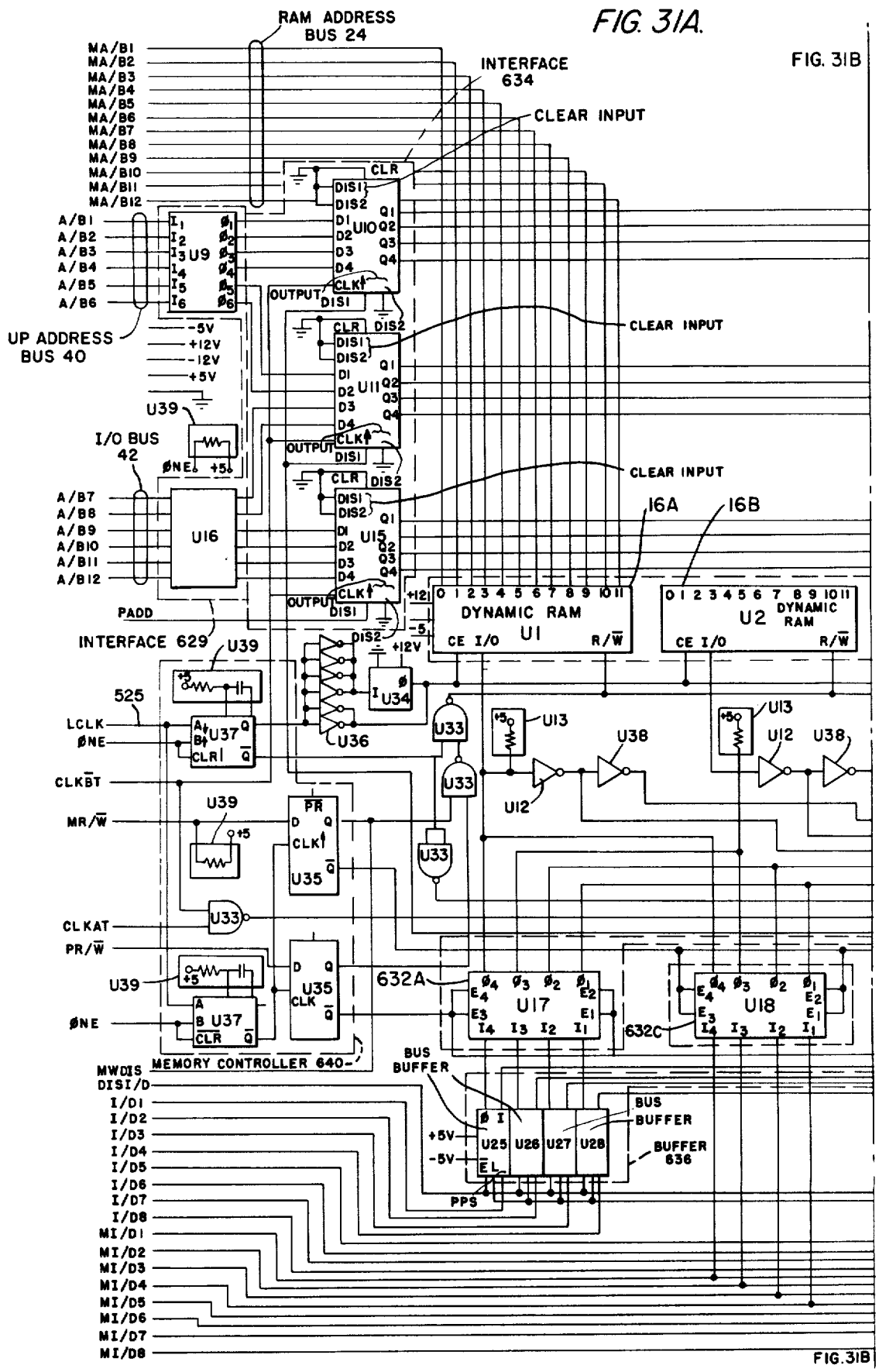
Figure 31B:
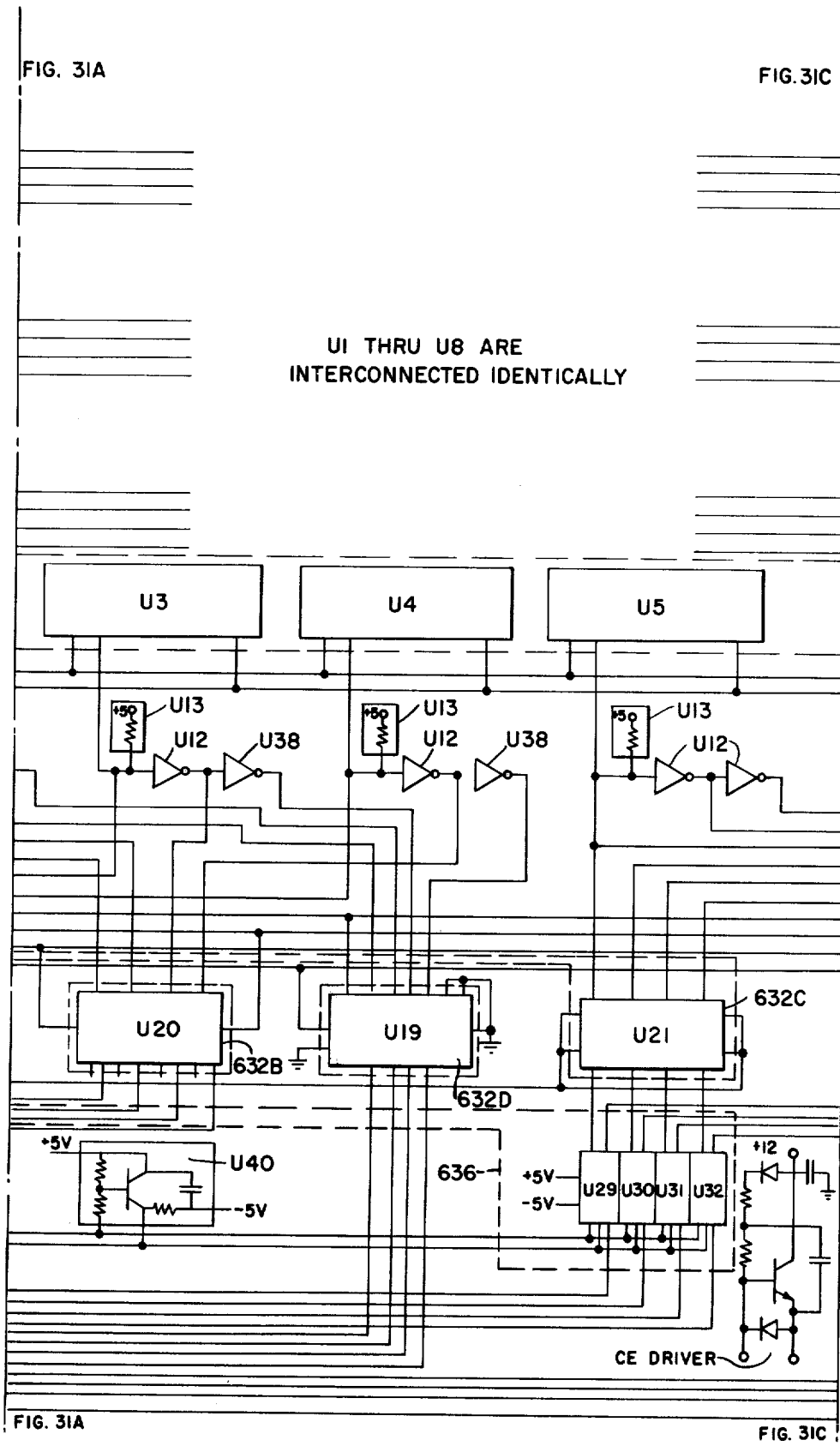
Figure 31C:
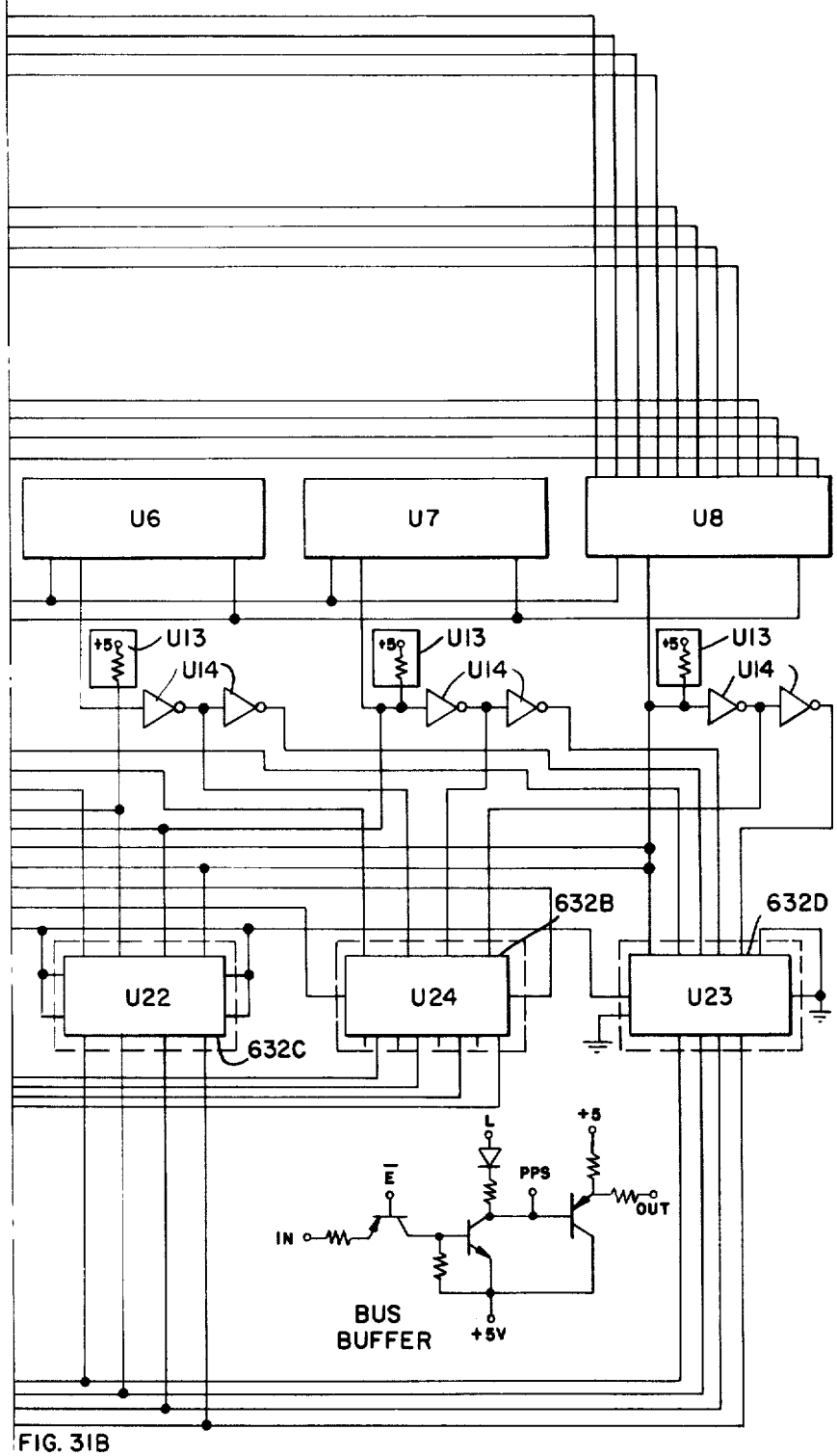

In FIGS. 31A, B and C, there is shown in detail the elements of the address and data interface circuits 36 and 38, as well as the RAM 16. In particular, there is shown the I/O data bus 22 whereby data is transferred to the RAM 16 via the tri-state drivers 632C and 632D. As shown in FIGS. 31A and B, each of the tri-state drivers 632C and 632D is comprised of two separate drivers and further, the RAM 16 is comprised of a plurality of interconnected memories or RAM's 16A-16H. The timing signals, as explained above, are applied from the timing system 18 to the memory controller 640 whereby appropriate timing signals are applied to the buffers 632. As specifically illustrated, the plurality of conduits making up the RAM address bus 24 are selectively interconnected to the RAM memories 16A-16H. Further, the microprocessor address bus 40 is applied to the interface 629 which also is connected to the address latch 634, whereby appropriate command signals are conveyed between the RAM 16 and the microprocessor 12. Also, the microprocessor instruction/data bus is applied to the buffer 636 which also is connected to the RAM 16 by tri-state drivers 632A and latches 632B.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A data processing and display system for transferring data between said system and a data storage unit, the data storage unit storing a set of characters from which a plurality of composite images may be formed, image data identifying the arrangement of the characters to form a desired image, and color information identifying a palette of colors from which the characters may be colored, said system comprising:

(a) color display means for displaying images of a selected arrangement of characters chosen from the set and characters colored with selected colors from the palette;
   (b) means for reading data from the data storage unit;
   (c) addressable storage means coupled to said reading means for receiving therefrom and for storing data derived from the storage unit indicative of the set of characters and the palette of colors; and
   (d) display control means for first addressing the image data in a first portion of said addressable storage means to obtain a first readout, and secondly for using the first readout data and being coupled to said color display means to receive data identifying the currently displayed image by said color display means for addressing a second portion of said storage means to obtain signals indicative of the character color then to be applied to and displayed by said color display means.

2. The system as claimed in claim 1, wherein there is included an input/output data bus for bidirectionally conveying data between said addressable storage means and each of said color display means, said data reading means and said display control means.

3. The system as claimed in claim 2, wherein said display control means comprises timing means for providing address signals and there is further included an address bus means interconnecting said timing means and said addressable storage means by which the address signals are applied to said addressable storage means.

4. The system as claimed in claim 3, wherein said color display means displays the colored images in a raster format comprised of a series of horizontal lines and said timing means provides a first train of horizontal timing signals corresponding to the end of each horizontal line and a second train of vertical timing signals corresponding to the end of each raster.

5. The system as claimed in claim 4, wherein said color display means displays the images in the form of the selected arrangement of characters, each character comprised of a first number of horizontal lines, each line having a second number of incremental dot portions disposed upon a horizontal line, each such character disposed in a text line of a third number of characters, so that a fourth number of the text lines forms the selected image composed of the selected arrangement of characters, said timing means providing first timing signals in the form of a character count indicative of which character in the horizontal line is to be displayed, and second timing signals indicative of the text line of the character to be displayed.

6. The system as claimed in claim 3, wherein said timing means provides first address signals to effect the first readout of data within said addressable storage means, and second address signals to effect the second readout of data from said addressable storage means.

7. The data processing system as claimed in claim 3, wherein said system comprises a microprocessor for developing command signals to be applied to said addressable storage means whereby the reading and writing of data thereto and therefrom is controlled, and coordination means responsive to the output of said timing means to coordinate the application of the microprocessor command signals.

8. The system as claimed in claim 4, wherein said timing means comprises a character counter for providing an output signal corresponding to the number of characters scanned within a line of the display, and a text counter for providing a count signal indicative of the text line being displayed.

9. The system as claimed in claim 8, wherein said display control means comprises a first bus driver responsive to the outputs of said character counter and said text counter, for applying a first memory address signal to said addressable storage means to obtain the first readout.

10. The system as claimed in claim 9, wherein said timing means comprises a raster counter for indicating the number of rasters displayed upon said color display means for providing a signal indicative thereof.

11. The system as claimed in claim 10, wherein said display control means further comprises a second bus driver coupled to said address bus and responsive to the first readout and to the raster count signals for providing a second memory address to said addressable storage means to read out the image data corresponding to that of a character to be applied to said color display means.

12. The system as claimed in claim 7, wherein said coordination means comprises a gate for selectively passing the microprocessor command signals in response to timing signals developed by said timing system.

13. The system as claimed in claim 1, wherein said display control means includes a color memory for storing that portion of the palette of colors corresponding to those colors by which the characters of the image currently being displayed may be colored.

14. The system as claimed in claim 13, wherein said display control means further comprises latch means for receiving during the first and second readouts image data including color pointers for identifying those colors of the palette by which the characters of the image currently being displayed are to be colored.

15. The system as claimed in claim 14, wherein said display control means comprises address means responsive to the pointers for addressing and reading out from said color memory a selected one of the palette of colors.

16. The system as claimed in claim 13, wherein said display control means comprises color latch means for receiving color pointers indicative of the background, a foreground and edge portions of the image to be reproduced by said color display means, and a color controller for selectively applying the aforementioned color pointers to address said color memory.

17. The system as claimed in claim 16, wherein there is further included second latch means for receiving the color pointers and said color controller is responsive to control data conveyed with the color pointers to effect a selected interchange of the color pointers associated with the background, foreground and edge portions of the color image displayed by said display means.

18. The system as claimed in claim 2, wherein there is included a plurality of generator means, each for receiving image date corresponding to a symbol to be displayed by said color display means, and means for controlling the placement of each of the symbols of said generator means within the display of said color display means.

19. The system as claimed in claim 18, wherein said control means comprises means for storing an indication of the coordinates of each of the symbols of said generator means and means for reading from each of said generator means the symbol image data to be displayed by said color display means.

20. The system as claimed in claim 19, wherein said color display means displays an image in a raster format comprised of a series of horizontal lines, each of said generator means comprising a register for receiving its symbol image data from said addressable storage means.

21. The system as claimed in claim 20, wherein said color display means comprises a timing system for providing a first count signal indicative of the number of scanned horizontal lines of the display and for providing a second count signal indicative of the number of characters that have been scanned across a horizontal line.

22. The system as claimed in claim 21, wherein said storing means comprises a first, vertical position memory for receiving and storing an indication in terms of the horizontal line at which a symbol is commenced to be generated, and a comparator responsive to the output of said vertical position memory and the vertical count signals to provide an initiate signal to enable the display of the symbol image data from one of said generator means.

23. The system as claimed in claim 22, wherein there is included a plurality of counters for receiving a first count initiated signal indicating the horizontal position across each horizontal line of the image display upon which its corresponding register is to initiate the readout of its symbol image data, said timing system providing a dot clock signal indicative of each elemental dot area of a horizontal line to be applied to each of said counters, and upon counting to the count as set by its count signal, each counter generates and applies an initiate signal to its corresponding register.

24. The system as claimed in claim 22, wherein there is included a gate responsive to the output of said character counter to selectively transmit symbol image data from said addressable storage means via said input/output data bus to each of said registers, and decoding means responsive to the second count signal to enable a selected one of said registers to receive the symbol image data, and comparator means responsive to the first count signal and to the output of said vertical position memory to enable said gate to transfer the symbol image data from said addressable storage means to the selected one of said registers.

25. The system as claimed in claim 24, wherein there is included a plurality of counters for receiving via said enabled gate a second count initiate signal indicative of the position within a horizontal line of the display at which the display of the symbol is to begin, and said timing means provides its dot clock signal to each of said counters, whereby upon reaching the count as set by the second count initiate signal, said counter generates an initiate signal to be applied to its corresponding serial register, whereby its symbol image data is read out to be displayed by said color display means.

26. The system as claimed in claim 3, wherein the data storage unit also stores audio data to be transferred by said means for reading data to said addressable storage means, and there is further included a waveform generator for producing a plurality of sound signals and audio control means coupled to said storage means and responsive to the audio data stored therein to select of the sound signals from said waveform generator.

27. The system as claimed in claim 26, wherein said audio control means comprises a first frequency circuit for receiving from said addressable storage means a signal indicative of the initial frequency to be generated, and a second gain circuit for receiving from said addressable storage means a signal indicative of the gain of the sound to be generated, said first frequency circuit coupled to said waveform generator to control the frequency thereof, and a variable amplifier connected to the output of said waveform generator and responsive to the output of said second gain circuit to control the amplitude of its output signal to be applied to an audio speaker.

28. The system as claimed in claim 27, wherein there is comprised a first latch for receiving the initial frequency signal, a second latch for receiving the initial gain signal and a third latch for receiving signals for increasing or decreasing either the frequency of the audio sound to be generated or to increase or decrease the gain of the audio sound, and a decoder responsive to the output of said timing system for respectively enabling said first, second and third latches to receive the audio data as applied by said input/output data bus to said first, second and third latches.

29. A data processing and display system for transferring data between said system and a data storage unit, the data storage unit storing a set of characters from which a plurality of composite images may be formed, and image data identifying the sequence in which the characters are to be arrayed to form the desired image, said system comprising:
   (a) display means for displaying images of a selected arrangement of the characters chosen from the set;
   (b) means for reading data from and writing data upon the data storage unit;
   (c) addressable storage means for storing data derived from the data storage unit indicative of the set of characters;
   (d) viewer entry means manipulatable by the system's viewer to enter data into said system;
   (e) control means for selectively addressing information within said addressable storage means to read out selected characters of the set and for applying same to said display means, whereby a desired image is displayed thereby, and for selectively applying the data entered upon said viewer entry means and to apply same to said data reading/writing means, whereby the viewer data is stored upon the data storage unit.

30. The system as claimed in claim 29, wherein there is included an input/output data bus for bidirectionally conveying data between said addressable storage means and each of said display means, said data reading/writing means, said viewer entry means and said control means.

31. The system as claimed in claim 30, wherein said control means comprises timing means for providing therefrom address signals and a clock signal, and there is further included an address bus interconnected between said timing means and said addressable storage means, by which the address signals are applied to said addressable storage means.

32. The system as claimed in claim 31, wherein the data storage unit further stores a clock signal, said timing means further providing a read/write command signal, and said data read/write means comprises a select clock signal circuit responsive to the read/write signal to send either the clock signal as derived from the data storage unit or from said timing means to provide the corresponding clock signal.

33. The system as claimed in claim 32, wherein said read/write means comprises first and second latches coupled to said input/output data bus, and decoder means responsive to the read/write command signal to correspondingly enable said first latch to receive data from said input/output data bus and to write same upon the storage unit, and to enable said second latch to apply data to said input/output data bus from the data storage unit.

34. The system as claimed in claim 33, wherein there is comprised third and fourth latches and a command decoder, said timing system further providing a tape timing signal, said decoder means responsive to the tape timing signal to receive a tape command signal from said data bus, said third latch responsive to an output of said decoder, whereby the tape command signals are applied to said command decoder to control the driving of the tape of said storage unit.

35. The system as claimed in claim 34, wherein the storage data unit further stores control signals indicative of the beginning and end of data stored upon the storage unit, and said decoder is responsive to a timing signal of said timing system to actuate said fourth latch, whereby said fourth latch is enabled to transmit the control signals via the input/output data bus to said control means.

36. The system as claimed in claim 31, wherein said viewer entry means comprises a keyboard-type entry device actuatable by the viewer to enter data in alphanumeric form via said input/output data bus to said addressable storage means.

37. The system as claimed in claim 36, wherein there is further included decoder means responsive to a timing signal derived from said timing means indicative of a time interval in which image data is not being displayed by said display means for actuating said keyboard-type device to transmit the alphanumeric data as entered thereon.

38. The system as claimed in claim 31, wherein said viewer entry means comprises a joy stick maneuverable in at least two coordinate directions for providing output signals indicative repetitively of the movements in the coordinate directions.

39. The system as claimed in claim 38, wherein there is included multiplexer means actuatable by an output of said timing means during an interval in which image data is not being displayed by said display means, to read out signals indicative of the movements of said joy stick and applying same to said addressable storage means.

40. A data processing and display system for transferring data between said system and a data storage unit, the data storage unit storing a set of characters from which a plurality of composite images may be formed, image data identifying the arrangement of the characters to form a desired image, and color information identifying a palette of colors from which the characters may be colored, said system comprising:
(a) color display means for displaying images of a selected arrangement of characters chosen from the set and the characters colored with selected colors from the palette;
(b) means for reading data from the data storage unit;
(c) addressable storage means coupled to said reading means for receiving and storing data derived from the storage unit indicative of the set of characters and the palette of colors; and,
(d) display control means for first addressing the image data in a first portion of said addressable storage means to obtain a first readout, and secondly for using the first readout data for addressing a second portion of said storage means to obtain signals indicative of the character color, said display control means being coupled to said color display means to apply the character signals to be displayed by said color display means.

41. A data processing and display system for transferring data between said system and a data storage unit, the data storage unit storing a set of characters from which a plurality of composite images may be formed, image data identifying the arrangement of the characters to form a desired image, and color information identifying a palette of colors from which the characters may be colored, said system comprising:
(a) color display means for displaying images of a selected arrangement of characters chosen from the set and the characters colored with selected colors from the palette;
(b) means for reading data from the data storage unit;
(c) addressable storage means coupled to said reading means for receiving and storing data derived from the storage unit indicative of the set of characters and the palette of colors; and
(d) display control means comprising timing means for developing timing signals for facilitating the display of characters upon said display means and for providing and applying first address signals to a first portion of said addressable storage means to obtain a first readout, and secondly for using the data of the first readout and the timing signals and being coupled to said addressable storage means to provide and apply a second address to a second portion of said addressable storage means to obtain a second readout in the form of signals indicative of the character color, said color display means being coupled to said display control means to apply the character signals to be displayed by said color display means.

42. The system as claimed in claim 41, wherein said color display means displays the colored image in a raster format comprised of a series of characters disposed in a text line with a plurality of the text lines forming an image upon the display means, each character comprised of a plurality of raster lines, and said timing means comprising a counter for counting the number of raster lines within a given character, and using the output of said raster counter and the first readout data to form the second address to said second portion of said addressable storage means.

43. The system as claimed in claim 41, wherein said color display means displays the colored images, each comprising an arrangement of the characters, each character comprised of a plurality of incremental areas, and said timing means using data indicative of the current incremental area of a character being displayed by said display means and the first readout data to form the second address for addressing said second portion of said addressable storage means.

44. A data processing and display system comprising:
(a) display means for displaying images of a selected arrangement of characters each chosen from a set of characters;
(b) a control processor for controlling said system;
(c) addressable storage means for storing data corresponding to the set of characters;
(d) display control means including timing means;
(e) a data bus coupled to each of said display means, said addressable storage means and said control means whereby data may be applied therealong to each of said aforementioned means and control processor;
(f) an address bus coupled to each of said display means, said addressable storage means, said control processor, and said display control means; and,
(g) said timing means of said display control means operative in a first time slot to provide address signals via said address bus to said addressable storage means, whereby at least one of said characters is transferred via said data bus to said display means to be displayed thereon, and operative in a second distinct time slot which enables said control processor to address said storage means and transmit signals via said data bus to at least one of said above-recited means of said system.

45. The data processing system as claimed in claim 44, wherein said addressable storage means comprises a first portion for storing image data identifying the order and arrangement of the characters to form the desired image upon said display means and a second portion for storing the set of characters, and said timing means generating within the first time slot a first address signal to be applied via said address bus to said addressable storage means to obtain a first readout and thereafter, generating a second address using the first readout data to be applied via said address bus to said addressable storage means, whereby the character so read out is applied via said data bus to said display means to be displayed thereby.

46. A data processing and display system comprising:
(a) color display means for displaying images of a selected arrangement of characters chosen from a set of characters with the characters colored with selected colors from a selectable palette of colors;
(b) image source means for applying to said color display means encoded signals indicative of a series of the characters to said display means to be displayed thereby;
(c) addressable color memory means for storing the palette of colors from which the characters are to be colored the encoded signals being indicative of an addressable location of said color memory means for storing a selected color of the palette; and
(d) display control means for facilitating the display of the characters upon the color display means and for applying address signals to said addressable color memory means, whereby the selected color is read out from said addressable color memory means and applied to said color display means to color at least a portion of a character being displayed thereon.

47. The data processing and display system as claimed in claim 46, wherein said source of character data comprises a second addressable storage means.

48. The data processing and display system as claimed in claim 47, wherein said second addressable storage means includes a first portion for storing image data identifying the arrangement and sequence of the characters to form an image thereof on said color display means and a second portion for storing image data indicative of each of said characters, and said display control means provides a first address signal to said first portion of said second addressable storage means to obtain a readout thereof and using the readout to form a second address to a second portion of said second addressable storage means to read out the selected characters to be applied to said display control means, whereby the characters are ordered and arranged to form the desired image.

49. A data processing and display system comprising:
(a) display means for displaying an image comprising selected of a plurality of symbols;
(b) a plurality of symbol generators, each for applying symbol data indicative of a distinct symbol to said display means to be displayed thereby; and
(c) priority means coupled to each of said plurality of symbol generators for assigning priorities to each of said symbol generators and responsive to the occurrence of the generation of symbol image data from more than one of said plurality of generators to apply only that image data from said generator of highest priority to be displayed by said display means.

50. The data processing and display system as claimed in claim 49, wherein there is included display control means for applying control signals to said display means to display an image thereon in the form of a series of scan lines formed in a raster, and said priority means for ensuring that only one symbol image data of the image is applied to be displayed at one point in a line, in accordance with the priority assigned thereby to each of said signal generators.

51. A data processing and display system comprising:
(a) color display means for displaying images of a selected arrangement of characters selected from a set of characters;
(b) addressable storage means having a first portion of variable size for storing image data identifying the order and arrangement of the characters to form a desired image upon said display means, and a second portion of a size varying inversely to that of said first portion for storing the set of characters; and,
(c) display control means for selectively addressing said first portion to obtain a data readout, and using the data readout to address said second portion and to readout the set of characters in a desired configuration to be applied to said display means to provide a desired image, and for setting the size of said characters, thereby determining the sizes of said first and second variable portions of said addressable storage means.

52. The data processing and display system as claimed in claim 51, wherein a character is comprised of a given number M of raster lines and is arranged in a pattern comprised of N text lines of characters, said display control means settable to receive varying numbers of M raster lines and N text lines.

53. The data processing and display system as claimed in claim 52, wherein the size of said first portion is increased as the number N of text lines is increased and the number M of raster lines is decreased, and the size of said second portion is inversely decreased.

* * * * *